United States Patent
Blandy et al.

(10) Patent No.: US 8,819,393 B2
(45) Date of Patent: *Aug. 26, 2014

(54) FACILITATING MANAGEMENT OF STORAGE OF A PAGEABLE MODE VIRTUAL ENVIRONMENT ABSENT INTERVENTION OF A HOST OF THE ENVIRONMENT

(75) Inventors: Geoffrey O. Blandy, Austin, TX (US); Janet R. Easton, Woodstock, NY (US); Lisa C. Heller, Rhinebeck, NY (US); William A. Holder, Vestal, NY (US); Damian L. Osisek, Vestal, NY (US); Gustav E. Sittmann, Webster Groves, MO (US); Richard P. Tarcza, Kingston, NY (US); Leslie W. Wyman, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 138 days.

This patent is subject to a terminal disclaimer.

(21) Appl. No.: 13/426,501

(22) Filed: Mar. 21, 2012

(65) Prior Publication Data
US 2012/0191942 A1    Jul. 26, 2012

Related U.S. Application Data

(63) Continuation of application No. 10/854,990, filed on May 27, 2004, now Pat. No. 8,214,622.

(51) Int. Cl.
*G06F 12/00* (2006.01)

(52) U.S. Cl.
USPC .......................................................... 711/208

(58) Field of Classification Search
USPC .......................................................... 711/208
See application file for complete search history.

(56) References Cited

U.S. PATENT DOCUMENTS

| 4,277,826 A | * | 7/1981 | Collins et al. ................. 711/206 |
| 4,564,903 A | | 1/1986 | Guyette et al. |
| 4,674,038 A | | 6/1987 | Brelsford et al. |
| 5,222,215 A | | 6/1993 | Chou et al. |
| 5,253,344 A | | 10/1993 | Bostick et al. |

(Continued)

FOREIGN PATENT DOCUMENTS

| EP | 0072107 A2 | 2/1983 |
| EP | 0419723 A1 | 4/1991 |

(Continued)

OTHER PUBLICATIONS

"I/O Subsystem Special Interception Condition", G.C. Beardsley, L.C. Blount, F.W. Brice, Jr., D.Y. Hsu, R.H. Vosacek and R.E. Wagner, IBM Technical Disclosure Bulletin, vol. 32, No. 11, Apr. 1990, p. 70.

(Continued)

*Primary Examiner* — Charles Rones
*Assistant Examiner* — Nanci Wong
(74) *Attorney, Agent, or Firm* — Heslin Rothenberg Farley & Mesiti P.C.

(57) ABSTRACT

Host page management assist functions are employed to manage storage of a pageable mode virtual environment. These functions enable storage to be managed by a processor of the environment absent intervention of a host of the environment. The functions include a resolve host page function; a pin function; and unpin functions.

25 Claims, 31 Drawing Sheets

(56) References Cited

U.S. PATENT DOCUMENTS

| | | | |
|---|---|---|---|
| 5,291,605 | A | 3/1994 | Takagi et al. |
| 5,317,705 | A | 5/1994 | Gannon et al. |
| 5,426,748 | A | 6/1995 | Brenza et al. |
| 5,437,033 | A | 7/1995 | Inoue et al. |
| 5,555,385 | A | 9/1996 | Osisek |
| 5,555,414 | A | 9/1996 | Hough et al. |
| 5,621,912 | A | 4/1997 | Borruso et al. |
| 5,996,026 | A | 11/1999 | Onodera et al. |
| 6,105,119 | A | 8/2000 | Kerr et al. |
| 6,253,224 | B1 | 6/2001 | Brice, Jr. et al. |
| 6,314,501 | B1 | 11/2001 | Gulick et al. |
| 6,332,171 | B1 | 12/2001 | Baskey et al. |
| 6,339,801 | B1 | 1/2002 | Hefferon et al. |
| 6,345,241 | B1 | 2/2002 | Brice et al. |
| 6,356,979 | B1 | 3/2002 | Sicola et al. |
| 6,453,403 | B1 | 9/2002 | Czajkowski |
| 6,496,847 | B1 * | 12/2002 | Bugnion et al. ............... 718/1 |
| 6,519,645 | B2 | 2/2003 | Markos et al. |
| 6,961,806 | B1 * | 11/2005 | Agesen et al. ................ 711/6 |
| 7,114,040 | B2 * | 9/2006 | Yoder ........................ 711/148 |
| 7,941,799 | B2 | 5/2011 | Easton et al. |
| 8,214,622 | B2 * | 7/2012 | Blandy et al. ............... 711/208 |
| 2006/0294524 | A1 | 12/2006 | Vega |

FOREIGN PATENT DOCUMENTS

| | | |
|---|---|---|
| JP | 3037730 A | 2/1991 |
| JP | 9026889 | 1/1997 |
| JP | 2001216171 | 8/2001 |
| TW | 200305079 A | 10/2003 |

OTHER PUBLICATIONS

"State Change Pending Handling in Virtual Machine Operating System", B.C. Beardsley, F.W. Brice, Jr., C.M. Filbert, D.Y. Hsu, V.J. Legvold, R.H. Vosacek and R.E. Wagner, IBM Technical Disclosure Bulletin, vol. 33, No. 8, Jan. 1991, p. 23.

"Hypervisor-based Fault-tolerance", Thomas C. Bressoud, Fred B. Schneider, p. 1.

"The Hypervisor", http://www.research.ibm.com/high_avail96/page9.html.

"Durable Object Technology", http://www.research.ibm.com/high_avail96/page6.html.

Search Report for Taiwan Invention Patent Application No. 094116702 / POU920040072TW1, filed on May 23, 2005.

* cited by examiner

| PROGRAM | Z/VM HOST | MACHINE |
|---|---|---|
| END ⌒ 836 ◀─── YES | | DOES THE STATE OF THE SPECIFIED BUFFER NEED TO BE EXTRACTED? 834 |
| | 838 — COPY THE CONTENTS OF THE PROGRAM SBAL TO THE HOST'S SBAL. | |
| | 840 — SET THE BUFFER-SYNCHRONIZATION AND EQBS-OPERATION-REQUIRED BITS IN THE HOST'S SBAL | |
| | 842 — FOR EACH MEANINGFUL HOST SBALE THAT HAS A VALID STORAGE BLOCK, PERFORM THE FOLLOWING FUNCTIONS: | |
| | | 1) FETCH THE PROGRAM ABSOLUTE (HOST VIRTUAL) STORAGE BLOCK ADDRESS 844 |
| | | 2) INVOKE HPMA PIN FUNCTION TO TRANSLATE AND LOCK THE PAGE IN STORAGE 846 |
| 850 ⌒ PROCESSING COMPLETED BY THE HOST ◀─── NO (PEI) | | 3) WAS THE HPMA PIN FUNCTION SUCCESSFUL? 848 |
| | | 4) MOVE HOST ABSOLUTE ADDRESS OF THE STORAGE BLOCK RETURNED BY HPMA PIN INTO THE HOST'S SBALE. 852 |

*fig. 8B*

| PROGRAM | Z/VM HOST | MACHINE |
|---|---|---|

END  
↑  
1838

1836 — DOES THE STATE OF THE SPECIFIED BUFFER NEED TO BE EXTRACTED? — YES →

1840 — COPY THE CONTENTS OF THE GUEST SBAL TO THE HOST SBAL.

1842 — SET THE BUFFER-SYNCHRONIZATION AND EQBS-OPERATION-REQUIRED BITS IN THE HOST'S SBAL

1844 — IF THIS IS A NEW FCP REQUEST, THEN MARK THE PREVIOUS FCP REQUEST, IF ANY, AS COMPLETED.

1848 — PROCESSING COMPLETED BY THE HOST ← NO (PEI) — 1846 — IS THERE A FOB ON THE AVAILABLE-FOB-LIST (AFOBL)?

1850 — REMOVE THE FIRST AVAILABLE FOB AND DECREMENT THE AVAILABLE FOB COUNT BY 1.

1852 — ADD THE NEW FOB TO THE APPROPRIATE LIST.

1854 — FOR A HEAD FOB THE FOLLOWING PROCESSING OCCURS:

1856 — 1) PENDING REQUEST COMPONENT-COMPLETION BIT IN THE QSD FLAGS IS SET.

1858 — 2) THE REQUEST IDENTIFIER SPECIFIED BY THE PROGRAM IN SBALE 0 IS SAVED.

*fig. 18B*

| PROGRAM | Z/VM HOST | MACHINE |
|---------|-----------|---------|
| | | 1860 — 3) THE ADDRESS OF THE QSD IS STORED IN THE QUEUE-STORAGE-DESCRIPTOR-ADDRESS FIELD IN THE FOB |
| | | 1862 — 4) STORE THE ADDRESS OF THE QBICB IN THE QDIO BUFFER INFORMATION CONTROL BLOCK ADDRESS FIELD |
| | | 1864 — 5) SET THE ADDRESS OF THE HEAD FOB AS THE REQUEST ID FIELD IN SBALE 0 OF THE HOST SBAL. |
| | | 1866 — 6) STORE THE FCP STORAGE BLOCK TYPE FROM SBALF 0 TO THE STORAGE BLOCK TYPE IN THE FOB |
| | | 1868 — FOR EACH MEANINGFUL HOST SBALE THAT HAS A VALID STORAGE BLOCK ADDRESS, PERFORM THE FOLLOWING FUNCTIONS: |
| | | 1870 — 1) FETCH THE PROGRAM ABSOLUTE (HOST VIRTUAL) STORAGE BLOCK ADDRESS |
| | | 1872 — 2) INVOKE HPMA PIN FUNCTION TO TRANSLATE AND LOCK THE PAGE IN STORAGE |
| | 1876 — PROCESSING COMPLETED BY THE HOST ◄──── NO (PEI) | 1874 — 3) WAS THE HPMA PIN FUNCTION SUCCESSFUL? |

*fig. 18C*

| PROGRAM | Z/VM HOST | MACHINE |
|---|---|---|

1878 — 4) MOVE THE PTE ADDRESS RETURNED BY HPMA INTO THE NEXT AVAILABLE ENTRY IN THE FOB PTE-ADDRESS FIELD AND INCREMENT THE PTE-COUNT FIELD BY ONE.

TO FIG. 18A

1880 — 5) ADD THE DATA-COUNT FIELD FROM THE HOST SBALE TO THE BYTE-TRANSFER COUNT IN THE QSD

1882 — IF THIS IS THE LAST SBAL OF A MULTIPLE SBAL OR THE ONLY SBAL OF A FCP REQUEST, THEN MARK REQUEST AS COMPLETE IN THE FOB AND SET THE PENDING-REQUEST-FOB-LIST-COMPLETION BIT TO ZERO.

1884 — SET THE BUFFER'S SQBN TO THE ADAPTER OWNED STATE SPECIFIED BY THE SQBS INSTRUCTION.

1886 — INCREMENT THE SQBS BUFFER NUMBER (BNUM) BY ONE.

1888 — DECREMENT THE SQBS COUNT FIELD

1890 — SQBS COUNT = 0? N →

1894 END ← UNLOCK QSD LOCK
1892

IF LAST QDIO BUFFER TO TRANSFER AT THIS TIME, THEN ISSUE A SIGA-wt — 1896

*fig. 18D*

| PROGRAM | Z/VM HOST | MACHINE |
|---|---|---|

1950 — PROCESSING COMPLETED BY THE HOST ← NO(PEI) — 3) CAN THE LOCK BE ACQUIRED IN A REASONABLE AMOUNT OF TIME? 1948

1954 — PROCESSING COMPLETED BY THE HOST ← NO(PEI) — 4) ARE THE REQUEST-ACTIVE AND CONSTRUCTION-COMPLETE BITS BOTH ON AND THE REQUEST-ID POSTED BIT OFF IN THE FOB FLAG? 1952

1956 — 5) SET THE REQUEST-ID-POSTED BIT IN THE HEAD FOB FLAG FIELD ON.

1958 — 6) THE FOLLOWING LOGIC OCCURS FOR THE HEAD FOB WHICH REPRESENTS THE REQUEST AND ALL COMPONENT FOBs THAT MAY BE ASSOCIATED AND LINKED OFF THE HEAD FOB, THE HEAD FOB BEING PROCESSED LAST:

1962 — PROCESSING COMPLETED BY THE HOST ← NO(PEI) — a) FOR EACH NON-ZERO PTE-ADDRESS ARRAY ENTRY IN THE FOB THAT IS WITHIN THE RANGE SPECIFIED BY THE FOB PTE-COUNT, THE UNPIN FUNCTION IS INVOKED. WAS THE UNPIN FUNCTION SUCCESSFUL? 1960

*fig. 19C*

| PROGRAM | Z/VM HOST | MACHINE |
|---------|-----------|---------|
| | 1964 → | b) IF THIS IS A COMPONENT FOB, THEN REMOVE IT FROM THE REQUEST COMPONENT FOB LIST ANCHORED OFF THE HEAD FOB. |
| | 1966 → | c) IF THIS IS A HEAD FOB, PERFORM ACTIONS. |
| | 1968 → | d) CLEAR PRESPECIFIED WORDS OF THE FOB. INSERT IT AT THE BEGINNING OF THE AVAILABLE-FOB LIST (AFOBL) AND INCREMENT THE AVAILABLE-FOB COUNT BY ONE. |
| | 1970 → | 7) RELEASE THE OUTPUT QUEUE QSD LOCK. 8) TURN OFF BUFFER SYNCHRONIZATION REQUIRED AND EQBS |
| | 1972 → | OPERATON REQUIRED IN THE SBAL AND INCREMENT THE STATE TRANSITION COUNT BY ONE. |
| | 1974 → | IF THE ACKNOWLEDGED INPUT BUFFER CONTROL IS ON AND THE VALUE IN THE SQBN INDICATES INPUT-BUFFER-PRIMED, THEN SET THE SQBN TO THE INPUT-BUFFER-ACKNOWLEDGED STATE. |
| | 1976 → | INCREMENT THE EQBS BUFFER NUMBER (BNUM) |
| | 1978 → | DECREMENT THE EQBS COUNT FIELD |

*fig. 19D*

FACILITATING MANAGEMENT OF STORAGE OF A PAGEABLE MODE VIRTUAL ENVIRONMENT ABSENT INTERVENTION OF A HOST OF THE ENVIRONMENT

CROSS-REFERENCE TO RELATED APPLICATIONS

This application is a continuation of U.S. patent application Ser. No. 10/854,990, filed May 27, 2004, entitled "FACILITATING MANAGEMENT OF STORAGE OF A PAGEABLE MODE VIRTUAL ENVIRONMENT ABSENT INTERVENTION OF A HOST OF THE ENVIRONMENT," the entirety of which is hereby incorporated herein by reference.

TECHNICAL FIELD

This invention relates, in general, to input/output (I/O) processing, and, in particular, to facilitating management of virtual storage used during I/O processing.

BACKGROUND OF THE INVENTION

Strides are continuously being made towards improving the efficiency of input/output (I/O) processing; however, further enhancements are still needed. As one example, enhancements are needed in the managing of virtual storage used during input/output processing. For instance, improvements are needed in the handling of page faults in pageable mode virtual environments.

Currently, when a guest operating system executing in a pageable mode virtual machine performs an operation that references a page of data that is not currently backed by physical storage, a page fault interruption to the host occurs. The interruption causes context-switching overhead to move from guest to host execution mode; host page allocation; host page table fix-up; and another host-initiated context switch to move from host to guest execution mode. The context switching and/or other processing results in a great deal of overhead causing a degradation in efficiency and an increase in costs.

Other aspects of virtual storage management, including, for instance, the pining of pages in physical storage and the unpinning of pinned pages during the management of guest I/O buffer pages, such as during guest and host queue synchronization that is required for the virtualization of the Queued Direct I/O (QDIO) architecture, also need improving to reduce overhead and decrease costs.

Thus, a need exists for a capability that enhances input/output processing. For example, a need exists for a capability that facilitates management of storage of a pageable mode virtual environment.

SUMMARY OF THE INVENTION

The shortcomings of the prior art are overcome and additional advantages are provided through the provision of a method of facilitating management of storage of a pageable mode virtual environment. The method includes, for instance, managing storage of a pageable mode virtual environment, the managing being performed by a CPU of the pageable mode virtual environment absent intervention of a host of the pageable mode virtual environment, wherein the managing includes resolving by the CPU a storage fault absent intervention by the host and eliminating context switching overhead between the host and a guest of the pageable mode virtual environment.

Examples of managing storage include resolving storage faults, pinning pages in physical storage and unpinning pinned pages.

Systems and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 8a-8c depict one embodiment of the logic associated with a Set QDIO Buffer State instruction for use with network protocol I/O requests, in accordance with an aspect of the present invention;

FIGS. 18a-18d depict one embodiment of the logic associated with a Set QDIO Buffer State instruction for use with fibre channel protocol I/O requests; and FIGS. 19a-19e depict one embodiment of the logic associated with an Extract QDIO Buffer State instruction for use with fibre channel protocol I/O requests.

BEST MODE FOR CARRYING OUT THE INVENTION

In accordance with an aspect of the present invention, I/O operation requests from pageable storage guests (e.g., V=V guests) are interpreted without host intervention. For example, a capability is provided which allows a host, such as a z/VM® hypervisor, and hardware/firmware of a processor, such as a zSeries processor, to interact with each other in a controlled cooperative manner in order to process V=V guest operating system QDIO operations without requiring the transfer of control from/to the guest operating system and the host.

Further, in another aspect of the present invention, Host Page Management Assist functions are provided that can be invoked during the interpretation of a pageable storage mode guest. These functions include a resolve host page function used to dynamically resolve a host page invalid condition; a pin host page function used to indicate that the contents of a host page are pinned in a host page frame; and an unpin host page by virtual address function and/or an unpin host page by PTE address function used to indicate that the contents of a host page are no longer pinned in a host page frame.

Figure 1A:
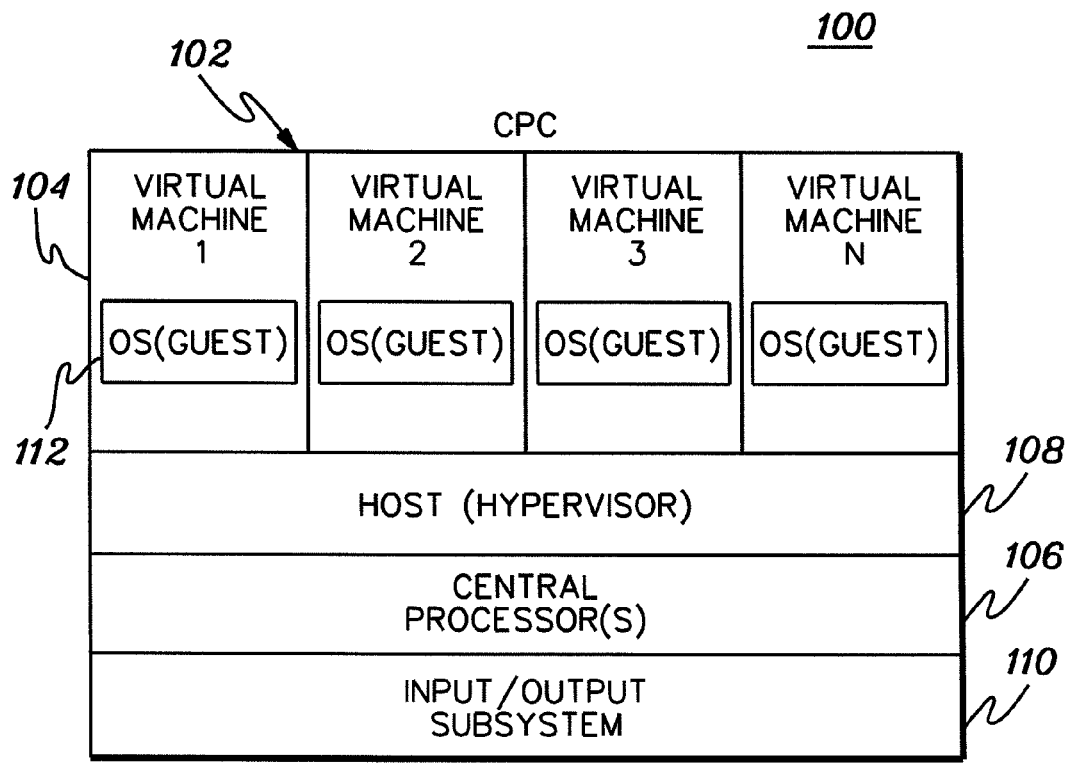
FIG. 1a depicts one embodiment of a computing environment to incorporate and use one or more aspects of the present invention.

One embodiment of a computing environment to incorporate and use one or more aspects of the present invention is described with reference to FIG. 1a. Computing environment 100 is based, for instance, on the z/Architecture offered by International Business Machines Corporation, Armonk, N.Y. The z/Architecture is described in an IBM® publication entitled, "z/Architecture Principles of Operation," IBM® Publication No. SA22-7832-02, June 2003, which is hereby incorporated herein by reference in its entirety. (IBM® is a registered trademark of International Business Machines Corporation, Armonk, N.Y., USA. Other names used herein may be registered trademarks, trademarks, or product names of International Business Machines Corporation or other companies.) In one example, a computing environment based on the z/Architecture includes an eServer zSeries, offered by International Business Machines Corporation, Armonk, N.Y.

As one example, computing environment 100 includes a central processor complex (CPC) 102 providing virtual machine support. CPC 102 includes, for instance, one or more virtual machines 104, one or more central processors 106, at least one host 108 (e.g., a control program, such as a hypervisor), and an input/output subsystem 110, each of which is described below.

The virtual machine support of the CPC provides the ability to operate large numbers of virtual machines, each capable of hosting a guest operating system 112, such as Linux. Each virtual machine 104 is capable of functioning as a separate system. That is, each virtual machine can be independently reset, host a guest operating system, and operate with different programs. An operating system or application program running in a virtual machine appears to have access to a full and complete system, but in reality, only a portion of it is available.

In this particular example, the model of virtual machines is a V=V model, in which the memory of a virtual machine is backed by virtual memory, instead of real memory. Each virtual machine has a virtual linear memory space. The physical resources are owned by host 108, and the shared physical resources are dispatched by the host to the guest operating systems, as needed, to meet their processing demands. This V=V virtual machine model assumes that the interactions between the guest operating systems and the physical shared machine resources are controlled by the host, since the large number of guests typically precludes the host from simply partitioning and assigning the hardware resources to the configured guests. One or more aspects of a V=V model are further described in an IBM publication entitled "z/VM: Running Guest Operating Systems," IBM Publication No. SC24-5997-02, October 2001, which is hereby incorporated herein by reference in its entirety.

Central processors 106 are physical processor resources that are assignable to a virtual machine. For instance, virtual machine 104 includes one or more logical processors, each of which represents all or a share of a physical processor resource 106 that may by dynamically allocated to the virtual machine. Virtual machines 104 are managed by host 108. As examples, the host may be implemented in microcode running on processors 106 or be part of a host operating system executing on the machine. In one example, host 108 is a VM hypervisor, such as z/VM®, offered by International Business Machines Corporation, Armonk, N.Y. One embodiment of z/VM® is described in an IBM publication entitled "z/VM: General Information Manual," IBM Publication No. GC24-5991-04, October 2001, which is hereby incorporated herein by reference in its entirety.

Figure 1B:
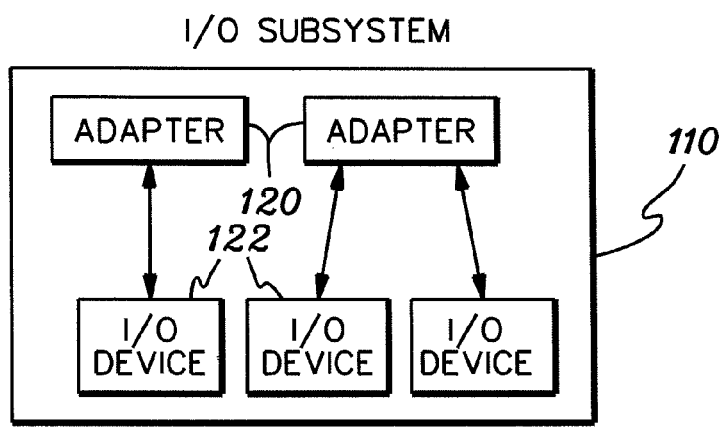
FIG. 1b depicts further details of an I/O subsystem of FIG. 1a, in accordance with an aspect of the present invention.

Input/output subsystem 110 directs the flow of information between devices and main storage. It is coupled to the central processing complex, in that it can be part of the central processing complex or separate therefrom. The I/O subsystem relieves the central processors of the task of communicating directly with the I/O devices coupled to the CPC and permits data processing to proceed concurrently with I/O processing. In one embodiment, the I/O subsystem is based on the Queued Direct I/O (QDIO) architecture, one example of which is described in a United States Patent entitled "Method And Apparatus For Providing Configuration Information Using A Queued Direct Input-Output Device," Markos et al., U.S. Pat. No. 6,519,645 B2, issued Feb. 11, 2003, which is hereby incorporated herein by reference in its entirety. Further details regarding I/O subsystem 110 are described with reference to FIG. 1b.

I/O subsystem 110 includes a plurality of adapters 120 coupled to a plurality of I/O devices 122. A particular adapter may be coupled to one or more I/O devices and an I/O device may be coupled to one or more adapters.

An example of an adapter is a QDIO adapter. A QDIO adapter provides the functions typically associated with an input/output control unit as well as the functions typically associated with an input/output channel. A QDIO adapter has the ability to directly access main storage for the purpose of exchanging data with a program that has access to the same main storage.

A logical representation of the QDIO adapter is a QDIO control unit. There may be more than one QDIO control unit representing the same QDIO adapter.

The QDIO adapter is connected to other elements in the CPC via a channel path that provides a data transmission path between the adapter and main storage. To transmit data received from an attached I/O device or network of devices to a program, the adapter uses a QDIO input queue located within main storage. Similarly, to transmit data to a QDIO adapter, which in turn may transmit data to an attached I/O device or network of devices, a program uses a QDIO output queue.

There may be a plurality of (e.g., 32) input queues and output queues available to a particular adapter. To indicate which queues are available to a particular adapter, a logical structure referred to as a QDIO subchannel is employed. The QDIO subchannel includes zero or more input queues and zero or more output queues, and one or more subchannels are associated with a particular adapter giving the adapter access to those queues.

For both QDIO input queues and QDIO output queues, main storage (e.g., host storage) is used as the medium by which data is exchanged between the program and the adapter. Additionally, these queues provide the ability for both the program and the adapter to directly communicate with each other in an asynchronous manner that is both predictable and efficient without requiring the services of a centralized controlling mechanism, such as an operating system input/output supervisor, and the resulting overhead such a control mechanism implies. Both input and output queues are constructed in main storage by the program and are established and activated at the QDIO adapter. These queues are used in communications during processing of I/O operations.

In accordance with an aspect of the present invention, the host (e.g., z/VM) and processor (e.g., zSeries) hardware/firmware interact with each other in a controlled cooperative manner in order to process V=V guest operating system QDIO operations without requiring transfer of control from/to the guest operating system and the host. Guest QDIO operations may take advantage of a facility called QDIO Enhanced Buffer State Management (QEBSM), and when this is done, the operations can directly pass through the host to/from the QDIO adapter without host intervention via a facility referred to as the QDIO Enhanced Buffer State Management Interpretation (QEBSMI) facility that allows selected instructions to be interpretatively executed for a pageable storage mode guest. One example of interpretive execution (e.g., Start Interpretive Execution (SIE)) is described in System/370 Extended Architecture/Interpretive Execution, IBM Publication No. SA22-7095-01, September 1985, which is hereby incorporated herein by reference in its entirety.

Figure 2A:
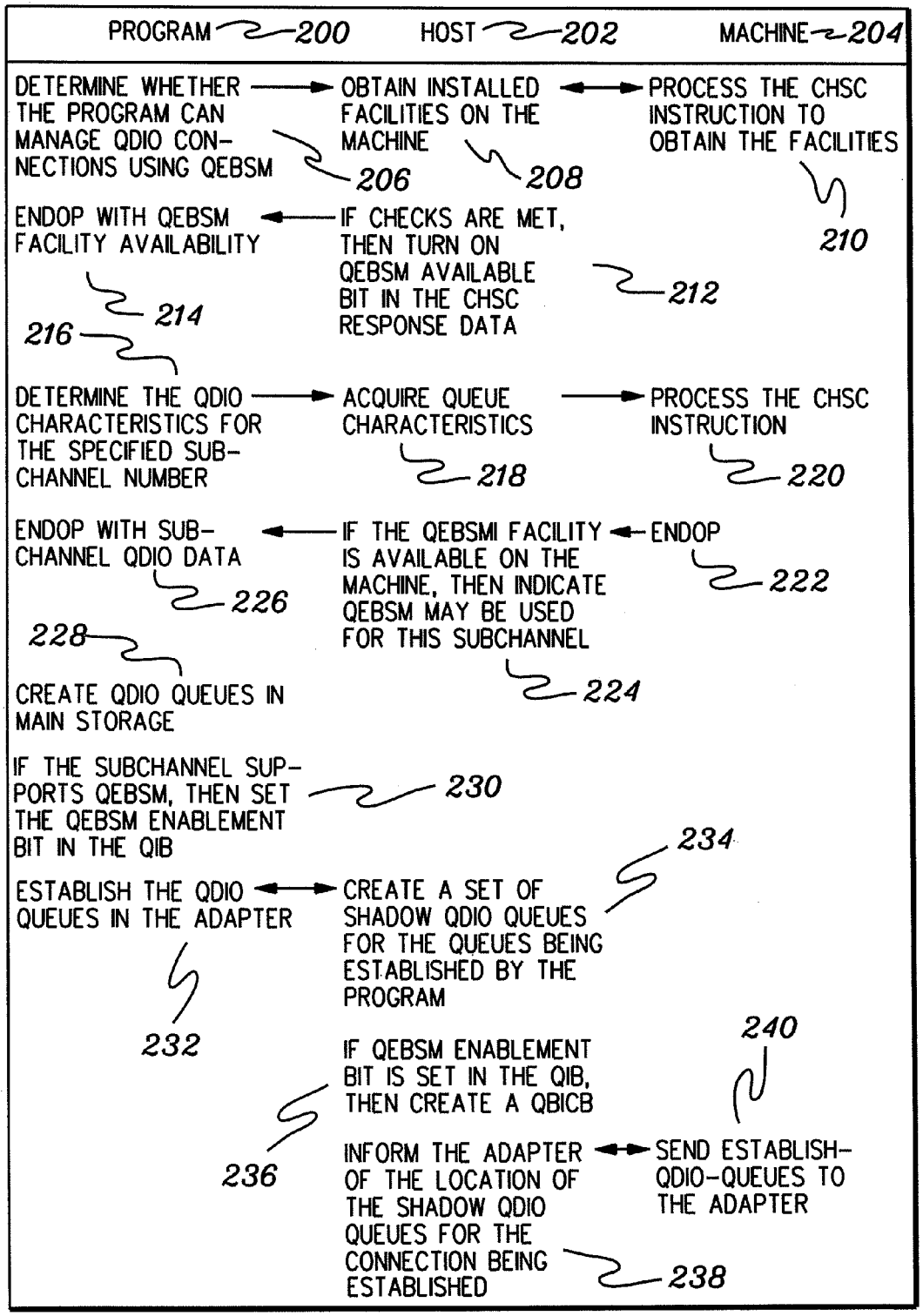
FIGS. 2a-2b depict one embodiment of the logic associated with guest configuration, in accordance with an aspect of the present invention.

In order to configure a system to be able to use QEBSM and QEBSMI various configuration tasks are performed. As described with reference to FIGS. 2a-2b, these tasks are performed by a program (e.g., a guest program) 200, a host (e.g., z/VM) 202, and a machine 204 (e.g., a processor) on which the guest and host run.

In one embodiment, guest program 200 (FIG. 2a) determines whether the program can manage QDIO connections using QEBSM, STEP 206. This determination is made via, for instance, a Channel Subsystem Call (CHSC) Store Channel Subsystem Characteristics command, which is issued by the program to the host. The host, in turn, issues a CHSC Store Channel Subsystem Characteristics instruction to the hardware to obtain the installed facilities on the machine, STEP 208. The machine processes the CHSC instruction, STEP 210, and passes the information back to the host.

The Store Channel Subsystem Characteristics command is used to store information about the characteristics of the I/O subsystem. The execution of the Store Channel Subsystem Characteristics command does not change any information contained in the I/O subsystem. The Store Channel Subsystem Characteristics command is executed synchronously and is not interpretively executed.

Figure 3A:
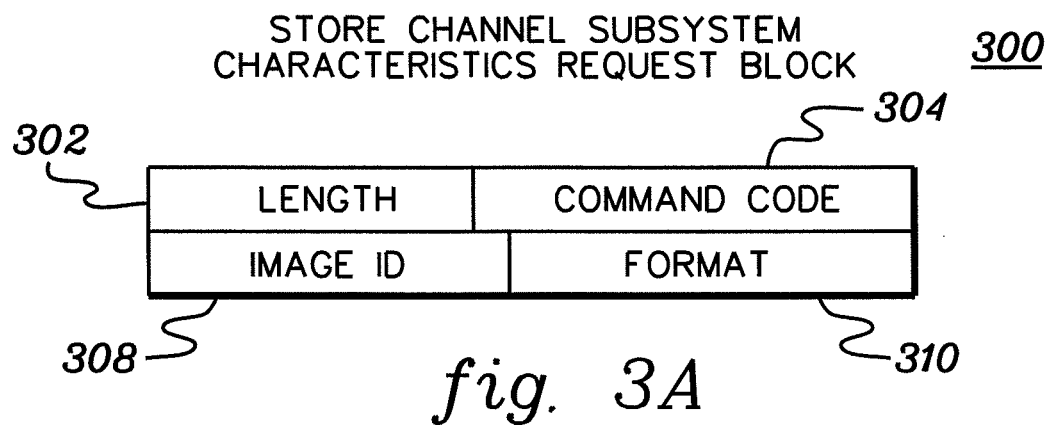
FIG. 3a depicts one example of a request block for a Store Channel Subsystem Characteristics command, in accordance with an aspect of the present invention.

One embodiment of a request block for a Store Channel Subsystem Characteristics command is described with reference to FIG. 3a. A command request block 300 includes, for instance:

(a) Length Field 302: This field specifies the length of the command request block.

(b) Command Code 304: This field specifies the Store Channel Subsystem Characteristics command.

(c) Image Id (IID) 308: The IID field includes zeros, as one example.

(d) Format 310: The command request format field includes an unsigned integer whose value specifies the layout of the command request block.

Figure 3B:
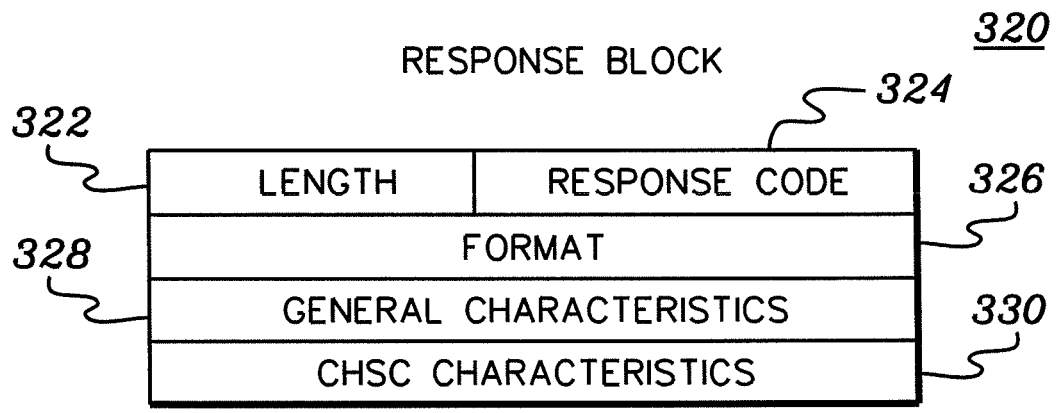
FIG. 3b depicts one example of a response block for the Store Channel Subsystem Characteristics command, in accordance with an aspect of the present invention.

One embodiment of a response block for a Store Channel Subsystem Characteristics command is described with reference to FIG. 3b. In one example, a response block 320 includes the following:

(a) Length Field 322: This field specifies the length of the command response code that is stored as a result of an attempt to execute the Store Channel Subsystem Characteristics command.

If a response code other than an indication of success is stored in the response code field, no characteristics information is stored as a result of the attempt to execute the command, and the length field specifies a length of, for instance, eight bytes, for the command response block.

If a response code indicating success is stored in the response code field, both general characteristics and CHSC command characteristics are stored in the command response block. Thus, the length field specifies a command response block length of, for instance, 4,080 bytes.

(b) Response Code 324: This field includes an unsigned binary integer that describes the results of the attempt to execute the Store Channel Subsystem Characteristics command.

(c) Format 326: The command response format field includes an unsigned integer whose value specifies the layout of the command response block.

(d) General Characteristics 328: If a response code indicating success is stored in the response code field, the general characteristics field includes information that specifies which of a variety of facilities are provided by the I/O subsystem. Some facilities include, for instance, CHSC Subchannel; Dynamic I/O Configuration Facilities; Message Processor Channel Configuration Facility; QDIO Enhanced Buffer State Management Facility; QDIO Enhanced Buffer State Management Interpretation (QEBSMI) Facility, etc. Although various facilities are described herein, other or different facilities may exist. When a bit of the general characteristics field corresponding to a particular facility is one, it indicates that that facility is provided.

(e) CHSC Characteristics 330: If a successful response code is stored in the response code field, the CHSC characteristics field includes information that specifies whether certain CHSC commands are provided by the I/O subsystem. Examples of these commands include, for instance, Change Channel Path Configuration, Change Control Unit Configuration, Change I/O Device Configuration, Store Configuration Component List, Store Domain Configuration Component List, and Set Domain Attributes, as well as others. When a bit of the CHSC characteristics field corresponding to a particular command is one, that command is provided.

Returning to FIG. 2a, in response to the host receiving the list of installed facilities, the host determines whether the QDIO Enhanced Buffer State Management Interpretation (QEBSMI) facility is installed on the machine, STEP 212. Should QEBSMI be installed and the subchannel be QDIO capable, then the host turns on a QEBSM available indicator in the CHSC response data indicating that the QEBSM facility is available. Thus, the command ends with an indication of QEBSM facility availability, STEP 214.

Next, a determination is made as to the QDIO characteristics for the specified subchannel number, STEP 216. In one example, this determination is made via a CHSC Store Subchannel QDIO Data command issued by the program to the host. The host then issues the instruction to the real subchannel in order to acquire the queue characteristics, STEP 218. The machine processes the instruction, STEP 220.

The Store Subchannel QDIO Data command is used to obtain self-description information for the QDIO adapters associated with a specified range of subchannels.

Execution of the Store Subchannel QDIO Data command does not change any information contained in the I/O subsystem. In one example, it is executed synchronously.

Figure 4A:
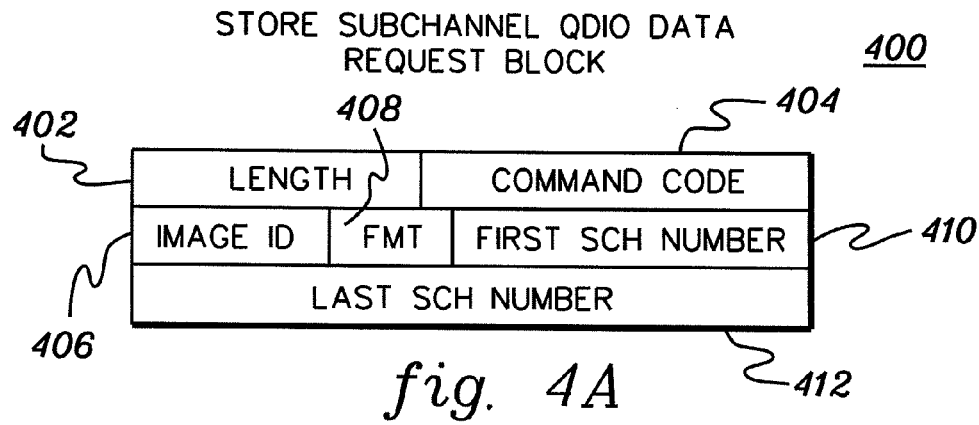
FIG. 4a depicts one example of a request block for a Store Subchannel QDIO Data Command, in accordance with an aspect of the present invention.

A command request block 400 (FIG. 4a) for a Store Subchannel QDIO Data command includes, for instance:

(a) Length Field 402: This field specifies the length of the command request block.

(b) Command Code 404: This field specifies the Store Subchannel QDIO Data command.

(c) Image ID (IID) 406: The IID field includes a value of zero, in this embodiment.

(d) Format (FMT) 408: The command request format field includes an unsigned integer whose value specifies the layout of the command request block.

(e) First Subchannel Number 410: This field specifies the subchannel number identifying the first subchannel for which QDIO adapter information is requested.

(f) Last Subchannel Number 412: This field specifies the subchannel number identifying the last subchannel for which QDIO adapter information is requested.

Figure 4B:
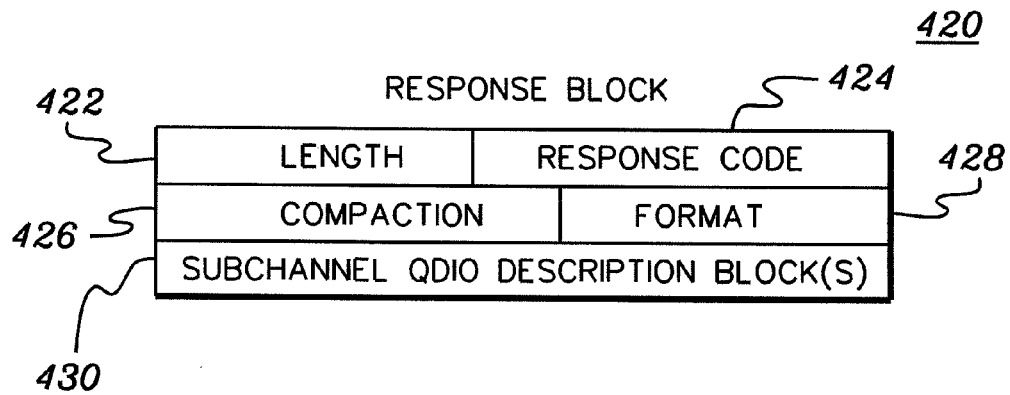
FIG. 4b depicts one example of a response block for the Store Subchannel QDIO Data Command, in accordance with an aspect of the present invention.

One embodiment of a response block for the Store Subchannel QDIO Data command is described with reference to FIG. 4b. In one example, a response block 420 includes, for instance:

(a) Length Field 422: This field specifies the length of the command response block. The length depends on the response code that is stored as a result of the attempt to execute the Store Subchannel QDIO Data command.

If a response code other than an indication of success is stored in the response code field, no subchannel QDIO description blocks are stored as a result of the attempt to execute the command, and the length field specifies a length of, for instance, eight bytes for the command response block.

If a response code indicating success is stored in the response code field, at least one subchannel QDIO description block is stored in the command response block as a result of the execution of the command, and the length specifies a command response block length of, for instance, eight bytes plus 32 bytes for each of the subchannel QDIO description blocks that is stored.

(b) Response Code 424: This field includes an unsigned binary integer that describes the results of the attempt to execute the Store Subchannel QDIO Data command.

(c) Compaction (C) 426: This field specifies whether the subchannel QDIO description blocks are compacted.

When one, the C bit specifies that the description blocks are compacted. That is, only those description blocks for which the subchannel is designated as being QDIO capable are stored. Description blocks for subchannels that are not QDIO capable are not stored in the response block.

When zero, the C bit specifies that the description blocks are not compacted. That is, description blocks are stored in the response block without regard to whether they describe QDIO capable subchannels. For as many description blocks as are stored within the requested range of subchannels, each possible subchannel number is represented by a description block.

(d) Format (FMT) 428: The command response format field includes an unsigned integer whose value specifies the layout of the command response block. The value of this field is, for instance, 0.

(e) Subchannel QDIO Description Block(s) 430: When a successful response code is stored, up to 127 32-byte (as one example) subchannel QDIO description blocks are stored in the response data area of the command response block. The number of subchannel QDIO description blocks stored depends on the number of subchannels in the range specified in the command request block, conditions in the I/O subsystem when CHSC is executed, and the I/O subsystem model.

At least one subchannel QDIO description block is stored, and the actual number of blocks stored is determined by subtracting eight bytes from the size of the command response block and dividing the remainder by 32.

Subchannel QDIO description blocks are stored for some or all of the specified subchannels, beginning with the subchannel specified by the first subchannel number field. Subchannel QDIO description blocks are stored in ascending order of subchannel numbers.

Figure 4C:
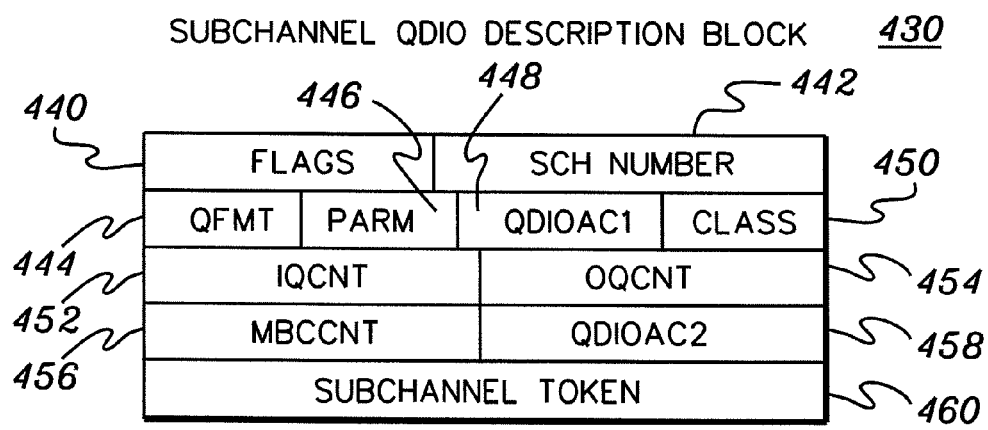
FIG. 4c depicts one example of a subchannel QDIO description block of the response block of FIG. 4b, in accordance with an aspect of the present invention.

One example of a subchannel QDIO description block is described with reference to FIG. 4c. Subchannel QDIO description block 430 includes, for instance:

(a) Flags 440: This field includes information regarding the contents of the subchannel QDIO description block. The meaning of bits 0-7 is as follows, in one example:

| Bit | Meaning |
|---|---|
| 0 | QDIO Capable: When one, bit 0 indicates that the I/O device associated with the specified subchannel is capable of performing QDIO operations. When zero, bit 0 indicates that the I/O device associated with the specified subchannel is not capable of performing QDIO operations. |

| Bit | Meaning |
|---|---|
| 1 | Validity: When one, bit 1 indicates that the subchannel QDIO description block is valid. When zero, bit 1 indicates that the subchannel QDIO description block is not valid: except for bits 0, 1 and 2, and the subchannel number field, the contents of the subchannel QDIO description block have no meaning. Bit 1 is zero for subchannels that are not designated as having the QDIO capability (i.e., when bit 0 is one). |
| 2 | Last QDIO Subchannel: When one, bit 2 indicates that there are no higher numbered subchannels that have QDIO capability. When zero, bit 2 indicates that there exist higher numbered subchannels that have QDIO capability. |

(b) Subchannel Number 442: This field specifies the subchannel to which the information in this subchannel QDIO description block applies.

(c) QDIO Queues Format (QFMT) 444: This field includes an unsigned binary integer that identifies the format of the QDIO queues that can be used on the specified subchannel.

(d) Parm 446: This field includes parameter information regarding the subchannel or device represented by the subchannel QDIO description block.

(e) QDIO Adapter Characteristics 1 (QDIOAC1) 448: This field describes model-dependent characteristics of the QDIO adapter associated with the specified subchannel. The meaning of bits 0-7 is as follows, in one example:

| Bit | Meaning |
|---|---|
| 0 | Unsolicited Input Queue Interruption: When one, bit 0 indicates that the QDIO adapter can dynamically initiate the presentation of unsolicited input queue progress-reporting interruptions to the program when buffers have made a transition to the primed state while the subchannel is in the QDIO active state. These interruptions are presented independently of the solicited interruptions that are presented as a result of the program having set input queue interruption request indicators in input queue SBALs, described below, when input queue interruption requests are supported.<br>When zero, bit zero indicates that the QDIO adapter does not initiate the presentation of unsolicited input queue progress reporting interruptions to the program. |
| 1 | SIGA Initiate Input Queue: When bit 1 is one and bit 7 is zero, the QDIO adapter requires that the program execute SIGNAL ADAPTER - read by subchannel (SIGA-r). When bit 1 is one and bit 7 is one, the QDIO adapter requires that the program execute SIGNAL ADAPTER - ready by token (SIGA-rt). One example of SIGA is described in U.S. Pat. No. 6,332,171, entitled "Self-Contained Queues With Associated Control Information For Receipt And Transfer Of Incoming And Outgoing Data Using A Queued Direct Input-Output Device," issued Dec. 18, 2001; U.S. Pat. No. 6,519,645, entitled "Method And Apparatus Of Simulation Of Data In A Virtual Environment Using A Queued Direct Input-Output Device," issued Feb. 5, 2002; and U.S. Pat. No. 6,345,241, entitled "Method And Apparatus For Providing Configuration Information Using A Queued Direct Input-Output Device," issued Feb. 11, 2003, each of which is hereby incorporated herein by reference in its entirety.<br>When zero, bit 1 indicates that the QDIO adapter does not require that the program execute SIGA-r or SIGA-rt. |
| 2 | SIGA Initiate or Process Output Queue: When bit 2 is one and bit 7 is zero, the QDIO adapter requires that the program execute SIGNAL ADAPTER - write by subchannel (SIGA-w) for the reasons stated in the description of that instruction. When bit 2 is one and bit 7 is one, the QDIO adapter requires that the program execute SIGNAL ADAPTER - write by token (SIGA-wt).<br>When zero, bit 2 indicates that the QDIO adapter does not require that the program execute SIGA-w or SIGA-wt. |
| 3 | SIGA Synchronize: When bit 3 is one and bit 7 is zero, the QDIO adapter requires that the program execute SIGNAL ADAPTER - synchronize by subchannel (SIGA-s). When bit 3 is one and bit 7 is one, the program may execute SIGNAL ADAPTER - logout by token (SIGA-lt).<br>When zero, bit 3 indicates that the QDIO adapter does not require that the program execute SIGA-s. |
| 4 | Adapter Interruption Queue Synchronization Assist Active: When bit 4 is one, the adapter interruption queue synchronization assist is active. When the assist is active and SIGA-s is required (bit 3 is one and bit 7 is zero), the input and output queues associated with the adapter associated with the specified subchannel will be dynamically synchronized prior to the interruption. Therefore, there is no need for the program to issue a SIGA-s instruction immediately after an adapter interruption facility (AIF) interruption.<br>When bit 4 is zero, the adapter interruption queue synchronization assist is not active. |
| 5 | PCI Interruption Queue Synchronization Assist Active: When bit 5 is one, the PCI interruption queue synchronization assist is active. When the assist is active and SIGA-s is required (bit 3 is one and bit 7 is zero), output queues associated with the specified subchannel will be dynamically synchronized prior to the interruption. Therefore, there is no need for the program to issue a SIGA-s instruction immediately after a PCI interruption.<br>When bit 5 is zero, the PCI interruption queue synchronization assist is not active.<br>Bits 4 and 5 of the QDIOAC1 field are set by the host. |
| 6 | QEBSM Available: When one, bit 6 indicates that QDIO Enhanced Buffer State Management is available for enablement for the specified subchannel.<br>When zero, bit 6 indicates that QDIO Enhanced Buffer State Management is not available for enablement for the specified subchannel.<br>This field is set by the host based on the setting of a specified bit of the general characteristics that are stored in response to the CHSC Store Channel Subsystem Characteristics command. |
| 7 | QEBSM Enabled: When one, bit 7 indicates that the specified subchannel is enabled for QDIO Enhanced Buffer State Management and, as a result, the following are true:<br>The QDIO buffer states associated with the specified subchannel are not accessible in an SLSB, described below, in program storage. Rather, the program uses the Set QDIO Buffer State and Extract QDIO Buffer State instructions.<br>The subchannel token field includes a subchannel token.<br>When zero, bit 7 indicates that the specified subchannel is not enabled for QDIO Enhanced Buffer State Management and that the QDIO buffer states are accessible in an SLSB in program storage that may be directly manipulated by the program.<br>This field is set by the host based on whether the specified subchannel is enabled for QDIO Enhanced Buffer State Management Interpretation (QEBSMI). Bit 7 may also be set by the host when the host is fully emulating the adapter (e.g., during guest tracing). (Refer to the CHSC Set Channel Subsystem Characteristics command, described below, for a description of how a QDIO subchannel is enabled for QEBSMI.) |

The QDIO buffer states associated with the specified subchannel are not accessible in an SLSB, described below, in program storage. Rather, the program uses the Set QDIO Buffer State and Extract QDIO Buffer State instructions.

The subchannel token field includes a subchannel token.

When zero, bit 7 indicates that the specified subchannel is not enabled for QDIO Enhanced Buffer State Management and that the QDIO buffer states are accessible in an SLSB in program storage that may be directly manipulated by the program.

This field is set by the host based on whether the specified subchannel is enabled for QDIO Enhanced Buffer State Management Interpretation (QEBSMI). Bit 7 may also be set by the host when the host is fully emulating the adapter (e.g., during guest tracing). (Refer to the CHSC Set Channel Subsystem Characteristics command, described below, for a description of how a QDIO subchannel is enabled for QEBSMI.)

(f) Class 450: This field includes an unsigned binary integer that identifies the class of I/O device that is associated with the specified subchannel. One example of a class is communications controller.

(g) Input Queue Count (IQCNT) 452: This field includes an unsigned binary integer specifying the number of input QDIO queues that are used by the QDIO adapter to perform I/O operations.

(h) Output Queue Count (OQCNT) 454: This field includes an unsigned binary integer specifying the number of output QDIO queues that are used by the QDIO adapter to perform I/O operations.

(i) Maximum Buffer Chain Count (MBCCNT) 456: When this field is not zero, it includes an unsigned integer count of the maximum number of chained buffers (i.e., chained SBALs, described below) supported by the adapter. When this field is zero and the QFMT field indicates that format 1 queues (e.g., FCP) are used on the specified subchannel, a maximum of 36 buffers may be chained. When this field is zero and the QFMT field indicates that the format 1 queues are not used on the specified subchannel, buffer chaining is not supported by the adapter.

(j) QDIO Adapter Characteristics 2 (QDIOAC2) 458: This field describes model dependent characteristics of the QDIO adapter associated with the specified subchannel. The meaning of bits 0-3 is as follows, in one example:

| Bit | Meaning |
|---|---|
| 0 | Input Queue Interruption Requests Supported: When one, bit 0 indicates that the adapter supports the interruption request bit in the SBALF 0 field of the input queue SBAL, described below. When bit 0 is one and bit 3 is zero, interruptions reporting the adapter's progress on the associated input queues strictly follow the program's requests. When bit 0 is one and bit 3 is one, interruptions reporting the adapter's progress on the associated input queue follow the program's requests and unsolicited progress reporting interruptions may also occur. When zero, bit 0 indicates that the adapter does not support the interruption request bit in the SBALF 0 field of the SBAL for input queues. |
| 1 | Output Queue Interruption Requests Supported: When one, bit 1 indicates that the adapter supports the interruption request bit in the SBALF 0 field of the output queue SBAL. Interruptions reporting the adapter's progress on the associated output queues strictly follow the program's requests. When zero, bit 1 indicates that the adapter does not support the interruption request bit in the SBALF 0 field of the SBAL for output queues. |
| 2 | Single Buffer Prefetch Active: When one, bit 2 indicates that the adapter prefetches, at most, one buffer in advance of the current buffer the adapter is processing. When zero, bit 2 indicates that the adapter may prefetch more than one buffer. |
| 3 | Unsolicited Input Queue Interruption Inactive: When one, bit 3 indicates that unsolicited input queue interruption is inactive for the adapter. When zero, bit 3 indicates that unsolicited input queue interruption is active for the adapter. When bit 3 is zero, QDIOAC1 bit 0 is one. |

(k) Subchannel Token 460: When bit 7 of the QDIOAC1 field is one, this field includes a token that is associated with the specified subchannel.

The subchannel token field is set by the host. If the specified subchannel is enabled for QEBSMI, the host sets the subchannel token field to the value of the host real or absolute address of a QDIO buffer information control block (QBICB) that is associated with the subchannel. (A QBICB is associated with a subchannel via a CHSC Set Channel Subsystem Characteristics command when the QDIO subchannel is enabled for QEBSMI, as described below.) The subchannel token may also be set by the host when the host is fully emulating the adapter. If the specified subchannel is not enabled for QEBSMI and the host is not emulating the adapter, zero is returned as the subchannel token value.

A subchannel token is used to designate the QDIO subchannel for QEBSM operations. When an action or event occurs that causes disestablishment of the QDIO queues from the subchannel, the subchannel token becomes stale and a new subchannel token is to be obtained before the program may again use QEBSM operations. The previously assigned token becomes invalid and may subsequently be assigned to another subchannel.

Adapter description information that is stored in the subchannel QDIO description block is current at the time the Store Subchannel QDIO Data command is executed. However, some of the adapter description information may change as a result of the successful completion of an Establish QDIO Queues CCW command, described below, by the specified adapter. Thus, the Store Subchannel QDIO Data command is to be reissued after successful completion of an Establish QDIO Queues CCW command to obtain the most current description for the following:

QDIOAC1 bit 1 (SIGA initiate input queue)
QDIOAC1 bit 2 (SIGA initiate or process output queue)
QDIOAC1 bit 3 (SIGA synchronize)
QDIOAC1 bit 7 (QEBSM enabled)
QDIOAC2 bit 2 (Single Buffer Prefetch Active)
QDIOAC2 bit 3 (Unsolicited Input Queue Interruption Inactive)
Subchannel Token The remaining adapter description information is current regardless of successful completion of an Establish QDIO Queues command.

Referring back to FIG. 2a, in response to completion of the CHSC Store Subchannel QDIO Data command, STEP 222, the host determines whether the QEBSMI facility is available on the machine, STEP 224. If QEBSMI is available, the subchannel is QDIO capable and the host supports QEBSM for this connection, then an indication is made in the CHSC response data that is returned to the program that QEBSM may be used for this subchannel. The program receives an end operation with the subchannel QDIO data, STEP 226.

Figure 5:
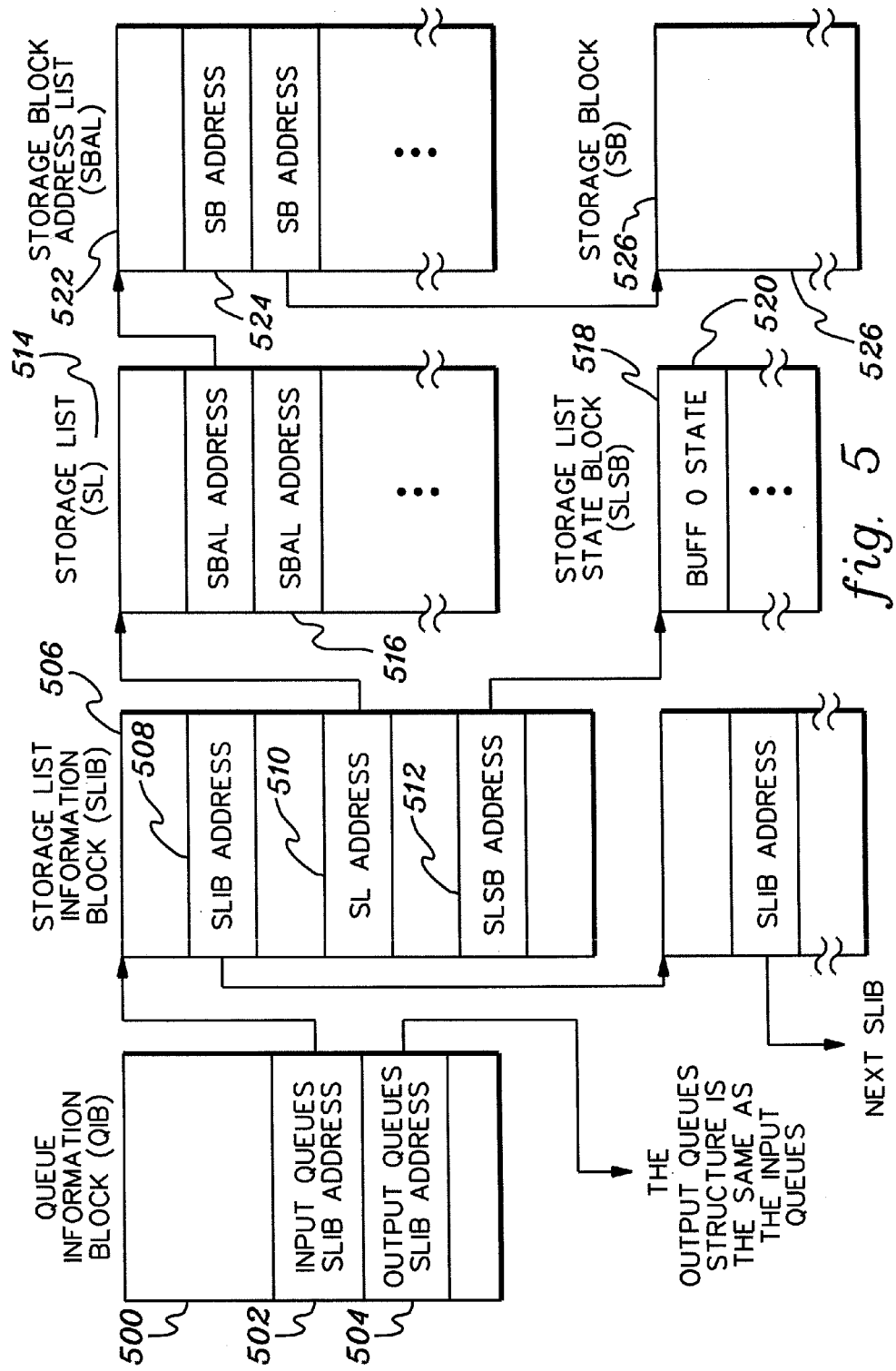
FIG. 5 depicts one embodiment of the data structures of a QDIO queue, in accordance with an aspect of the present invention.

Employing the information returned in CHSC response data, QDIO queues are created by the program in main storage, STEP 228. A QDIO queue includes data structures that describe the queue as well as buffer storage blocks that are used for data transfer. In one example, the multiple separate data structures, called queue components, that collectively describe the queue's characteristics and provide the controls to allow the exchange of data between the program and the adapter include, for instance:

1. Queue Information Block (QIB) 500 (FIG. 5): One QIB is defined per QDIO subchannel. The QIB provides information about the collection of input and output queues associated with the subchannel. The absolute address of the QIB is provided to the QDIO adapter by an Establish QDIO Queues command, described herein. The QIB has various fields, including, for instance, the following, some of which are depicted in FIG. 5:

(a) Queue Format (QFMT): This field includes an unsigned binary integer that identifies the format of the QDIO queues.

(b) Implementation Dependent Parameters Format (PFMT): This field includes an unsigned binary integer that identifies the format of the contents of the implementation dependent parameters.

(c) Request Flags (RFlags): This field includes request flags. One flag includes QDIO Enhanced Buffer State Management (QEBSM) enablement. When this bit is one at the time the Establish QDIO Queues CCW command is issued, a request to enable the subchannel for QEBSM is indicated.

(d) Adapter Characteristics (AC): This field includes information about the adapter's capabilities with respect to the set of input and output queues associated with the subchannel. The AC field is set to zeros by the program before the Establish QDIO Queues CCW command is issued but is not checked by the adapter.

This field is set by the adapter during execution of the Establish QDIO Queues CCW command, and is set to indicate the adapter supported values before the successful completion of the command. The meaning of bits 0-1 are as follows, in one example:

BitsMeaning

0 Input queue interruption requests supported: When zero, bit 0 indicates that the adapter does not support the interruption request bit in the SBALF 0 field (described below) of the SBAL for input queues.

When one, bit 0 indicates that the adapter supports the interruption request bit in the SBALF 0 field of the SBAL.

1 Output queue interruption requests supported: When zero, bit 1 indicates that the adapter does not support the interruption request bit in the SBALF 0 field of the SBAL for output queues. No interruptions reporting the adapter's process on the associated output queues are presented.

When one, bit 1 indicates that the adapter supports the interruption request bit in the SBALF 0 field of the SBAL.

(e) First Input Storage List Information Block (SLIB) Address 502: This field includes a logical address of the highest priority input queue SLIB for the subchannel with which the QIB is associated.

(f) First Output SLIB Address 504: This field includes a logical address of the highest priority output queue SLIB for the subchannel with which this QIB is associated.

(g) Adapter Identifier: This field includes a name that the program has assigned to the QDIO adapter for the subchannel with which the QIB is associated.

(h) Implementation Dependent Parameters: This field includes one or more implementation dependent parameters.

2. Storage List Information Block (SLIB) 506: One SLIB is defined for each queue. The SLIB provides information about the queue and each queue buffer usable in holding data. The absolute address of the SLIB is provided to the QDIO adapter by the Establish QDIO Queues command.

In one example, the storage list information block includes the following fields, some of which are depicted in FIG. 5:

(a) Next Storage List Information Block Address 508: If there is an additional lower priority SLIB for the same type of QDIO queue (input or output) for the same subchannel, this field includes the logical address of that SLIB.

(b) Storage List Address 510: This field includes the logical address of a control block called a storage list. A storage list includes the absolute addresses of storage block address lists (SBALs). Each SBAL includes the absolute addresses of up to, for instance, 16 storage blocks (e.g., pages). The collection of the storage blocks that can be located using the addresses in a single SBAL is called a QDIO buffer.

(c) Storage List State Block Address (SLSB) 512: This field includes the logical address of a storage list state block (SLSB), when the Enhanced QDIO Buffer State Management Enablement indicator in the QIB RFlags field is zero.

3. Storage List (SL) 514: One SL is defined for each queue. The SL includes, for instance, 128 entries, one entry for each of the QDIO I/O buffers associated with the queue. The SL provides information about the I/O buffer locations in main storage. Each entry includes the absolute address of a storage block address list 516, and each SBAL includes a list of absolute addresses of the storage blocks that collectively make up one of the 128 data buffers associated with this queue.

The absolute address of the storage list is provided to the QDIO adapter by the Establish QDIO Queues command.

4. Storage List State Block (SLSB) or Storage List State Logout (SLSL) 518: When the QDIO subchannel is enabled for enhanced QDIO management operations, one SLSL is defined for each queue and a corresponding SLSB also exists for each queue outside of program storage. The SLSL is 128 bytes in length and includes a logout of the SLSB that is made whenever Signal Adapter-logout by token (SIGA-lt) is executed or when the queues are disestablished from the adapter. The SLSB includes 128 entries 520, referred to as SQBNs (state of queue buffer N), one entry for each of the 128 I/O buffers associated with the queue. Each entry provides state information about its associated I/O buffer. The Set QDIO Buffer State and Extract QDIO Buffer State instructions, described herein, are used to access the state information in the SLSB. As examples, the state indicates whether the buffer is program owned or adapter owned and whether the buffer is an output buffer or input buffer.

The absolute address of the storage list state block is provided to the QDIO adapter by the Establish QDIO Queues command.

5. Storage Block Address List (SBAL) 522: One SBAL is defined for each of the 128 I/O buffers associated with each queue. The SBAL provides information about the storage block (SB) locations for an I/O buffer.

A storage block address list includes 16 entries called storage block address list entries (SBALEs) 524. Each SBALE includes the absolute storage address of a storage block 526. Collectively, the storage blocks addressed by the entries of a single SBAL constitute one of the 128 possible QDIO buffers of a QDIO queue.

In one example, a storage block address list entry includes:

(a) Flags: This field includes information about the SBALE contents.

(b) Virtualization Flags: When the QDIO Enhanced Buffer State Management Interpretation facility is installed, this field includes virtualization information. Changes to this field should be serialized under the control of the QSD lockword. In one example, bit 0 of this field represents a pinned page indicator. When bit 0 is 1, the host page corresponding to the data address in the data address field is pinned on behalf of this SBALE. When bit 0 is 0, the host page corresponding to the data address in the data address field is not pinned on behalf of this SBALE.

(c) SBAL Flags (SBALF): This field includes information about the buffer associated with the SBAL containing this SBALE, and not just about the storage block associated with this SBALE. In one example, bit 0 indicates that when the buffer is in or next returns to a program owned state, an EQBS operation is to be performed for the buffer before the next SQBS operation is performed for the buffer. Bit 1 indicates that when the buffer is in or next returns to a program owned state, this SBAL and its corresponding guest SBAL is to be synchronized as part of the next EQBS operation performed for the buffer. Buffer synchronization may include updating guest SBALEs from corresponding host SBALEs and also may include unpinning of host pages.

(d) Data Count: This field includes an unsigned binary integer that specifies the number of bytes of data to be read or written beginning at the address specified in the data address field.

(e) Data Address: This field includes the absolute address of a storage block including data that is to be written (output queue) or address of data to be read (input queue).

6. Storage Block (SB) 526: From one to 16 separate storage blocks (e.g., pages) are defined that collectively define a single I/O buffer.

Further details regarding QDIO queues are provided in U.S. Pat. No. 6,519,645, entitled "Method And Apparatus For Providing Configuration Information Using A Queued Direct Input-Output Device," Markos et al., issued Feb. 11, 2003, and U.S. Pat. No. 6,345,241, entitled "Method And Apparatus For Simulation Of Data In A Virtual Environment Using A Queued Direct Input-Output Device," Brice et al., issued Feb. 5, 2002, each of which is hereby incorporated herein by reference in its entirety.

Returning to FIG. 2a, subsequent to creating the queues, if the subchannel supports QEBSM, then the QEBSM enablement bit in the QIB is set to manage the connection using QEBSM, STEP 230.

Thereafter, the QDIO queues are established in the adapter, STEP 232. As one example, this is accomplished by the program issuing a Start Subchannel instruction with an Establish QDIO Queues Channel Command Word, an example of the processing of which is described in U.S. Pat. No. 6,332,171, entitled "Self-Contained Queues With Associated Control Information For Receipt And Transfer Of Incoming And Outgoing Data Using A Queued Direct Input-Output Device," Baskey et al., issued Dec. 18, 2001, which is hereby incorporated herein by reference in its entirety.

The Establish QDIO Queues Command is used to write a queue descriptor record (QDR) to the I/O device. The control unit (e.g., adapter) associated with the I/O device uses the information in the queue descriptor record to locate the QDIO control blocks that are used to establish prioritized data queues. These queues are subsequently used for the direct transmission of data to and from the I/O device.

The establish procedure causes the host to create a set of shadow QDIO queues in host storage for the queues being established by the program, STEP 234. That is, the host builds shadow versions of some of the QDIO control structures, including, for instance, the storage list and the storage block address list. Also, the SLSB is allocated in host storage, although it contains no addresses, because of its definition as the controlling mechanism for the programs and the adapters cooperating processes. The queue descriptor record associated with the Establish QDIO Queues command includes the main memory addresses of the QDIO queue components as seen by the program. The host translates those addresses, as well as addresses within the SL and SBALs, in building its own copy of the queue descriptor record and the shadow SL and SBALs. Further details regarding shadowing and processing associated with the QDR are included in the aforementioned United States patents that have been incorporated herein by reference in their entirety.

Subsequent to creating the shadow queues, if the QEBSM enablement bit is set in the QIB, then the host creates a structure, referred to as the QDIO Buffer Information Control Block (QBICB) in host storage to map both the guest's and the host's shadow QDIO queues to the machine, STEP 236.

Figure 6A:
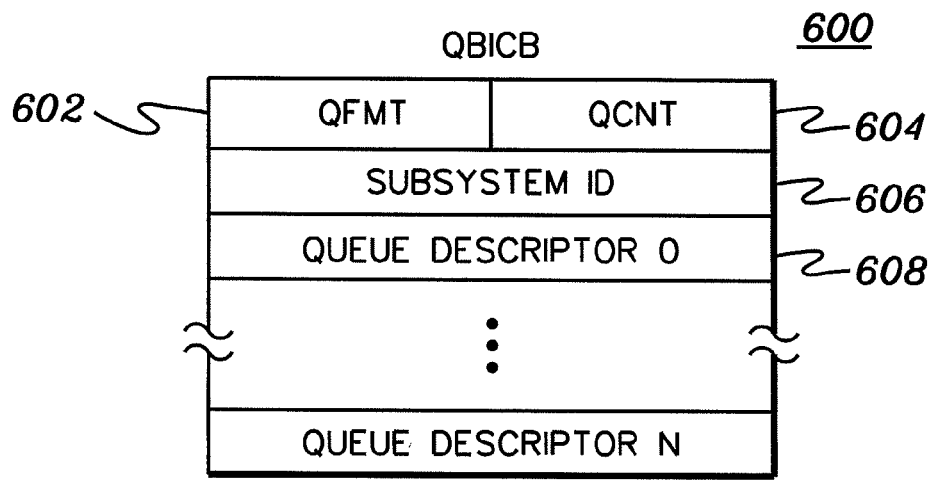
FIG. 6a depicts one example of a QDIO Buffer Information Control Block (QBICB), in accordance with an aspect of the present invention.
Figure 6B:
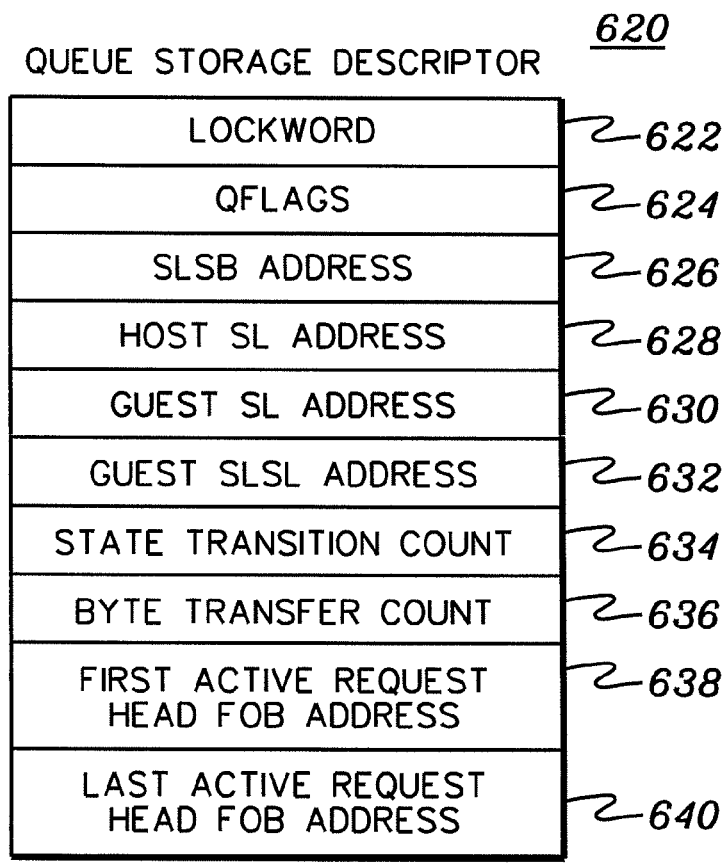
FIG. 6b depicts one example of a queue storage descriptor of the QBICB of FIG. 6a, in accordance with an aspect of the present invention.

The QBICB includes pointers and information describing the guest and host structures. It is associated with the QDIO subchannel, so that when that subchannel is identified as an operand of SQBS and EQBS, described below, the guest and host structures can be located and used. Further details regarding the QBICB are described with reference to FIGS. 6a-6b.

A QDIO Buffer Information Control Block (QBICB) 600 (FIG. 6a) includes information about the buffer storage and buffer states of a QDIO data queue set and is used to associate the buffer storage and buffer states with a given QDIO subchannel. It is, for example, a variable length control block in host real or absolute storage beginning on a doubleword boundary and having a minimum length of 64 bytes. The size of the QBICB is determined by the number of queues it describes (i.e., by the number of queue descriptors it includes), as designated by its queue count field.

In one example, QBICB 600 includes the following fields:

(a) Queue Format (QFMT) 602: This field includes an unsigned binary integer code value that identifies the format of the queue descriptors and the format of the control blocks that are addressed by the contents of the queue descriptors. As examples, format 0 indicates OSA direct express queues, format 1 indicates fibre channel protocol (FCP) queues, and format 2 indicates internal queued direct communication queues.

(b) Queue Count (QCNT) 604: This field includes an unsigned integer that specifies the total count of input plus output queues that are described by the QBICB.

(c) Subsystem ID 606: This field includes the subsystem ID of the QDIO subchannel that is associated with the QBICB.

(d) Queue Descriptor(s) 608: A queue descriptor is, for instance, a 16 byte structure and the QBICB can include up to 64 queue descriptors, in one embodiment. Each queue descriptor includes the address of the queue storage descriptor that is used to describe the buffer states and buffer data storage for one QDIO input or output queue.

The queue descriptors for input queues, if any, are listed contiguously. The queue descriptors for output queues, if any, are listed contiguously following the list of queue descriptors for input queues. The value in the QCNT field specifies the total number of queue descriptors.

The QBICB queue descriptor includes a Queue Storage Descriptor Origin field, which with 7 zeros appended on the right specifies the 64 bit host real or absolute address of the queue storage descriptor for the corresponding queue.

A queue storage descriptor is, for instance, a 128 byte structure that includes information about the host and guest buffer storage for the corresponding queue. In one example, a queue storage descriptor 620 (FIG. 6b) includes the following fields:

(a) Lockword 622: The lockword field is, for instance, a 32 bit field that is the interlock control for the queue storage descriptor and the active request head FOB list (described below). A lockword value may have one of the following meanings, depending on its value as predefined: Available: The structures associated with the lock are available for use by the machine or the host; Locked for the machine: The machine has obtained the lock and ownership of the associated structures; Locked for the host by the machine: The machine has encountered a situation which requires services from the host and has transferred ownership of the lock and the associated structures to the host; and Locked for the host by the host: The host has obtained the lock and ownership of the associated structures.

(b) Queue Flags (QFlags) 624: This field includes, for instance, an 8 bit flag field. Examples of flags include:

| Bit | Meaning |
| --- | --- |
| 0 | Queue/Buffer type: When bit 0 is zero, the queue is an input queue. When bit 0 is one, the queue is an output queue. |
| 1 | Pending request component FOB list completion: When bit 1 is one, the FOB identified by the first active request head FOB address field is the head FOB of a multiple buffer request for which the request component FOB list is incomplete and still being constructed. |

(c) SLSB Address 626: This field includes the host real or absolute address of the storage list state block (SLSB) that is associated with the corresponding queue.

(d) Host SL Address 628: This field includes the host real or absolute address of the host storage list (SL) that is associated with the corresponding queue. The SL specified by this address is observable by the adapter.

(e) Guest SL Address 630: This field includes the guest absolute address of the guest storage list (SL) that is associated with the corresponding queue. The SL specified by this address is not observable by the adapter.

(f) Guest SLSL Address 632: This field includes the guest absolute address of the storage list state logout (SLSL) area that is associated with the corresponding queue.

(g) State Transition Count 634: This field includes an unsigned integer count of the number of buffer state transitions from the adapter owned state to the program owned state that have been observed by the program via the Extract QDIO Buffer State instruction.

(h) Byte Transfer Count 636: This field includes an unsigned integer count of the number of bytes transferred by the adapter. For Fibre Channel Protocol (FCP) queues, the byte transfer count is not a count of actual bytes transferred. Rather, it is a count of bytes specified to be transferred.

(i) First Active Request Head FCP Operations Block (FOB) Address 638: When the QFMT field in the QBICB specifies that the queue is a format 1 queue (i.e., FCP) and predefined bits of this field, with 8 zeros appended on the right, do not form the host real or absolute address of the first byte of this field, as one example, the predefined bits of this field, with 8 zeros appended on the right, form the host real or absolute address of the head FOB of the first FCP request in the list of FCP requests that are active (i.e., the address of the head FOB of the first FCP request in the active request head FOB list.) When the QFMT field in the QBICB specifies that the queue is a format 1 queue and the predefined bits, with 8 zeros appended on the right, form the host real or absolute address of the first byte of this field, as one example, there are no active FCP requests and the active request head FOB list is empty.

(j) Last Active Request Head FOB Address 640: When the QFMT field in the QBICB specifies that the queue is a format 1 queue and predefined bits of this field, with 8 zeros appended on the right, do not form the host real or absolute address of the first byte of field 638, as one example, the predefined bits of this field, with 8 zeros appended on the right, form the 64 bit host real or absolute address of the head FOB of the last FCP request in the list of FCP requests that are active (i.e., the address of the head FOB of the last FCP request in the active request head FOB list.) When the QFMT field in the QBICB specifies that the queue is a format 1 queue and the predefined bits of this field, as one example, with 8 zeros appended on the right, form the host real or absolute address of the first byte of field 638, there are no active FCP requests and the active request head FOB list is empty.

Figure 6C:
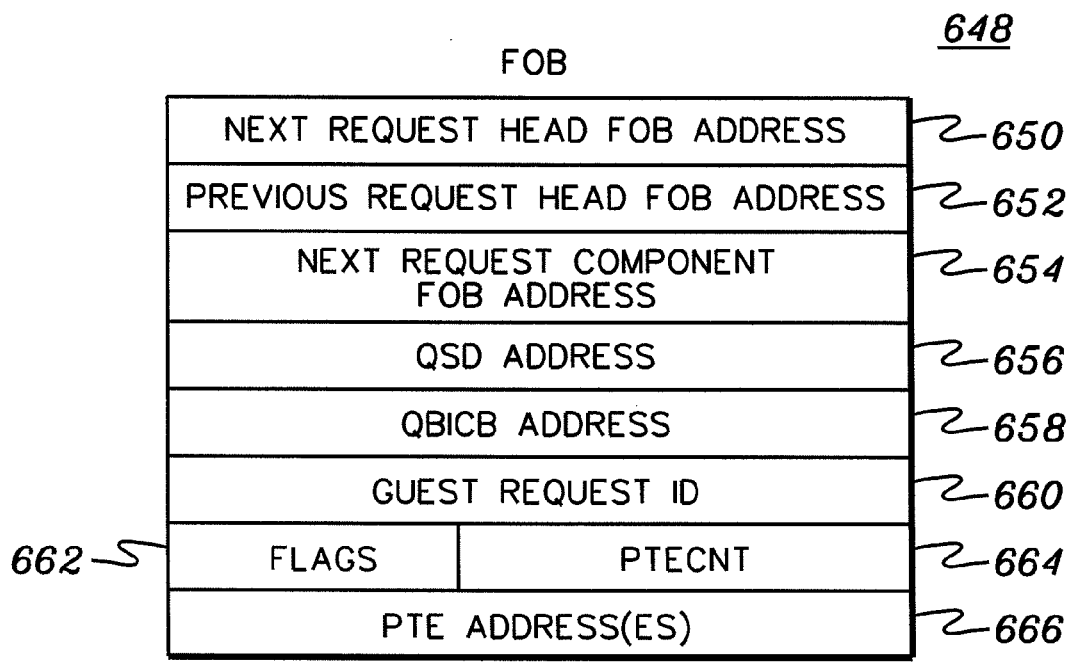
FIG. 6c depicts one example of a Fibre Channel Protocol (FCP) operation block (FOB), in accordance with an aspect of the present invention.

A fibre channel protocol operations block (FOB) describes up to, for instance, 16 host pages that are pinned in host page frames for the duration of an FCP I/O operation. In one example, an FCP operations block (FOB) 648 (FIG. 6*c*) includes the following fields:

(a) Next Request Head FOB Address 650: If the FOB is a head FOB of an active request, this field with 8 zeros appended on the right forms the host real or absolute address of the head FOB of the next FCP request in the active request head FOB list or of the first active request head FOB address field in the QSD, if the FOB is the last head FOB in the active request head FOB list. If the FOB is in the available FOB list and this field is not zeros, this field with 8 zeros appended on the right forms the host real or absolute address of the next FOB in the available FOB list. If the FOB is in the available FOB list and this field is zero, the FOB is the last FOB in the available FOB list. If the FOB is a request component FOB other than a head FOB, the contents of this field are not meaningful.

(b) Previous Request Head FOB Address 652: If the FOB is the head FOB of an active request, this field with 8 zeros appended on the right forms the host real or absolute address of the head FOB of the previous FCP request in the active request head FOB list or of the first active request head FOB address field in the QSD, if the FOB is the first head FOB in the active request head FOB list. If the FOB is in the available FOB list or is a request component FOB other than a head FOB, the contents of this field are not meaningful.

(c) Next Request Component FOB Address 654: If the FOB is a request component FOB and this field is not zero, this field with 8 zeros appended on the right forms the host real or absolute address of the next FOB in a request component FOB list. If the FOB is a request component FOB and this field is zero, the FOB is the last or only FOB in the request component FOB list.

(d) Queue Storage Descriptor (QSD) Address 656: If the FOB is a head FOB, this field with 7 zeros appended on the right forms the host real or absolute address of the queue storage descriptor of the output queue from which the head FOB for the request is queued.

(e) QDIO Buffer Information Control Block (QBICB) Address 658: If the FOB is a head FOB, this field with 3 zeros appended on the right forms the host real or absolute address of the QDIO buffer information control block that is associated with the subchannel for which the FCP operation is active.

(f) Guest Request ID 660: If the FOB is a head FOB, this field includes the FCP request id specified by the guest in its SBAL.

(g) Flags 662: When the FOB is a head FOB, this field includes, for instance, an 8 bit flags field. Examples of the bits and their meaning include, for instance:

1) Bit 0—Request Active: Bit 0 indicates that the head FOB is in the active request head FOB list and represents an active FCP request;

2) Bit 1—Construction Complete: Bit 1 indicates that the buffers comprising the FCP request have been processed and that construction of the FCP request is complete;

3) Bit 2—Request ID Posted: Bit 2 indicates that the adapter has posted the FCP request identifier for this request;

4) Bits 3-4—Storage Block Type: Bits 3-4 specify the storage block type for the format 1 output buffer described by the FOB and its corresponding SBAL. Bits 3-4 have the same value and meaning as bits 3-4 of the SBALF 0 field in the corresponding SBAL.

(h) Page Table Entry (PTE) Count (PTECNT) 664: This field includes a count of PTE address array entries that are meaningful.

(i) PTE Addresses 666: This field includes an array of 0-16 PTE address fields. Bits of each PTE address field with 3 zeros appended on the right forms the host real or absolute address of a PTE, which has been pinned for the request for which the FOB pertains.

FOBs may be linked to one another to form various lists. One list is the available FOB list. When the FOB has been allocated by the host and is not being used for a QDIO operation, it resides in the available FOB list (AFOBL). In one instance, a separate available FOB list is provided for each processor. The FOBs in the available FOB list are singly linked using the next request head FOB address field. The last entry in the list is designated by a zero value in its next request head FOB address field. The origin of the available FOB list and the count of FOBs in the available FOB list are designated by fields in a CPU prefix area.

Another list is the request component FOB list that includes one or more FOBs that comprise a single, active FCP request. The number of FOBs in a request component FOB list corresponds to the number of SBALs in the FCP request. The first FOB in the request component FOB list is the head FOB and is used to represent the presence of the active request in the active request head FOB list.

For a single SBAL (i.e., single buffer) FCP request, the request component list is comprised of the head FOB. After the head FOB is constructed, it is placed at the beginning of the active request head FOB list and construction complete and request active indicators in the FOB's flags field are both set to one to indicate that the construction of the total FCP request is complete and the request is active.

For a multiple SBAL (i.e., multi-buffer) FCP request, one FOB is constructed corresponding to each SBAL that comprises the request. The first FOB constructed becomes the head FOB. The head FOB is added to the beginning of the active request head FOB list and, after it is constructed, the request active bit in the FOB's flags field is set to one to indicate that the request is active. The anchor of the list of the remaining request component FOBs resides in the head FOB.

The remaining FOBs are added to the request component FOB list and are singly linked using the next request component FOB address field, beginning with the head FOB. The last FOB in the list is designated by a zero value in its next request component FOB address field. After the last FOB has been added to the list, the construction complete indicator in the head FOB's flags field is set to one to indicate that the construction of the total FCP request is complete and the request is active.

The FOBs in the request component FOB list including the head FOB are considered request component FOBs.

Another list is the active request head FOB list. When an FCP request is active, the request's head FOB is in the active request head FOB list. The active request head FOB list is a doubly linked list using the next request head FOB address and the previous request head FOB address fields. The anchors of the active request head FOB list are the first active request head FOB address and the last active request head FOB address fields in the queue storage descriptor for the queue. The first entry in the list is designated by a value of the address of the queue storage descriptor's first active request head FOB address field in the head FOB's previous request head FOB address field and the value of the address of the first entry's head FOB in the first active request head FOB address of the queue storage descriptor. The last entry of the list is designated by a value of the address of the queue storage descriptor's first active request head FOB address field in the head FOB next request head FOB address field and the value of the address of the last entry's head FOB in the last active request head FOB address of the queue descriptor.

Figure 2B:
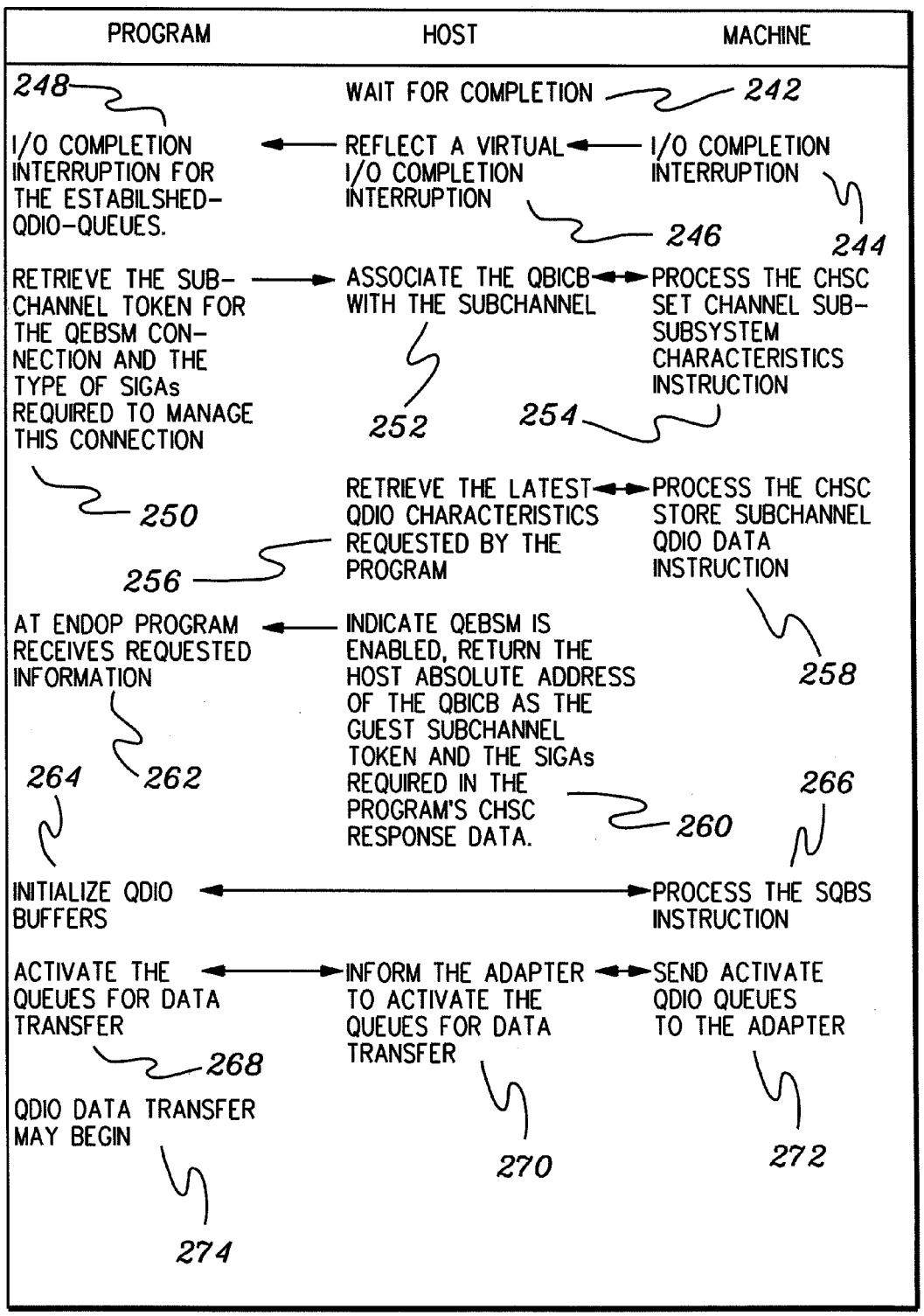

Returning to FIG. 2a, subsequent to creating the QBICB, a Start Subchannel instruction with an Establish QDIO Queues Channel Command Word is issued by the host to the machine to inform the adapter of the location of the shadow QDIO queues for the connection being established, STEP 238. The machine sends the Establish QDIO Queues command to the adapter, STEP 240, and the host waits for completion, STEP 242 (FIG. 2b). The machine issues an I/O completion interruption, STEP 244, that is received by the host, which reflects a virtual I/O completion interruption, STEP 246. The I/O completion interruption for the Establish QDIO Queues command is received by program 200, STEP 248.

Thereafter, the program retrieves the subchannel token for the QEBSM connection and the type of SIGAs required (or desired) to manage this connection, STEP 250. In one example, this is performed by issuing the CHSC Store Subchannel QDIO Data command described above.

The host associates the QBICB with the subchannel, STEP 252. In one example, this association is performed by issuing a Set Channel Subsystem Characteristics command The CHSC Set Channel Subsystem Characteristics command sets selected channel subsystem controls based on the operation code of a command request block for this command.

Figure 7A:
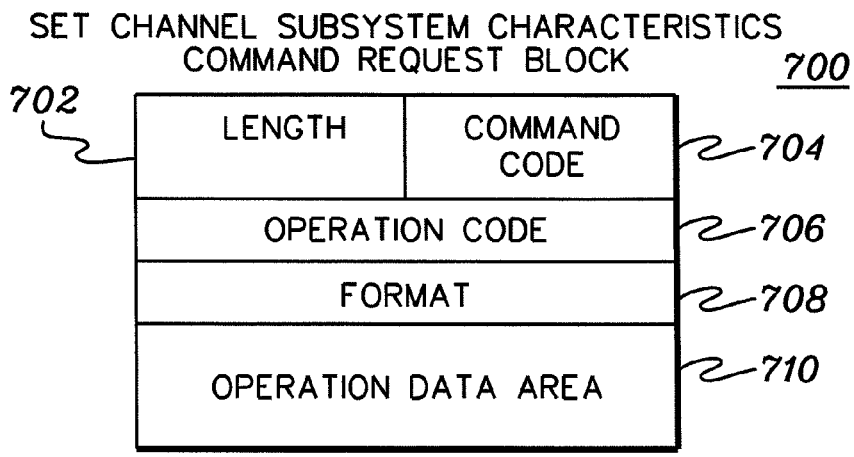
FIG. 7a depicts one example of a request block for a Set Channel Subsystem Characteristics command, in accordance with an aspect of the present invention.

One example of a command request block 700 is described with reference to FIG. 7a. The request block includes, for instance:

(a) Length field 702: This field specifies the length of the command request block.

(b) Command code 704: This field specifies the Set Channel Subsystem Characteristics Command.

(c) Operation Code (OC) 706: This field includes a value that specifies the operation that is to be performed. As one example, an OC of 0 specifies a set adapter device controls operation. Execution of the set adapter device controls operation requests that the specified adapter device controls be enabled and set for the specified subchannel, or disabled for the subchannel. The adapter device controls are, for instance:

The address of the device state change indicator;

The storage protection key for the device state change indicator;

The address of the adapter local summary indicator;

The storage protection key for the adapter local summary indicator;

The interruption subclass code;

The guest interruption subclass code; and

The origin of the QBICB.

(d) Format (FMT) 708: The command request format field includes an unsigned integer whose value specifies the layout of the command request block. One example of the value of this field is 0.

(e) Operation Data Area 710: This area of the command request block may be used by an operation. The format of the data of the operation data area is specific to each operation code.

Figure 7B:
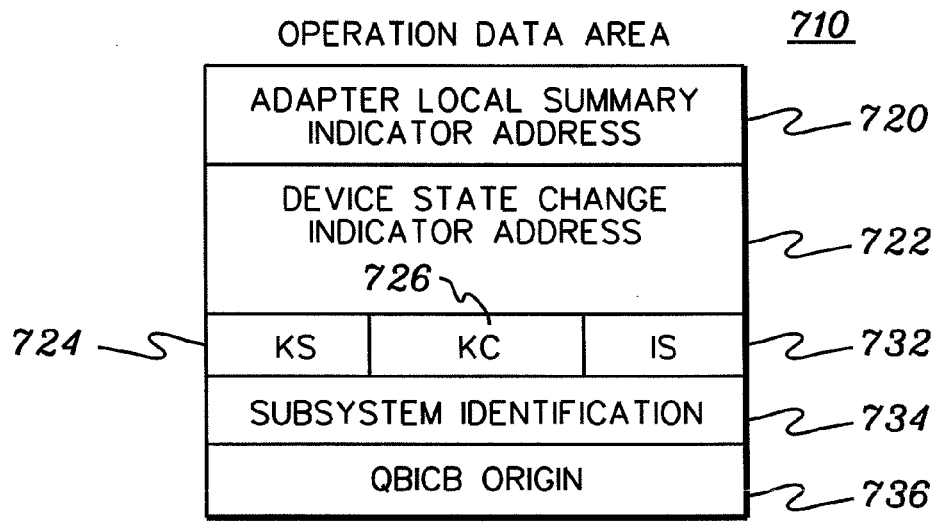
FIG. 7b depicts one example of an operation data area of the request block of FIG. 7a, in accordance with an aspect of the present invention.

As one example, the operation data area of the set adapter device controls operation includes, for instance, the following fields described with reference to FIG. 7b:

(a) Adapter Local Summary Indicator (ALSI) Address 720: This field includes the absolute address of the adapter local summary indicator byte in storage for the specified subchannel.

(b) Device State Change Indicator (DSCI) Address 722: This field includes the absolute address of the device state change indicator byte in storage for the specified subchannel.

(c) Adapter Local Summary Indicator Key (KS) 724: This field includes the storage access key used to access the adapter local summary indicator byte for the specified subchannel.

(d) Device State Change Indicator Key (KC) 726: This field includes the storage access key used to access the device state change indicator byte for the specified subchannel.

(e) Interruption Subclass Code (IS) 732: This field includes an unsigned integer that specifies an interruption subclass code to be used to control enablement of adapter interruptions.

(f) Subsystem Identification (SID) 734: This field includes an unsigned integer that specifies a subsystem ID that identifies the subchannel for which the adapter local summary indicator and device state change indicator addresses are being set.

(g) QDIO Buffer Information Control Block (QBICB) Origin 736: This field is used to form the absolute address of the QBICB. When this field specifies a valid address that is not zero and the QBICB is not specified to cross a 4K byte boundary, the specified QBICB is associated with the specified subchannel and the subchannel is enabled for QDIO Enhanced Buffer State Management Interpretation. When this field contains a zero and the specified subchannel is associated with a QBICB, the subchannel is disassociated from that QBICB and the subchannel is disabled for QDIO Enhanced Buffer State Management Operations. When this field contains an invalid address, a response code may be stored. When this field specifies a valid address that is not zero and the QBICB is specified to cross a 4K byte boundary, the QBICB specification is invalid and a response code may be stored.

When a valid non-zero QBICB origin is provided in the operation data area, the device is further associated with the designated QBICB and enabled for QDIO Enhanced Buffer State Management Interpretation. When a zero QBICB origin is provided in the operation data area, if the device is associated with a QBICB, it is disassociated from that QBICB.

Figure 7C:
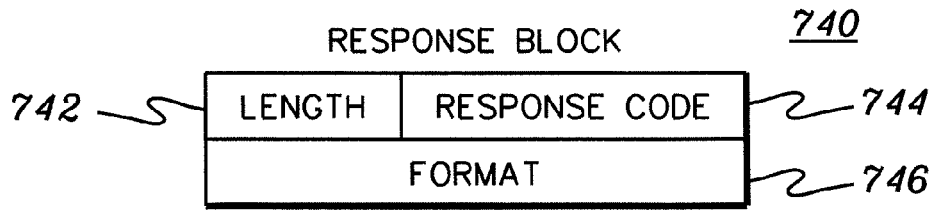
FIG. 7c depicts one example of a response block for the Set Channel Subsystem Characteristics command, in accordance with an aspect of the present invention.

One example of a command response block 740 for the Set Channel Subsystem Characteristics command is described with reference to FIG. 7c. The response block includes, for instance:

(a) Length field 742: This field specifies the length of the command response block.

(b) Response Code 744: This field includes an unsigned integer that describes the results of an attempt to execute the Set Channel Subsystem Characteristics command.

A response code of success indicates that the specified channel subsystem characteristics have been set as determined by the operation code and operation data area in the command request block. When a response code other than success is stored, the command is suppressed, and the specified channel subsystem characteristics are not set.

(c) Format 746: This field includes an unsigned integer whose value specifies the layout of the command response block.

Returning to FIG. 2b, the machine processes the Set Channel Subsystem Characteristics instruction, STEP 254, and information is passed back to the host.

Moreover, the host retrieves the latest QDIO characteristics requested by the program, STEP 256. In one example, this is performed using the Store Subchannel QDIO command described herein. The Store Subchannel QDIO Data instruction is processed by the machine, STEP 258, and information is passed back to the host.

The host indicates that QEBSM is enabled and returns the host absolute address of the QBICB as the subchannel token and the SIGAs required in the program's CHSC response data, STEP 260. The program receives the subchannel token and characteristics for the connection, STEP 262.

Thereafter, the program initializes the QDIO buffers to the appropriate start-up states using an SQBS instruction with the returned subchannel token, STEP 264. The SQBS instruction, which is described below, is processed by the machine, STEP 266, and information is passed back to the program.

Moreover, a Start Subchannel with an Activate QDIO Queues Channel Command Word is issued by the program to activate the queues for data transfer, STEP 268. One example of the processing associated with this command is described in U.S. Pat. No. 6,332,171, entitled "Self-Contained Queues With Associated Control Information For Receipt And Transfer Of Incoming And Outgoing Data Using A Queued Direct Input-Output Device," Baskey et al., issued Dec. 18, 2001, which is hereby incorporated herein by reference in its entirety. The host receives this Start Subchannel command and issues a Start Subchannel with an Activate QDIO Queues Channel Command Word informing the adapter to activate the queues for data transfer, STEP 270. Then the machine sends the Activate QDIO Queues to the adapter, STEP 272. When the request is initiated, QDIO data transfer may begin, STEP 274.

As part of QDIO data transfer, the guest program manages the QDIO buffer states. To do this, two instructions have been implemented, in accordance with an aspect of the present invention. One instruction is referred to as the Set QDIO Buffer State (SQBS) instruction and the other is referred to as the Extract QDIO Buffer State (EQBS) instruction. These instructions allow for dynamically synchronizing V=V virtual machine (guest) QDIO queues with the host shadow copies of those queues. The dynamic queue synchronization is performed by the machine during guest execution without host intervention. Thus, use of the Set QDIO Buffer State and Extract QDIO Buffer State instructions by the guest eliminates the context switching overhead that has been previously incurred in order to keep guest QDIO queues and host shadow QDIO queues synchronized.

One embodiment of using the Set QDIO Buffer State instruction is described with reference to FIGS. 8a-8c. Prior to invoking the Set QDIO Buffer State instruction, certain initialization takes place. For example, the host performs various cleanup tasks, STEP 800 (FIG. 8a) including, for instance, removing and processing frames on a processed frame descriptor list.

The processed frame descriptor list (PFDL) is a list of frame descriptors that describes host page frames that have been used to resolve host page invalid conditions during guest interpretation. The host page frames that are described by the PFDL have been assigned to host pages that provide storage for a guest. The PFDL is designated by a PFDL origin (PFDLO) at a specified host real address. The contents of the PFDLO, with five zeros appended on the right, specify the host home space virtual address of the first frame descriptor on the PFDL. A value of zero indicates that the list is empty.

The PFDLO is initialized by the host and may be changed by the host or a host page management assist function (described herein). The PFDLO is changed, in one embodiment, by means of a doubleword concurrent interlocked update operation that maintains the integrity of the list.

Figure 9:
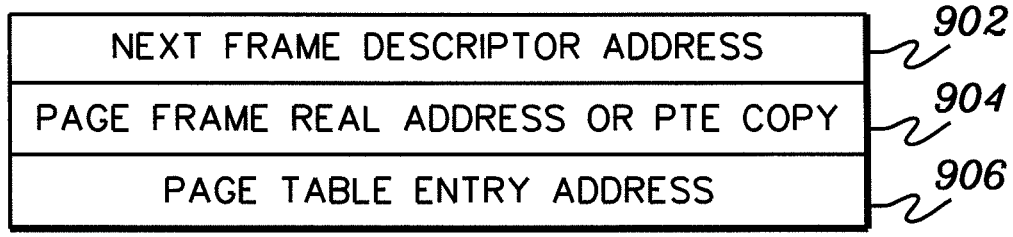
FIG. 9 depicts one example of a frame descriptor used in accordance with an aspect of the present invention.

A frame descriptor describes a host page frame, and multiple frame descriptors may be linked to one another to form a list, such as the PFDL or an available frame descriptor list (AFDL). The frame descriptor is allocated, deallocated, and initialized by the host and may be updated by host page management assist functions (described herein). In one example, a frame descriptor 900 (FIG. 9) is, for instance, a 32-byte block residing in host home space virtual storage on a 32 byte boundary, and includes the following fields:

(a) Next Frame Descriptor Address 902: In one example, the contents of this field, with 5 zeros appended on the right, specify the host home space virtual address of the next frame descriptor on the list. A value of zero indicates that the frame descriptor is the last on the list.

This field is initialized by the host and may be changed by the host or by host page management assist functions.

(b) Page Frame Real Address or PTE Copy 904: When the frame descriptor is in the available frame descriptor list (AFDL), the contents of this field, with twelve zeros appended on the right, specify the host real address of the first byte (byte 0) of a host page frame that is available for allocation to provide host storage.

When the frame descriptor is in the processed frame descriptor list (PFDL), this field includes a copy of the page table entry (PTE) designated by the page table entry address field, as it appeared before the host page was resolved.

This field is initialized by the host and may be changed by the host or by host page management assist functions.

(c) Page Table Entry Address 906: When the frame descriptor is on the processed frame descriptor list, the contents of this field, with three zeros appended on the right, specify the host real or host absolute address of the page table entry for the host virtual page.

This field is initialized by the host and may be changed by the host or by host page management assist functions.

Returning to FIG. 8a, in addition to performing cleanup, the host ensures that there are sufficient frames on the available frame descriptor list to service the next several requests for host storage, STEP 802. The available frame descriptor list (AFDL) is a list of frame descriptors that describes host frames the host has made available for host page allocation. The AFDL is designated by an AFDL origin (AFDLO) at a specified host real address.

The contents of the AFDLO, with five zeros appended on the right, specify the host home space virtual address of the first frame descriptor on the AFDL. A value of zero indicates that the list is empty.

The AFDLO is initialized by the host and may be changed by the host or host page management assist functions. The AFDLO is changed by means of a non-interlocked update operation.

A frame descriptor exists in one of the two lists: The processed frame descriptor list (PFDL) or the available frame descriptor list (AFDL). A separate pair of these lists is provided for each CPU. The origins of the AFDL and PFDL for a CPU are designated by means of fields in the prefix area of the CPU.

Figure 10:
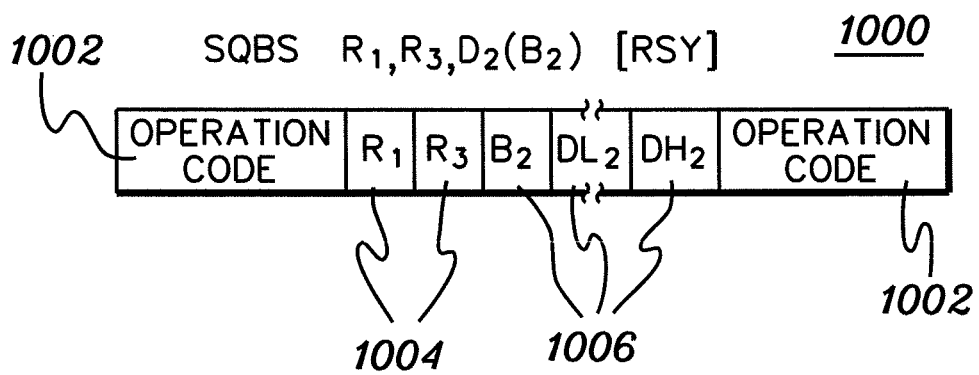
FIG. 10 depicts one example of the format of a Set QDIO Buffer State instruction, in accordance with an aspect of the present invention.

Thereafter, a host can start interpretive execution (SIE) of the program, STEP 804. In response to starting interpretive execution, the program begins to execute, and during execution, selects the next QDIO buffer to be transferred to the adapter, STEP 806. The program fills in the SBAL with the program absolute addresses of the storage blocks to be used in the data transfer, STEP 808. Further, the program transfers ownership of the buffer to the adapter by issuing a Set QDIO Buffer State instruction changing the state of the QDIO buffer from program owned to adapter owned, STEP 810. One example of the format of the Set QDIO Buffer State instruction is described with reference to FIG. 10. A Set QDIO Buffer State instruction 1000 includes an operation code 1002, which in this example is a split operation code, specifying the Set QDIO Buffer State instruction; a plurality of general registers 1004, such as $R_1$ and $R_3$; and a second operand 1006 designated by $B_2$, $DL_2$ and $DH_2$.

With the Set QDIO Buffer State instruction, the state of one or more QDIO input queue or output queue buffers, specified by the general registers designated by the $R_1$ and $R_3$ fields, are set to the state specified by the second operand. The operation proceeds until the specified buffer states are set or until a CPU determined number of buffer states have been set, whichever occurs first. The result is indicated in the condition code.

General register 1 includes the subchannel token that designates the QDIO subchannel that is enabled for QDIO Enhanced Buffer State Management (QEBSM) and is to have one or more of its buffer states set. (The subchannel token is obtained via the CHSC Store Subchannel QDIO Data command after the QDIO subchannel is enabled for QEBSM.)

The general register designated by the $R_1$ field includes a specification of the QDIO queue and the first buffer whose state is to be set. When the instruction is issued, the general register designated by the $R_1$ field includes the following fields:

(a) Queue Index (QIX): This field includes an unsigned integer index value that specifies the queue containing the buffers whose states are to be set. If the queue is an input queue, then the queue index is equal to the queue's input queue number. If the queue is an output queue, then the queue index is equal to the sum of the queue's output queue number plus the total count of established input queues. The value of this field is to specify an existing queue (i.e., the queue index value is not to exceed the sum of the total count of established input queues plus the total count of established output queues minus one); otherwise a condition code and condition code qualifier are set, in one example.

(b) Buffer Number (BNUM): This field includes an unsigned integer that specifies the number of the first buffer whose state is set.

The general register designated by the $R_3$ field includes a count of the number of buffers whose states are set. The $R_3$ register also includes a condition code qualifier field that is set along with the setting of the condition code when the instruction completes. When the instruction is issued, the general register designed by the $R_3$ field includes the following fields:

(a) Condition Code Qualifier (CCQ): When the instruction is issued, the contents of this field have no meaning. When the instruction completes, this field includes a condition code qualifier (CCQ) code that is set when the condition code is set. The following list includes possible CCQs.

All designated buffer states are set.
    The currently specified buffer is in the adapter owned state. The state of this buffer is not changed.
    The currently specified buffer state has not been extracted by the Extract QDIO Buffer State instruction, since the state was last changed from an adapter owned to a program owned state. The state of this buffer is not changed.
    The address of the storage list (SL) for the currently specified queue is invalid.
    The address of the storage buffer address list (SBAL) for the currently specified buffer is invalid.
    The address of a storage block (SB) for the currently specified buffer is invalid.
    There is a SBAL sequence error in the specified buffer.
    The designated subchannel is not operational.
    The specified subchannel token does not designate a valid subchannel enabled for QEBSM.

The specified queue is not established for the designated subchannel.

The specified buffer number is invalid.

The specified buffer count is invalid.

The specified buffer state is neither an adapter owned nor program owned state or the specified buffer state is both an adapter owned and program owned state.

A CPU determined number of buffer states have been set.

(b) Count: This field includes an unsigned integer that specifies the count of the buffers whose states are set. The value of this field is to be greater than zero and less than or equal to 128, in one example; otherwise, a condition code and condition code qualifier are set.

The buffer number space is in the range of 0 to 127, as one example. The count value, in conjunction with the $R_1$ BNUM value, may specify a wrap-around in the buffer number space.

The second operand address is not used to address data. Instead, the rightmost eight bits of the second operand address specify the QDIO buffer state to be set in the form of a storage list state block (SLSB) buffer state indicator. If the second operand address specifies a state that is neither an adapter owned nor a program owned state or the second operand address specifies a state that is both an adapter owned state and a program owned state (i.e., if bit 0 and bit 1 of the specified state are equal), a condition code is set and the $R_3$ condition code qualifier is set with a prespecified value.

The unit of operation for the Set QDIO Buffer State includes setting one buffer state, decrementing the count field in the $R_3$ register by one, and incrementing the buffer number field in the $R_1$ register by one. If incrementing the buffer number field causes the buffer number to exceed the maximum buffer number of 127, a wrap-around in the buffer number space occurs and the buffer number is reset to 0.

Instruction operation completes when any one of the following occurs first:

When the count of buffer states specified in the $R_3$ count field have been set and no error or exception conditions have been encountered. In this case, a condition code and the $R_3$ condition code qualifier field are set.

When an exception condition is encountered and none, some, or all of the specified buffer states have been set. In this case, a condition code is set and the $R_3$ condition code qualifier field is set with a value to indicate the exception. The count field in the $R_3$ register is decremented by the number of buffer states that have been set and the buffer number (BNUM) field in the $R_1$ register is incremented by the same number, wrapping around through zero if required. Thus, if the count field in the $R_3$ register is zero, the specified buffer states have been set. If the count field is not zero, the $R_1$ queue index (QIX) and buffer number (BNUM) fields identify the buffer that was being processed when the exception condition was encountered.

When an error condition is encountered and none of the specified buffer states have been set. In this case, a condition code is set and the $R_3$ condition code qualifier field is set with a value to indicate the error.

When a CPU determined number of the specified buffer states have been set without setting the total specified count of buffer states. In this case, a condition code and the $R_3$ condition code qualifier field are set. The count field in the $R_3$ register is decremented by the number of buffer states that have been set and the buffer number (BNUM) field in the $R_1$ register is incremented by the same number, wrapping around through zero if required.

A serialization and checkpoint synchronization function is performed before and after the specified buffer states are set.

The execution of the Set QDIO Buffer State instruction does not change any information contained in the subchannel nor does it cause the I/O subsystem to signal the adapter nor does it alter any buffer state information in program storage.

The processing associated with executing the SQBS instruction is described with reference to FIGS. 8a-8c. The instruction is advantageously executed by the machine unless an exceptional condition occurs. If such an exceptional condition occurs, then processing is completed by the host in that the host performs the remaining steps listed under machine.

Figure 8A:
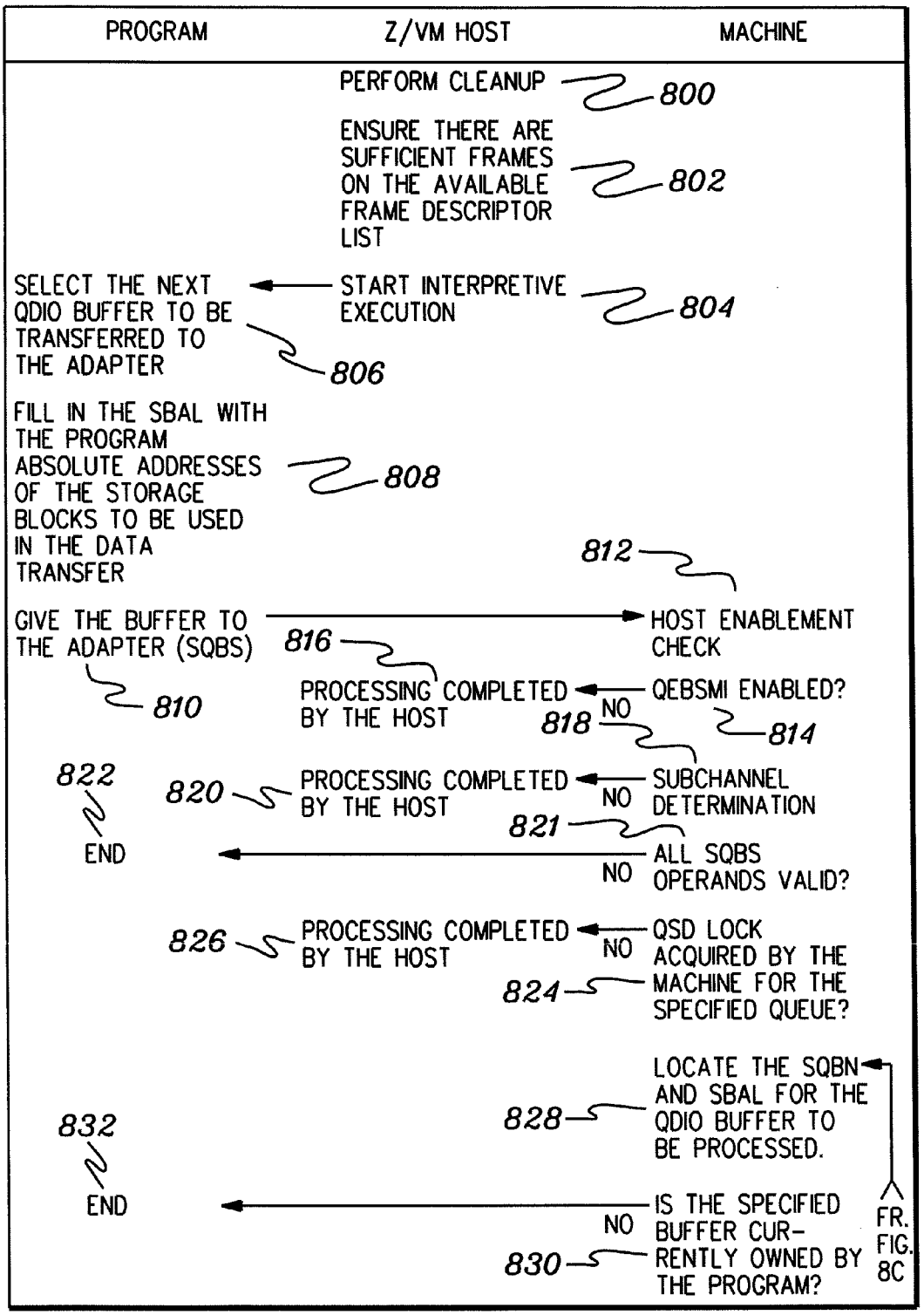
Figure 8C:
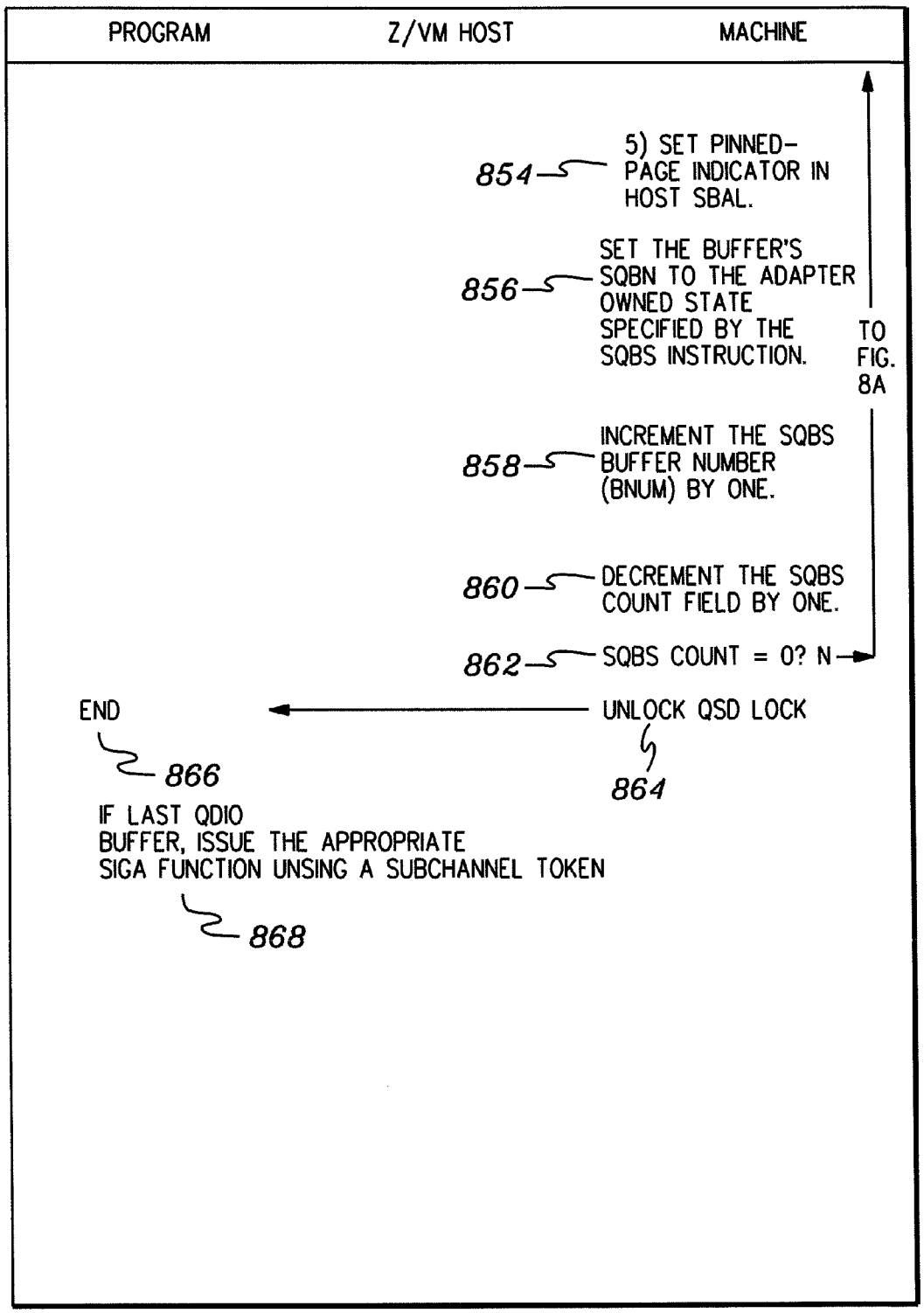

Referring to FIG. 8a, in response to the SQBS instruction being issued, the machine performs a host enablement check to determine whether the host enabled the guest for the QEBSM facility, STEP 812. If a QEBSMI enablement control (e.g., in guest state) is set to zero indicating non-enablement, STEP 814, then processing is to be completed by the host instead of the machine, STEP 816. When a condition is encountered during Set QDIO Buffer State interpretation that requires some action or service from the host, either an instruction interception or a partial execution interception (PEI) is recognized, an interception parameter is set with the Set QDIO Buffer State instruction text and, for PEI, the QEBSM-PEI parameters are set in guest state.

Next, the machine performs a subchannel determination, STEP 818. In one example, the SQBS subchannel token is used to locate the QBICB which contains the SID identifying the subchannel. A determination is made as to whether the subchannel token matches the token stored in the subchannel specified by the QBICB. If not, then processing is completed by the host, STEP 820. Otherwise, processing continues with the machine.

In further detail, when a Set QDIO Buffer State instruction is executed (as well as a Signal Adapter instruction or an Extract QDIO Buffer State instruction), a subchannel token in general register 1 is used to designate a subchannel. This token is used to determine whether the designated subchannel is enabled for QDIO Enhanced Buffer State Management Interpretation and to determine the subsystem id of the subchannel. In one example, the steps used to make these determinations include the following:

(1) The subchannel token value in register 1 is used as the host real or absolute address of the QDIO Buffer Information Control Block (QBICB) that was associated with the subchannel when it was enabled for QDIO Enhanced Buffer State Management Interpretation. If an access exception condition exists when referencing the QBICB, the guest instruction is suppressed and an instruction interception is recognized; otherwise processing continues.

(2) The subsystem id field of the QBICB designates the subchannel to be used. If the subsystem id field of the QBICB does not include a valid subsystem id, the guest instruction is suppressed and an instruction interception is recognized; otherwise processing continues. This allows, for instance, the host to handle the operation for a simulated device or to handle a tracing capability.

(3) If the subchannel designated by the QBICB subsystem id field is not enabled for QEBSMI or is not associated with the QBICB designated by the subchannel token, the guest instruction is suppressed and an instruction interception is recognized; otherwise processing continues.

Next, a determination is made by the machine as to whether the SQBS operands are valid, STEP 821. As examples, the buffer number is validated. In one example, if the $R_1$ buffer number field specifies a value greater than 127, the instruction completes, and a condition code and condition code qualifier are set. Additionally, the count value is validated. If the $R_3$ count field specifies a value of 0 or a value greater than 128, the instruction once again completes, and a condition code and condition code qualifier are set. Additionally, the specified buffer state is checked for validity. If the buffer state specified by the second operand address specifies a simultaneous adapter owned and program owned state or a state that is neither adapter owned or program owned, the instruction completes, and a condition code and condition code qualifier are set. Further, the queue storage descriptor for the specified queue is located. If the $R_1$ queue index field is greater than or equal to the value in the QBICB queue count field, the specified queue is not established for the subchannel and the instruction completes, and a condition code and condition code qualifier are set. Otherwise, the value of the $R_1$ queue index field is used as the index into the QBICB queue descriptor address array to determine the queue descriptor address.

Should any of the above tests fails, then processing completes, and a condition code and condition code qualifier are set, STEP 822. Otherwise, processing continues.

An interval completion indicator in the guest state is set to one and a serialization and checkpoint synchronization function is performed. In case of a machine failure, this indicator informs the host that the host control structures may be in a questionable state.

Next, an attempt is made to acquire the queue storage descriptor lock for the specified queue, STEP 824. The queue storage descriptor address is fetched from the queue storage address field in the QBICB queue descriptor for the specified queue. An attempt is made, using an interlocked update operation, to change the QSD lockword value from available to locked by the machine. If the QSD address is zero or an access exception condition exists when attempting to set the lockword, a validity interception is recognized and a validity interception reason code is set.

If the interlocked update operation fails, this operation may be retried a model dependent number of times. If the QSD lockword cannot be set to the locked by machine value, a partial execution interception is recognized, the partial execution reason code in the QEBSM-PEI parameters field returned to the host program is set to, for instance, 1, and processing is completed by the host, STEP 826. If the interlocked update operation succeeds, processing continues.

The following logic is repeated for the number of QDIO buffers specified by the count field on the SQBS instruction. Initially, the SQBN and SBAL for the QDIO buffer to be processed are located, STEP 828. In one example, the host storage list for the specified queue is located. That is, the host storage list address is fetched from the host storage list address field in the queue storage descriptor. Then, the specified queue storage list state block is located. This address is fetched from the SLSB address field in the queue storage descriptor. The first SLSB entry (SQBN) to be set is located. The value of the $R_1$ buffer number (BNUM) field is used as the index into the SLSB to determine the address of the first SQBN that is to be set. If an access exception condition exists when accessing the SQBN, a validity interception is recognized and a validity interception reason code is set.

Thereafter, a determination is made as to whether the specified buffer is currently owned by the program, STEP 830. In one example, this determination is made by checking the SQBN. If not, then processing completes, and a condition code and condition code qualifier are set, STEP 832. Otherwise, processing continues with the machine making a determination as to whether the state of the specified buffer needs to be extracted, STEP 834 (FIG. 8*b*). If the state needs to be extracted via, for instance, an EQBS instruction, then processing completes, and a condition code and condition code qualifier are set, STEP 836. If the state of the specified buffer does not need to be extracted, then the contents of the program SBAL are copied to the host's SBAL, STEP 838. Moreover, the buffer synchronization and EQBS operation required bits in the host's SBAL are set, STEP 840.

Further, for each meaningful host SBALE that has a valid storage block, the following functions are performed, STEP 842: (1) The program absolute (host virtual) storage block address is fetched from the host SBALE, STEP 844; (2) An HPMA pin function, described below, is invoked to translate and pin the page in storage, STEP 846. If the HPMA pin function is unsuccessful, STEP 848, then processing is completed by the host, STEP 850. Otherwise, processing continues by the machine; (4) The host absolute address of the storage block returned by the HPMA pin is moved into the host's SBALE, STEP 852; and (5) The pinned page indicator in the host's SBAL is set, STEP 854 (FIG. 8*c*).

Thereafter, the buffer's SQBN is set to the adapter owned state specified by the SQBS instruction, STEP 856. In one example, the state is specified by the second operand. Additionally, the SQBS buffer number (BNUM) is incremented by one, STEP 858, and the SQBS count field is decremented by one, STEP 860.

A determination is made as to whether the SQBS count is equal to 0, STEP 862. Should the SQBS count not be equal to 0, then processing continues with locate the SQBN and SBAL for the QDIO buffer to be processed, STEP 828 (FIG. 8*a*). However, if the SQBS count is equal to 0, then processing continues with unlocking the QSD lock, STEP 864 (FIG. 8*c*). If successful, an indication of success is forwarded to the program, STEP 866.

If this is the last QDIO buffer to transfer at this time, then an appropriate SIGA instruction function is issued to signal the adapter that an I/O request is pending, for instance, SIGA-wt for an output operation or SIGA-rt when making an input available for subsequent use by the adapter, STEP 868.

It is noted that if the SQBS processing had to be completed by the host, then the host presents the appropriate end ops to the program, instead of the machine.

In describing the SQBS instruction, reference is made to Host Page Management Assist (HPMA). In accordance with an aspect of the present invention, Host Page Management Assist includes four assist functions that can be invoked by other CPU facilities during the interpretation of a pageable storage guest. These functions include a pin function, a resolve host page function, an unpin host page by virtual address function and an unpin host page by PTE address function, each of which is described below.

The HPMA pin function invoked from the SQBS instruction provides the CPU with the ability to indicate that the contents of a host page are pinned in a host page frame. A page may be pinned when it is required to be resident beyond the execution of a single instruction (e.g., for the duration of an I/O operation). When a page is in the pinned state, this is an indication to the host that the page is ineligible for page invalidation. When a page is successfully pinned by the pin host page function, a pinned page counter associated with the page may be incremented.

In one example, a delta pinned page counter array (DPPCA) is an array of, for instance, 31-bit signed integer pinned page counters, one of which may be incremented by the pin host page function when a page is successfully pinned. Further, one of the DPPCA counters may be decremented by an unpin host page by virtual address function or an unpin host page by PTE address function (described below), when a page is successfully unpinned. In one implementation, one counter in the DPPCA is associated with pages that reside in host real storage below a given size (e.g., 2GB), and the other counter is associated with pages that reside in host real storage at or above that size.

Figure 11A:
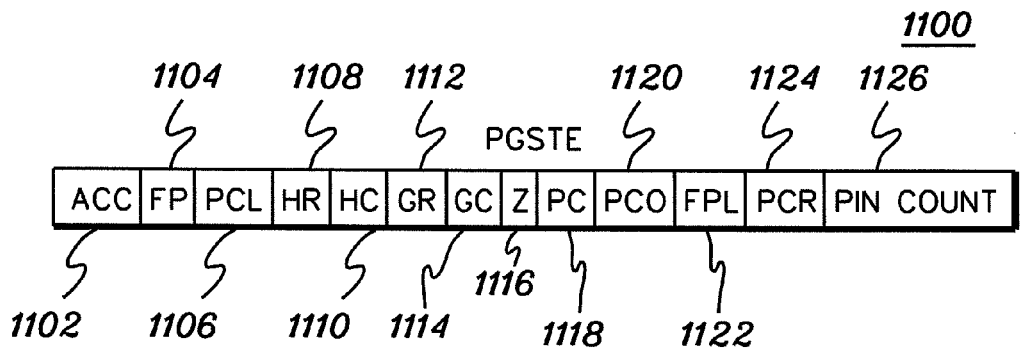
FIG. 11a depicts one example of a page status table entry (PGSTE), in accordance with an aspect of the present invention.

The host classifies each page as either a class 0 page or class 1 page and sets a page class indicator in a page status table entry (PGSTE) for the page accordingly. One example of a page status table entry 1100 is described with reference to FIG. 11*a*. Page status table entry 1100 includes, for instance, the following:

(a) Acc 1102: Access control key;

(b) FP 1104: Fetch protection indicator;

(c) Page Control Interlock (PCL) 1106: This is the interlock control for serializing updates to a page table entry (PTE) and corresponding PGSTE, except for the PGSTE status area and PGSTE bits that are marked as reserved.

(d) HR 1108: Host reference backup indicator;

(e) HC 1110: Host change backup indicator;

(f) GR 1112: Guest reference backup indicator;

(g) GC 1114: Guest change backup indicator;

(h) Page Content Logically Zero Indicator (Z) 1116: When one, the content of the page that is described by this PGSTE and corresponding PTE is considered to be zero. Any prior content of the page does not have to be preserved and may be replaced by a page of zeros.

When zero, the content of the page described by the PGSTE and corresponding PTE is not considered to be zero. The content of the page is to be preserved and should not be replaced.

This bit is meaningful when the corresponding PTE page invalid (PTE.I) bit is one.

1. When the Z bit is one and the corresponding PTE.I bit (described below) is one, the page content may be replaced by the host or by a function of the Host Page Management Assist.

2. When the Z bit is one, the corresponding PTE.I bit is one, and the page content is replaced, the page should be replaced by associating it with a frame that has been set to zeros.

(i) Page Class (PC) 1118: When zero, the page described by the PGSTE and corresponding PTE is a class 0 page and the delta pinned page count array (DPPCA) for class 0 pages is used for counting pinning and unpinning operations for the page. When one, the page described by the PGSTE and corresponding PTE is a class 1 page and the DPPCA for class 1 pages is used for counting pinning and unpinning operations for the page.

(j) Pin Count Overflow (PCO) 1120: When one, the pin count field is in an overflow state. When zero, the pin count field is not in an overflow state. In this case, the total pin count is kept by the host in another data structure not accessed by the machine.

(k) Frame Descriptor On Processed Frame Descriptor List (FPL) 1122: When one, a frame descriptor for the page described by the PGSTE and corresponding PTE is in a processed frame descriptor list. The frame descriptor identifies the host page frame that was used by the HPMA resolve host page function for the page.

(l) Page Content Replacement Requested (PCR) 1124: When one, page content replacement was requested when the HPMA resolve host page function was invoked for the page represented by the PGSTE and corresponding PTE.

(m) Pin Count 1126: An unsigned binary integer count used to indicate whether the content of the host virtual page represented by the PGSTE and corresponding PTE is pinned in the real host page frame specified by the page frame real address field of the PTE. When the value of this field is greater than zero or the page count overflow (PCO) bit is one, the corresponding page is considered to be pinned. When the value of this field is zero and the PCO bit is zero, the corresponding page is not considered to be pinned.

At the time a page is pinned by either the host or the CPU, this field should be incremented by 1. At the time a page is unpinned by either the host or the CPU, this field should be decremented by 1.

When the value of the pin count field is greater than zero or the PCO bit is one, the corresponding PTE.I (page invalid) bit is to be zero. Otherwise, unpredictable results may occur.

While a page is pinned, the host program should not change the contents of the PTE page frame real address (PRFA) field, the setting of the PTE page invalid (I) bit, or the setting of the page protection (P) bit in the PTE or segment table entry (STE). Otherwise unpredictable results may occur.

Figure 11B:
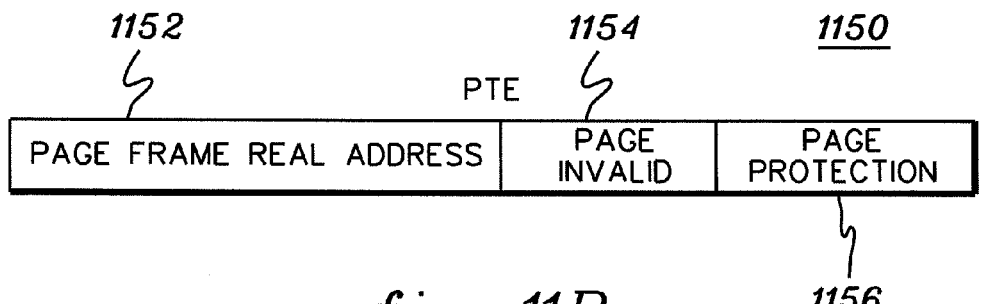
FIG. 11b depicts one example of a page table entry (PTE), in accordance with an aspect of the present invention.

A PGSTE corresponds to a page table entry (PTE), an example of which is described with reference to FIG. 11*b*. A page table entry 1150 includes, for instance:

(a) Page Frame Real Address 1152: This field provides the leftmost bits of a real storage address. When these bits are concatenated with the byte index field of the virtual address on the right, the real address is obtained.

(b) Page Invalid Indicator 1154: This field controls whether the page associated with the page table entry is available. When the indicator is zero, address translation proceeds by using the page table entry. When the indicator is one, the page table entry cannot be used for translation.

(c) Page Protection Indicator 1156: This field controls whether store accesses are permitted into the page.

Further details regarding page table entries and page tables, as well as segment table entries mentioned herein, are provided in an IBM® publication entitled, "z/Architecture Principles of Operation," IBM® Publication No. SA22-7832-02, June 2003, which is hereby incorporated herein by reference in its entirety.

Continuing with the discussion of DPPCA, a separate DPPCA is associated with each virtual configuration for class 0 pin page counts and is designated by the class 0 DPPCA origin field in each description of the virtual configuration. A single DPPCA exists for class 1 pin page counts and is designated by the class 1 DPPCA origin field in the prefix area.

A DPPCA is not subject to key controlled protection nor low address protection. In one example, it is an 8-byte control block that is allocated on a doubleword boundary, and includes, for instance, a delta pinned page count for page frame real addresses less than a certain size (e.g., 2GB), and a delta pinned page count for page frame real addresses greater than or equal to that size. An interlocked update operation is to be used to change this field in order to maintain the accuracy of its content. A delta pinned page counter may be incremented when a page is successfully pinned by the pin host page function.

When the pin host page function is invoked, the following data is input to the function: the host virtual address (page) to be pinned; the effective host address space control element (ASCE) that identifies the address space assigned to the guest and the translation tables to be used; an indication of whether the page is being pinned for a fetch or store operation; and a page content replacement indicator.

Figure 12:
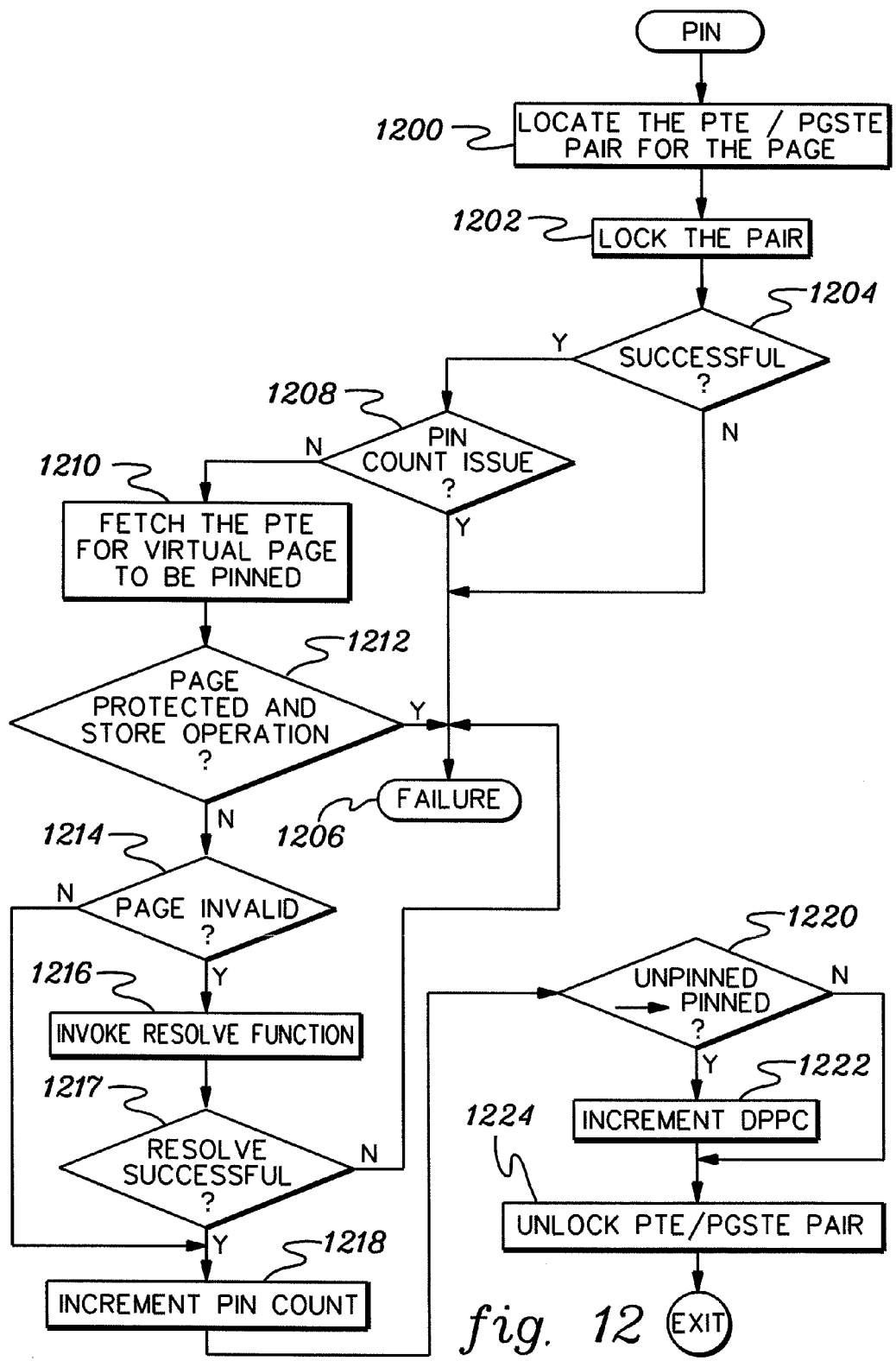
FIG. 12 depicts one embodiment of the logic associated with a pin function, in accordance with an aspect of the present invention.

One embodiment of the logic associated with the pin host page function is described with reference to FIG. 12. Initially, the PTE/PGSTE pair is located for the page, STEP 1200. For instance, using the ASCE and the virtual address (page) to be pinned the location of the page table entry and page status table entry in host storage for the virtual address to be pinned is determined.

The located PTE/PGSTE pair is locked using, for instance, an interlocked update operation to change the page control lock indicator in the PGSTE from 0 to 1, STEP 1202. If the pair could not be locked or if the page control interlock (PCL) was already one, INQUIRY 1204, then a failure is indicated, STEP 1206. Otherwise, processing continues with determining whether the pin count for the page would overflow with the next pin (i.e., if the value of the pin count field in the PGSTE is at a predefined value (e.g., 255)), INQUIRY 1208. If so, then processing ends with a failure, STEP 1206. Otherwise, the PTE for the virtual page to be pinned is fetched, STEP 1210.

Next, a determination is made as to whether the page is protected and is being pinned for a store operation, INQUIRY 1212. That is, if the input indication is for a store operation and the page protection bit is one in either a segment table entry or page table entry for the page, then failure is indicated, STEP 1206. Otherwise, processing continues with determining whether the page is invalid, INQUIRY 1214. If the page is invalid, then a resolve host page function is invoked, described below, STEP 1216. If the resolve host page function fails, INQUIRY 1217, then the pin function fails, STEP 1206. However, if the resolve is successful, or if the page is not invalid, then the pin count is incremented, STEP 1218.

Subsequently, a determination is made as to whether the pin state is being changed from the unpinned to the pinned state, INQUIRY 1220. If so, the associated delta pinned page count (i.e., the one selected based on page class and PFRA) is incremented by one, STEP 1222. That is, if the pin count is now one and the pin count is not in an overflow state (PGSTE.PCL=0), then the page state has transitioned from the unpinned to the pinned state. In this case, the delta pinned page count is incremented by one. Thereafter, or if the page state is not being changed from the unpinned to the pinned state, then the PTE/PGSTE pair is unlocked, STEP 1224. For example, the page control interlock bit in the PGSTE is set to zero, and processing is complete with a success.

When the pin host page function exits with an indication of success, the designated page is pinned and also may have been resolved by invocation of the resolve host page function. In this case, the page count for the page has been incremented in the status table by the machine and host translation tables may also have been updated by the machine and the previous requirement to transfer control to the host for page pinning and resolution is alleviated.

When the page host pin function exits with an indication of failure, no permanent change to the translation and status tables have been made, and any page controlled interlock bit that was set by the pin function is reset when the failure is recognized. In this case, the machine behaves as if the function was not invoked and the host will be given control to handle the failure.

As described above, if the page to be pinned is invalid, then a resolve host page function is invoked. The resolve host page function makes use of a host provided list of available host page frames that can be used by the CPU, when conditions permit, to dynamically resolve a host page invalid condition. The function also provides a means by which the host is informed about any host page frames that have been used to resolve host page invalid conditions by being assigned to specific host pages.

If host page management assist is enabled, the resolve host page function is invoked for a host page, and the page invalid bit in the page table entry (PTE.I) that describes the page is one, then one of the host page frames that the host has made available may be used to dynamically resolve the host page invalid condition.

Input to the resolve host page function includes the available frame descriptor list, the virtual address (page) to be resolved, the effective address space control element (ASCE) that identifies the address space and the translation tables to be used, a page content replacement indicator, indication of whether an interval completion indicator has already been set by the invoker, and an indication of whether access to the PTE/PTSTE pair has been locked by the invoker.

Figure 13A:
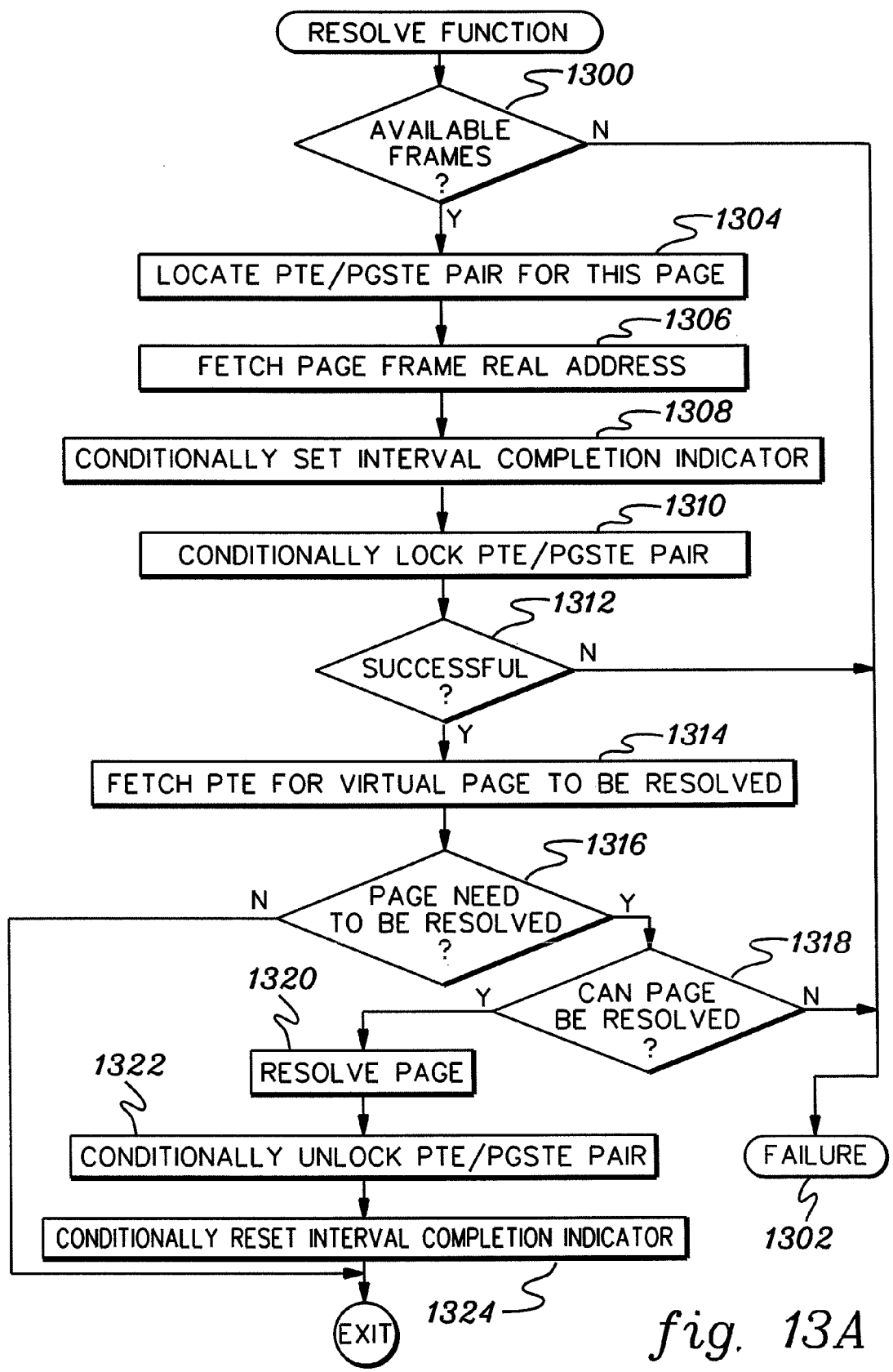
FIGS. 13a-13b depict one embodiment of the logic associated with a resolve function, in accordance with an aspect of the present invention.
Figure 13B:
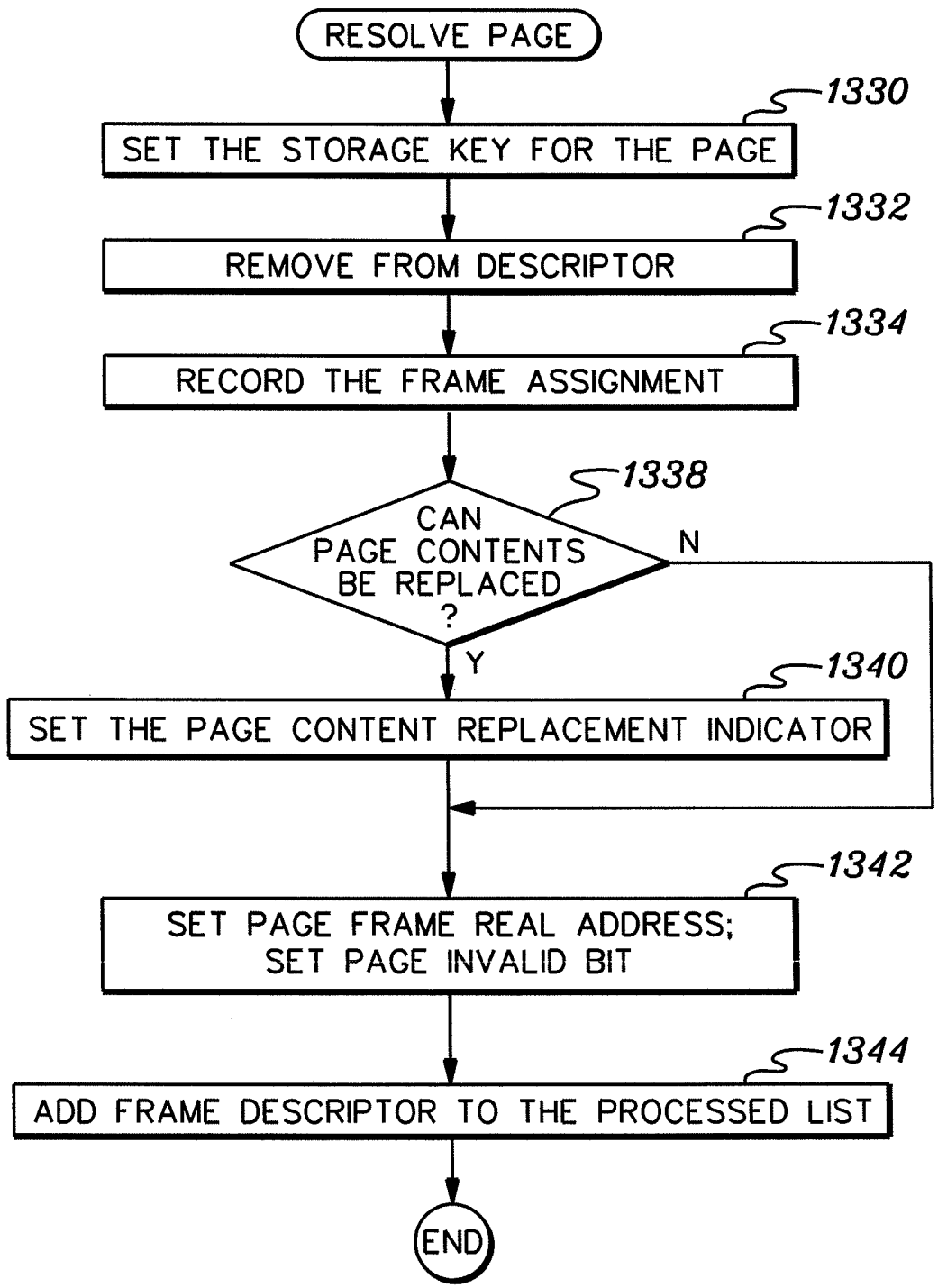

One embodiment of the logic associated with the resolve function is described with reference to FIGS. 13a-13b. Initially, a determination is made as to whether there are any available frames, INQUIRY 1300 (FIG. 13a). This determination is made by, for instance, checking whether the available frame descriptor list is empty. If the AFDLO specifies an address of zero (i.e., there are no available host page frames for the local processor), then there are no available frames and processing exits indicating failure, STEP 1302.

However, if there are available frames, then processing continues with locating the PTE/PGSTE pair for this page, STEP 1304. In one example, the ASCE and the virtual address (page) to be resolved are used to determine the location of the page table entry and page status table entry in host storage for the virtual address to be resolved.

Thereafter, the page frame real address is fetched from the first frame descriptor in the available frame descriptor list, STEP 1306. Also, if not already indicated as having been established by the invoker, the interval completion indicator is marked to show that the resolve host page function has begun and serialization and checkpoint synchronization functions are also performed, STEP 1308.

Subsequently, the PTE/PGSTE pair are conditionally locked, STEP 1310. If the resolve host page function entry conditions indicate that access to the PTE and PGSTE corresponding to the host virtual address to be resolved has not already been serialized, an interlocked update operation is used in an attempt to change the page control interlock indicator in the PGSTE (PGSTE.PCL) from zero to one. If the PTE/PGSTE pair cannot be locked or if the PGSTE.PCL is found to be already one, INQUIRY 1312, then processing exits with a failure, STEP 1302. Otherwise, processing continues with fetching the PTE for the virtual page to be resolved, STEP 1314. In one example, the page table entry is block-fetched concurrently from host storage.

Moreover, a determination is made as to whether the page needs to be resolved, INQUIRY 1316. In one example, this determination is made by checking the invalid indicator in the PTE. If the PTE indicates that the page is valid (PTE.I=0), then the page is resolved and processing is complete. However, if the page is to be resolved, then a further determination is made as to whether the page can be resolved, INQUIRY 1318. For instance, if the PGSTE for the virtual page to be resolved indicates that the page contents are not logically zero (PGSTE.Z=0) and the input page content replacement indicator indicates the page cannot be replaced, then processing exits with a failure, STEP 1302. However, if the page content logically zero indicator in the PGSTE is one or the resolve host page function entry conditions indicate that the content of the host virtual page to be resolved can be replaced, then an attempt to resolve the page can be made and processing continues, STEP 1320.

To resolve the page, various steps are performed as described with reference to FIG. 13b. One step includes setting the storage key for the page, STEP 1330. For example, the storage key for the host frame identified by the page frame real address field of the frame descriptor is set by: setting the access control bits from PGSTE.ACC; setting the fetch protection bit from PGSTE.FP; setting the reference indicator to zero; and setting the change indicator to zero.

Additionally, the frame descriptor is removed from the available frame descriptor list, STEP 1332. As one example, a non-interlocked update operation is used to remove the frame descriptor from the available frame descriptor list. The contents of the next frame descriptor address field of the frame descriptor replace the old value in the AFDLO.

Next, a frame assignment is recorded, STEP 1334. The PTE for the host virtual page is preserved by copying the PTE into the PTE copy field of the frame descriptor. Additionally, the address of the PTE for the host virtual page is stored into the page table entry address field of the frame descriptor.

Next, a determination is made as to whether the page contents can be replaced, INQUIRY 1338. As one example, this determination is made by checking the input page content replacement indicator. If the input page content replacement indicator indicates that page contents can be replaced, the page content replacement indicator in the PGSTE (PGSTE.PCR) is set to one, STEP 1340. This allows the host to keep statistics on the number of operations that permit page content replacement.

Thereafter, or if the contents cannot be replaced, the PTE for the host virtual page is updated to remove the page invalid condition. For example, a concurrent store operation replaces the contents of the page frame real address field of the page table entry with the contents of the page frame real address field of the frame descriptor, and sets the page invalid bit in the page table entry to zero, STEP 1342. The other bits in the PTE remain unchanged. Moreover, the frame descriptor is added to the processed list, STEP 1344. This is performed via an interlocked update operation. This completes processing of resolve.

Returning to FIG. 13a, after resolving the page, the PTE/PGSTE pair is conditionally unlocked, STEP 1322. For example, if the page control interlock indicator was set to one by this function, the indicator is set to zero.

Moreover, if the interval completion indicator was set by this function, serialization and checkpoint synchronization functions are performed and the interval completion indicator is reset, STEP 1324. This completes processing of the resolve function.

When the resolve function exits with an indication of success, the designated page has been resolved. In this case, the host translation tables have been updated by the machine and the previous requirement to transfer control to the host for page resolution is alleviated.

When the resolve function exits with an indication of failure, no changes to the translation tables have been made. In this case, the machine behaves as if the function was not invoked and the host is given control to handle the failure.

In addition to the SQBS instruction, the EQBS instruction has been implemented, in accordance with an aspect of the present invention. As examples, the guest issues an Extract QDIO Buffer State instruction when the guest receives notice from the adapter or on its own initiative when the buffer state is to be extracted. One embodiment of the logic associated with the Extract QDIO Buffer State instruction is described with reference to FIGS. 14a-14c.

Prior to running the program, certain initialization takes place. For example, the host performs various cleanup tasks, STEP 1400 (FIG. 14a), including, for instance, removing and processing frames on the processed frame descriptor list. Further, the host ensures that there are sufficient frames on the available frame descriptor list, STEP 1402. Thereafter, the host starts interpretive execution of the program, STEP 1404.

During execution, the program selects the next outstanding QDIO buffer the program is waiting for the adapter to finish processing, STEP 1406. The program then issues the EQBS instruction to retrieve the current state of the selected buffers, STEP 1408.

Figure 15:
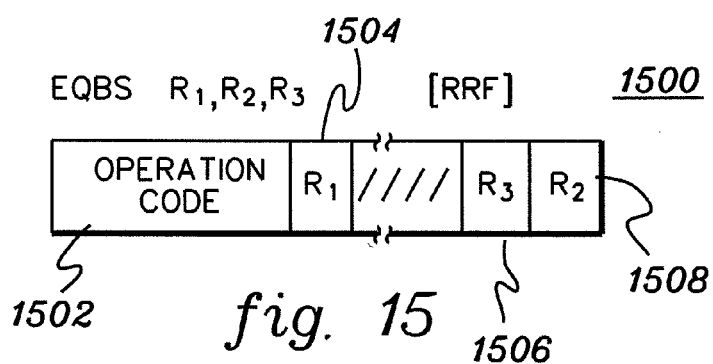
FIG. 15 depicts one example of the format of an Extract QDIO Buffer State instruction, in accordance with an aspect of the present invention.

One example of the format of an EQBS instruction is described with reference to FIG. 15. An Extract QDIO Buffer State instruction 1500 includes an operation code 1502 designating the EQBS instruction; a general register $R_1$ field 1504; a general register $R_3$ field 1506; and a general register $R_2$ field 1508, each of which is described below.

With the Extract QDIO Buffer State instruction, the state of one or more same state QDIO input queue or output queue buffers, specified by the general registers designated by the $R_1$ and $R_3$ fields, is extracted and loaded in the form of a QDIO buffer state indicator into the general register designated by the $R_2$ field. Optionally, specified buffers that are in the input buffer primed state may be changed to the input buffer acknowledged state. The operation proceeds until the specified buffers have their common state extracted or until at least some of the specified buffers have had their common state extracted and the next buffer state to be extracted is different from those previously extracted or until a CPU determined number of buffer states have had their common state extracted, whichever comes first. The result is indicated in the condition code.

General register 1 includes the subchannel token that designates the QDIO subchannel that is enabled for QDIO Enhanced Buffer State Management (QEBSM) and is to have one or more of its buffer states extracted.

The general register designated by the $R_1$ field includes a specification of the QDIO queue and the first buffer whose state is to be extracted. When the instruction is issued, the general register designated by the $R_1$ field includes the following fields:

(a) Queue Index (QIX): This field includes an unsigned integer index value that specifies the queue containing the buffers whose states are to be extracted. If the queue is an input queue, then the queue index is equal to the queue's input queue number. If the queue is an output queue, then the queue index is equal to the sum of the queue's output queue number plus the total count of established input queues. This field is to specify an existing queue (i.e., the queue index value is not to exceed the sum of the total count of established input queues plus the total count of established output queues minus one).

(b) Buffer Number (BNUM): This field includes an unsigned integer that specifies the number of the first buffer whose state is to be extracted. The value of this field is to be less than 128, in one example.

The general register designed by the $R_3$ field includes a count of the number of buffers whose states are to be extracted. The $R_3$ register also includes a condition code qualifier that is set along with the setting of the condition code when the instruction completes. When the instruction is issued, the general register designated by the $R_3$ field includes the following fields, in one example:

(a) Condition Code Qualifier (CCQ): When the instruction is issued, this field has no meaning. When the instruction completes, this field includes an unsigned integer condition code qualifier (CCQ) code that is set when the condition code is set. Examples of condition code qualifiers include the following:

All designated buffer states are extracted.
The state of the currently specified buffer is different than those states previously extracted during the execution of this instruction. The state of this buffer is not extracted.
The address of the storage list (SL) for the currently specified queue is invalid.

The address of the storage buffer address list (SBAL) for the currently specified buffer is invalid.

The address of a storage block (SB) for the currently specified buffer is invalid.

The designated subchannel is not operational.

The specified subchannel token does not designate a valid subchannel enabled for QEBSM.

The specified queue is not established for the designated subchannel.

The specified buffer number is invalid.

The specified buffer count is invalid.

A CPU determined number of buffer states have been extracted.

A CPU determined number of buffer storage blocks have been processed, but no complete buffer has been processed and no buffer state has been extracted.

(b) Count: This field includes an unsigned integer that specifies the count of the buffers whose states are extracted. The value of this field is to be greater than zero and less than or equal to 128; otherwise, a condition code and the $R_3$ condition code qualifier field are set. The buffer number space is in the range of 0 to 127. The count value, in conjunction with the $R_1$ BNUM value, may specify a wrap around in the buffer number space.

Before the instruction is issued, the general register designated by the $R_2$ field includes an indication of whether specified buffer states to be extracted and found to be in the input buffer primed state should be changed to the input buffer acknowledged state after the buffer state is extracted. When the instruction completes, the resulting condition code and condition code qualifier indicate, for instance, whether the register designated by the $R_2$ field includes the state of one or more buffers. The first buffer to which this state applies is identified by the values of the $R_1$ QIX and BNUM fields when the instruction is issued. The count of sequentially numbered buffers to which this state applies is the difference between the $R_3$ count field when the instruction is issued and the decremented $R_3$ count field when the instruction completes.

The general register designated by the $R_2$ field includes, for instance, the following fields:

(a) Acknowledge Input Buffers Control (I): When the instruction is issued and this field is one, specified buffers that are found to be in the input buffer primed state will be changed to the input buffer acknowledged state after the buffer state is extracted. When the instruction is issued and this field is zero, no input buffer states are changed.

(b) Buffer State (BSTATE): When the instruction is issued, this field has no meaning. When the instruction completes and the $R_3$ count field has been decremented, this field includes the value fetched from the storage list state block (SLSB) buffer state indicator. When the instruction completes and the $R_3$ count field has not been decremented, the contents of this field remain unchanged and have no meaning.

The unit of operation for the Extract QDIO Buffer State includes extracting one buffer state, loading the state into the $R_2$ BSTATE field, optionally changing the buffer state, decrementing the count field in the $R_3$ register by one, and incrementing the buffer number field in the $R_1$ register by one. If incrementing the buffer number field causes the buffer number to exceed the maximum buffer number of, for instance, 127, a wrap around in the buffer number space occurs and the buffer number is reset to, for instance, 0.

Instruction operation completes when one of the following occurs first:

When the count of buffers specified in the $R_3$ count field have had their common state extracted into the $R_2$ buffer state (BSTATE) field and no error or exception conditions have been encountered. In this case, a condition code and the $R_3$ condition code qualifier are set.

When an exception condition is encountered and none or some of the specified buffers have had their common state extracted. In this case, a condition code is set and the $R_3$ condition code qualifier is set with a value to indicate the exception. The count field in the $R_3$ register is decremented by the number of buffer states that have been extracted and the buffer number (BNUM) field in the $R_1$ register is incremented by the same number, wrapping around through zero if required. The specified buffer states have been extracted. If the count field is not zero, the $R_1$ queue index (QIX) and buffer number (BNUM) fields identify the buffer that was being processed when the exception condition was encountered.

When an error condition is encountered and none of the specified buffers have had their state extracted. In this case, a condition code is set and the $R_3$ condition code qualifier field is set with a value to indicate the error.

When a CPU determined number of buffers have had their common state extracted without extracting the total specified count of buffer states. In this case, a condition code and the $R_3$ condition code qualifier field are set. The count field in the $R_3$ register is decremented by the number of buffer states that have been extracted and the buffer number (BNUM) field in the $R_1$ register is incremented by the same number, wrapping around through zero if required.

When the CPU determines to complete the instruction before completing a single unit of operation. In this case, a condition code and condition code qualifier are set. The count field in the $R_3$ register and the buffer number (BNUM) field in the $R_1$ register remain unchanged and no state information is placed into the buffer state (BSTATE) field of the $R_2$ register.

A serialization and checkpoint synchronization function is performed before and after the specified buffer states are extracted.

The execution of Extract QDIO Buffer State does not change any information contained in the subchannel nor does it cause the I/O subsystem to interrogate or signal the adapter.

The processing associated with executing the EQBS instruction is described with reference to FIGS. 14a-14b. The instruction is advantageously executed by the machine unless an exceptional condition occurs. If such an exceptional condition occurs, then processing of the instruction is completed by the host.

Figure 14A:
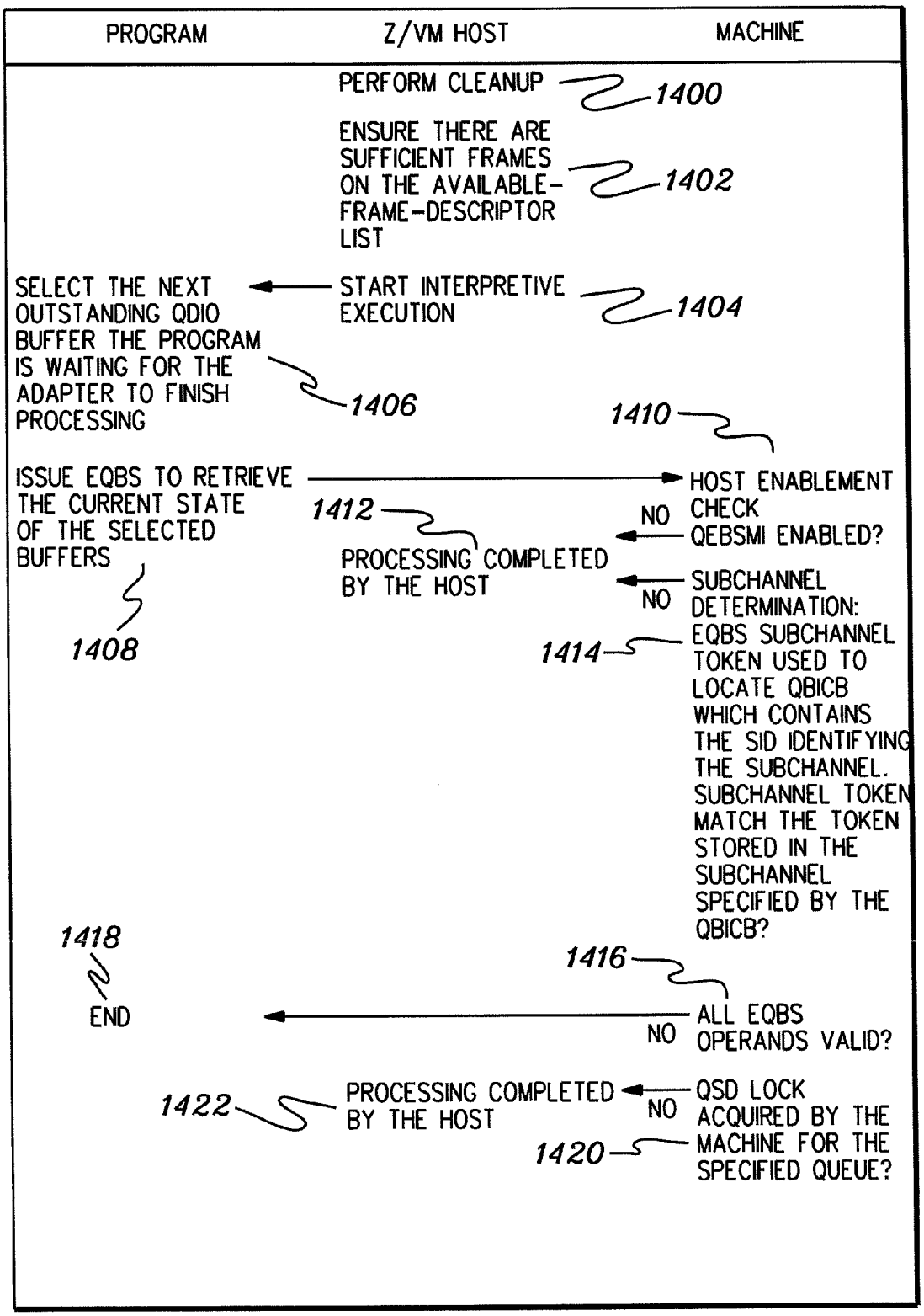
FIGS. 14a-14c depict one embodiment of the logic associated with an Extract QDIO Buffer State instruction for use with network protocol I/O requests, in accordance with an aspect of the present invention.

Referring to FIG. 14a, in response to the EQBS instruction being issued, the machine performs a host enablement check to determine whether the host enabled the guest for the QEBSM facility, STEP 1410. If the guest is not a pageable storage mode guest or the QEBSMI facility enablement control is zero, then processing is to be completed by the host, STEP 1412. Otherwise, processing continues with the machine.

Next, the machine performs a subchannel determination, STEP 1414. In one example, the subchannel token in general register 1 is used to locate the QBICB which includes the SID identifying the subchannel. A determination is made as to whether the subchannel token matches a token stored in the subchannel specified by the QBICB. If not, then processing is completed by the host; otherwise, processing continues with the machine.

A determination is made as to whether the EQBS operands are valid, STEP 1416. In one example, the buffer number is validated. If the $R_1$ buffer number (BNUM) field specifies a value greater than, for instance, 127, the instruction completes, and a condition code and condition code qualifier are set, STEP 1418. Further, the count value is validated. If the R₃ count field specifies a value of zero or a value greater than, for instance, 128, the instruction completes, and a condition code and condition code qualifier are set. Further, the queue storage descriptor for the specified queue is located. If the R₁ queue index field is greater than or equal to the value in the QBICB queue count field, the specified queue is not established for the subchannel, the instruction completes, and a condition code and condition code qualifier are set. Otherwise, the value of the R₁ queue index field is used as the index into the QBICB queue descriptor address array to determine the queue descriptor address.

Thereafter, an attempt is made to acquire by the machine the queue storage descriptor lock for the specified queue, STEP 1420. The QSD address is fetched from the queue storage address field in the QBICB queue descriptor for the specified queue. An attempt is made, using an interlocked update operation, to change the QSD lockword value from available to locked by the machine. If the QSD address is 0 or an access exception condition exists when attempting to set the lockword, an exception is recognized. If the interlocked update operation fails, this operation may be retried a model-dependent number of times. If the QSD lockword cannot be set to the predefined value, a partial execution interception is recognized and processing continues with the host, STEP 1422. However, if the interlocked update operation succeeds, processing continues with the machine.

Figure 14B:
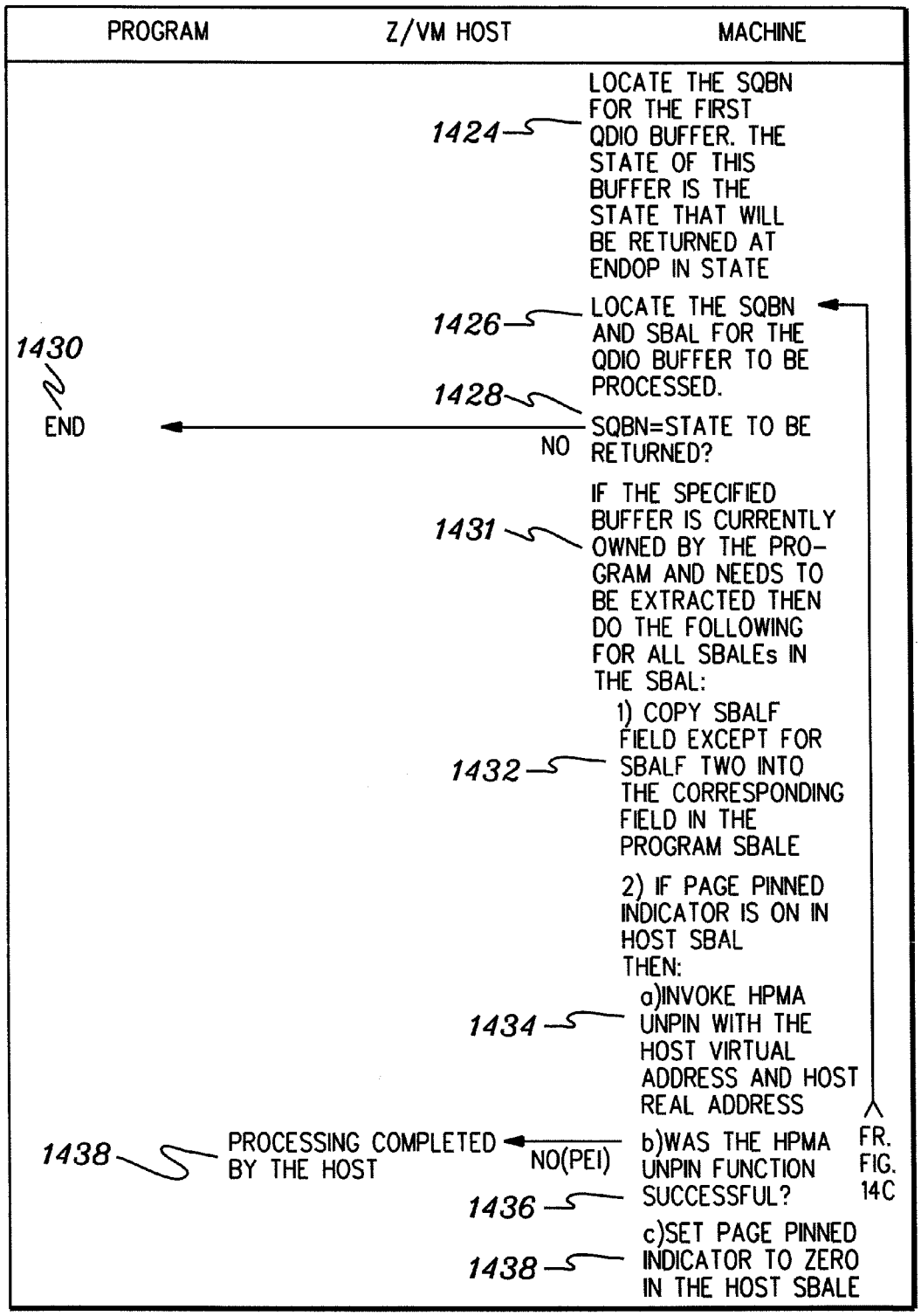

Next, the SQBN for the first QDIO buffer is located, STEP 1424 (FIG. 14*b*). The state of this buffer is the state that will be returned upon instruction completion in STATE. In particular, the host storage list for the specified queue is located by fetching the host storage list address from the host storage list address field in the queue storage descriptor. The specified queue's storage list state block is then located by fetching the SLSB address from the SLSB address field in the queue storage descriptor. Furthermore, the first SLSB entry (the SQBN) to be extracted is located. The value of the R₁ buffer number field is used as the index into the SLSB to determine the address of the first SQBN that is to be extracted.

The following logic is repeated for the number of QDIO buffers specified by the count field on the EQBS instruction. Initially, the SQBN and SBAL for the QDIO buffer to be processed are located, STEP 1426. Next, a determination is made as to whether this SQBN matches the STATE to be returned, STEP 1428. That is, if at least one buffer state has been extracted and the SQBN for the current buffer includes a designation of a state that is different from that previously extracted, the unit of operation is suppressed, the EQBS instruction completes, and a condition code and condition code qualifier are set, STEP 1430. Otherwise, processing continues.

If the specified buffer is currently owned by the program and needs to be extracted (buffer synchronization in host SBAL=1), STEP 1431, then the following is performed for all SBALEs (e.g., 16) in the SBAL:

(1) Copy SBALF fields in host SBALEs, except for SBALF 2 into the corresponding fields in the program SBALE, STEP 1432.

Figure 14C:
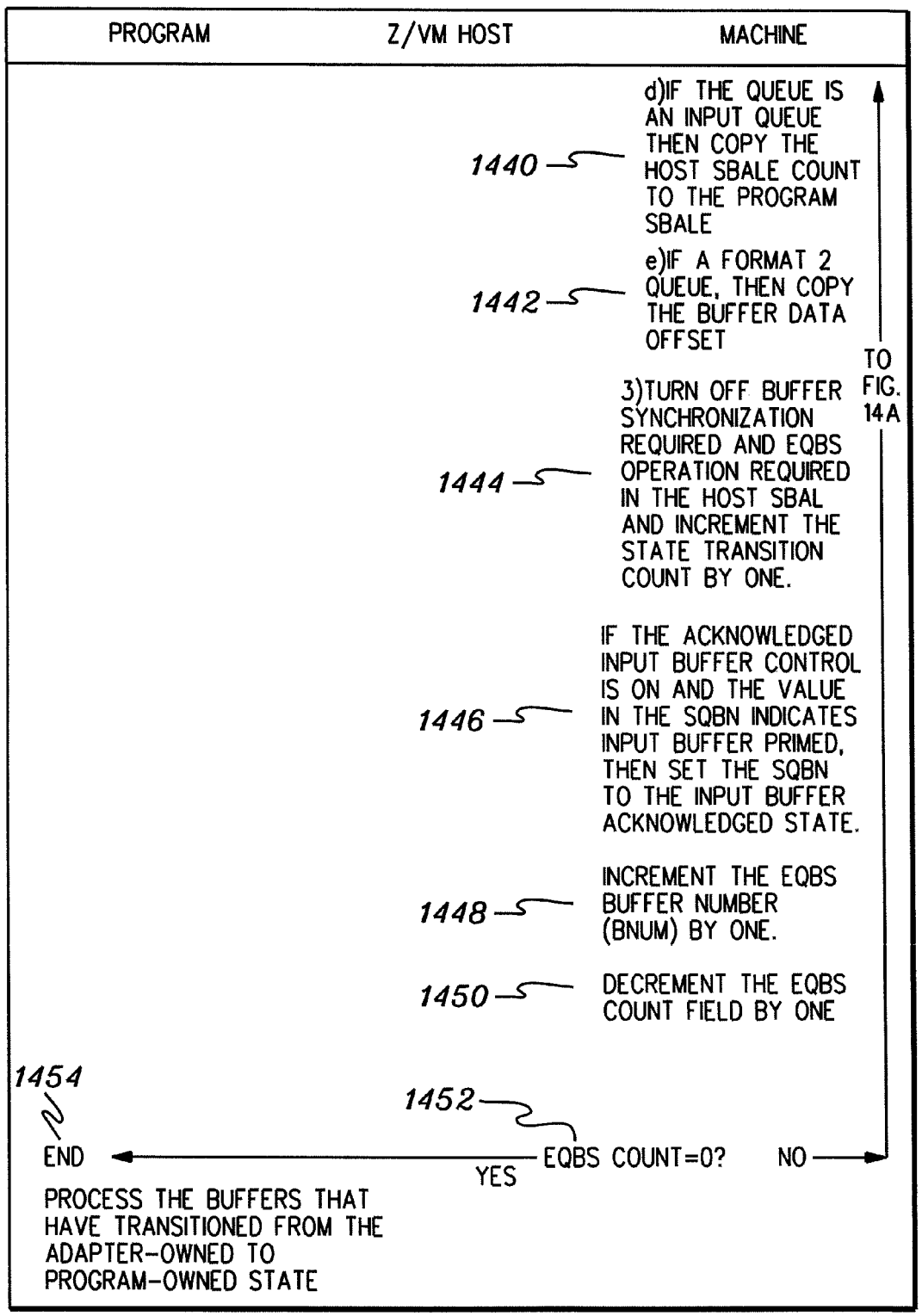

(2) If the page pinned indicator is on in the host SBAL, then:

a) An HPMA unpin function is invoked with the host virtual address (from program SBALE) and host real address (from the host SBALE), STEP 1434.

b) A determination is made as to whether the unpin function was successful, STEP 1436. If the unpin function was unsuccessful, then processing is completed by the host, STEP 1438. Otherwise, processing continues with the machine.

c) A page pinned indicator is set to zero in the host SBALE, STEP 1438.

d) If the queue is an input queue, the host SBALE count is copied to the program SBALE, STEP 1440 (FIG. 14*c*).

e) If a format 2 input queue, then the buffer data offset (i.e., the offset of the data into the buffer page) of the host SBALE is copied into the guest SBALE leaving the remainder of the buffer address intact, STEP 1442.

(3) Thereafter, buffer synchronization required and EQBS operation required indicators are turned off in the host SBAL and the state transition count in the QSD is incremented by one, STEP 1444.

If the acknowledged input buffer control is on and the value in the SQBN indicates input buffer primed, then the SQBN is set to the input buffer acknowledged state, STEP 1446. The EQBS buffer number is also incremented by one, STEP 1448, and the EQBS count field is decremented by one, STEP 1450.

Next, a determination is made as to whether the EQBS count is equal to zero, STEP 1452. If not, then processing continues with locate the SQBN and SBAL for the QDIO buffer to be processed, at STEP 1426 (FIG. 14*b*). If the EQBS count is equal to zero, then processing completes with a successful indication. The program may then process the buffers that have transitioned from the adapter owned to program owned state, STEP 1454. For instance, it may process input that has arrived or handle completion of output requests (e.g., reclaim buffers).

If the EQBS processing had to be completed by the host, then the host presents the appropriate condition code and condition code qualifier to the program, instead of the machine.

As described above, the EQBS instruction may invoke the HPMA unpin by virtual address function. This function provides the CPU with the ability to indicate that the contents of a host page no longer need to be pinned in a host page frame on behalf of the I/O request. The page to be unpinned is specified by a host virtual address. One or more pinned page counters that are associated with a page may be decremented when a page is successfully unpinned.

In one example, the inputs to this function include the virtual address (page) to be unpinned; the effective address space control element (ASCE) that identifies the address space assigned to the guest and the translation tables to be used; and the host real address of the page to be unpinned.

To facilitate host data structure validity determination, the invoker of the unpin host page by virtual address function is responsible for ensuring that the interval completion indicator is set throughout the checkpoint interval in which the function is invoked. The unpin host page by virtual address function does not examine or modify the interval competition indicator.

Figure 16:
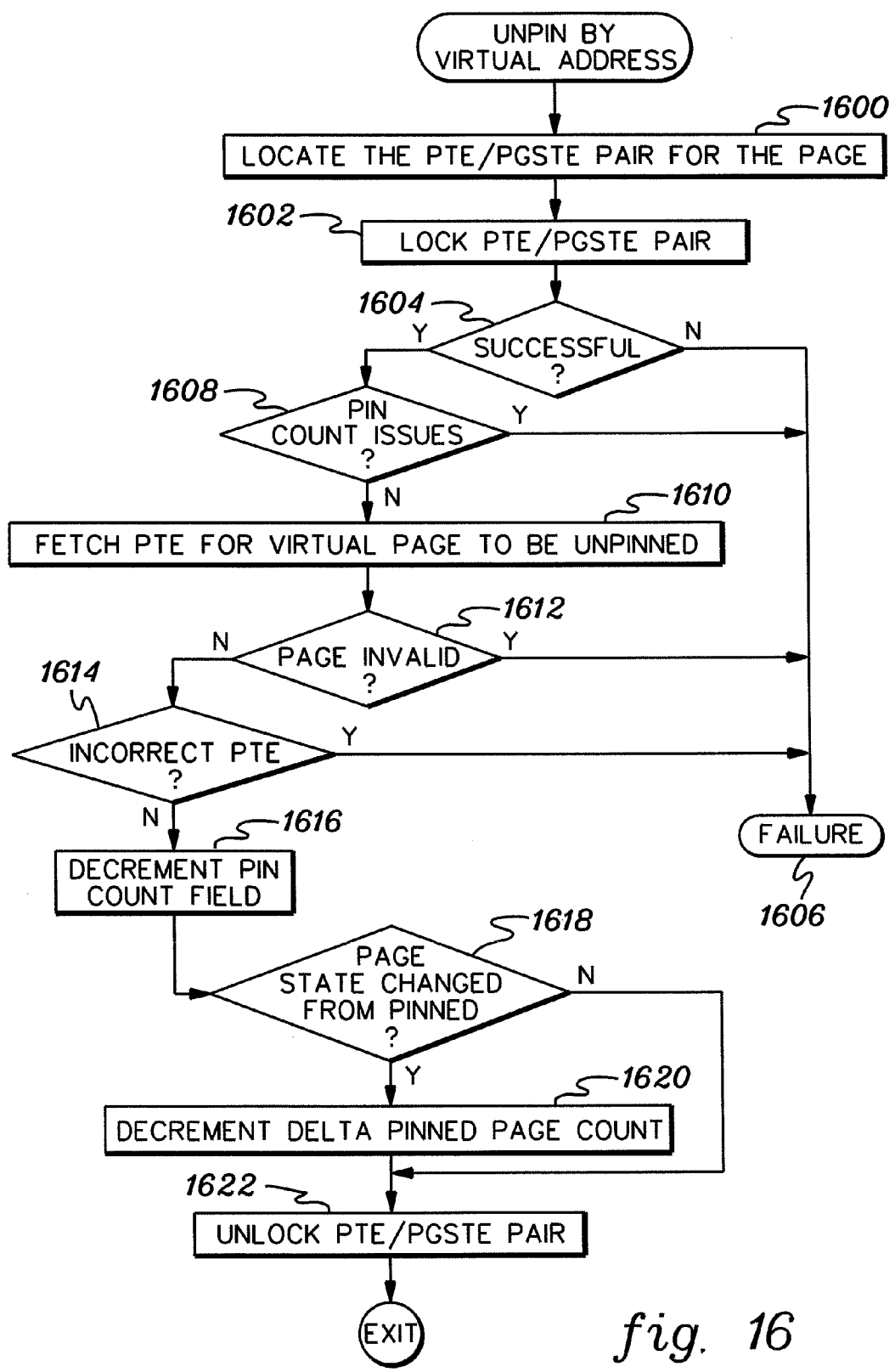
FIG. 16 depicts one embodiment of the logic associated with an unpin host page by virtual address function, in accordance with an aspect of the present invention.

One embodiment of the logic associated with the unpin host page by virtual address function is described with reference to FIG. 16. Initially, the PTE/PGSTE pair for the page is located, STEP 1600. Using the host virtual address to be unpinned and the host address space control element (ASCE), the host real addresses of the corresponding page table entry and page status table entry are determined Once located, the PTE/PGSTE pair is locked using, for instance, an interlocked update operation which changes the page control interlock indicator from zero to one, STEP 1602. If the PTE/PGSTE pair cannot be locked or if the PGSTE.PCL is already one, INQUIRY 1604, then processing ends with failure, STEP 1606; otherwise, processing continues.

A determination is made as to whether the pin count for the page will underflow with the next unpin (i.e., if the value of the pin count field in the PGSTE is zero), INQUIRY 1608. If so, then processing once again completes with a failure, STEP 1606; otherwise, processing continues with fetching the PTE of the virtual page to be unpinned, STEP 1610. In one example, the page table entry is fetched block-concurrently from host storage.

If the page is invalid or the page invalid bit is one, INQUIRY 1612, then processing once again ends in a failure, STEP 1606. Otherwise, a determination is made as to whether an incorrect PTE has been located, INQUIRY 1614. That is, if the page frame real address field in the PTE does not designate the same page as the input host real address of the page to be unpinned, then an incorrect PTE has been located, and processing ends, STEP 1606. Otherwise, processing continues. The pin count field in the PGSTE is decremented by one, STEP 1616, and a determination is made as to whether the page state is being changed from pinned to unpinned, INQUIRY 1618. If the page state is being changed from the pinned to the unpinned state, then the associated delta pinned page count is decremented by one, STEP 1620. That is, if the pin count is now zero and the pin count is not in an overflow state (PGSTE.PCO=0), then the page state has transitioned from the pinned to the unpinned state, and the delta pinned page count is decremented by one.

Thereafter, or if the page state has not changed from pinned to unpinned, then the PTE/PGSTE pair is unlocked by, for instance, setting the page control interlock indicator to zero, STEP 1622. This completes processing of the unpin by virtual address function.

When the unpin function exits with an indication of failure, no changes to the status tables have been made. In this case, the machine behaves as if the function was not invoked and the host is given control to handle the failure. When this function exits with an indication of success, the designated page has been unpinned. In this case, the host status tables have been updated by the machine and the previous requirement to transfer control to the host for page pinning is alleviated.

Another function that can be invoked is an unpin host page by PTE address function. This function provides a CPU with the ability to indicate that the contents of a host page are no longer pinned in the host page frame. The page to be unpinned is specified by the host real or absolute address of the host page table entry. One or more pinned page counters that are associated with a page table may be decremented when the page is successfully unpinned.

In one example, the input to the unpin host page by PTE address function includes the host real address or the host page table entry for the page to be unpinned.

Figure 17:
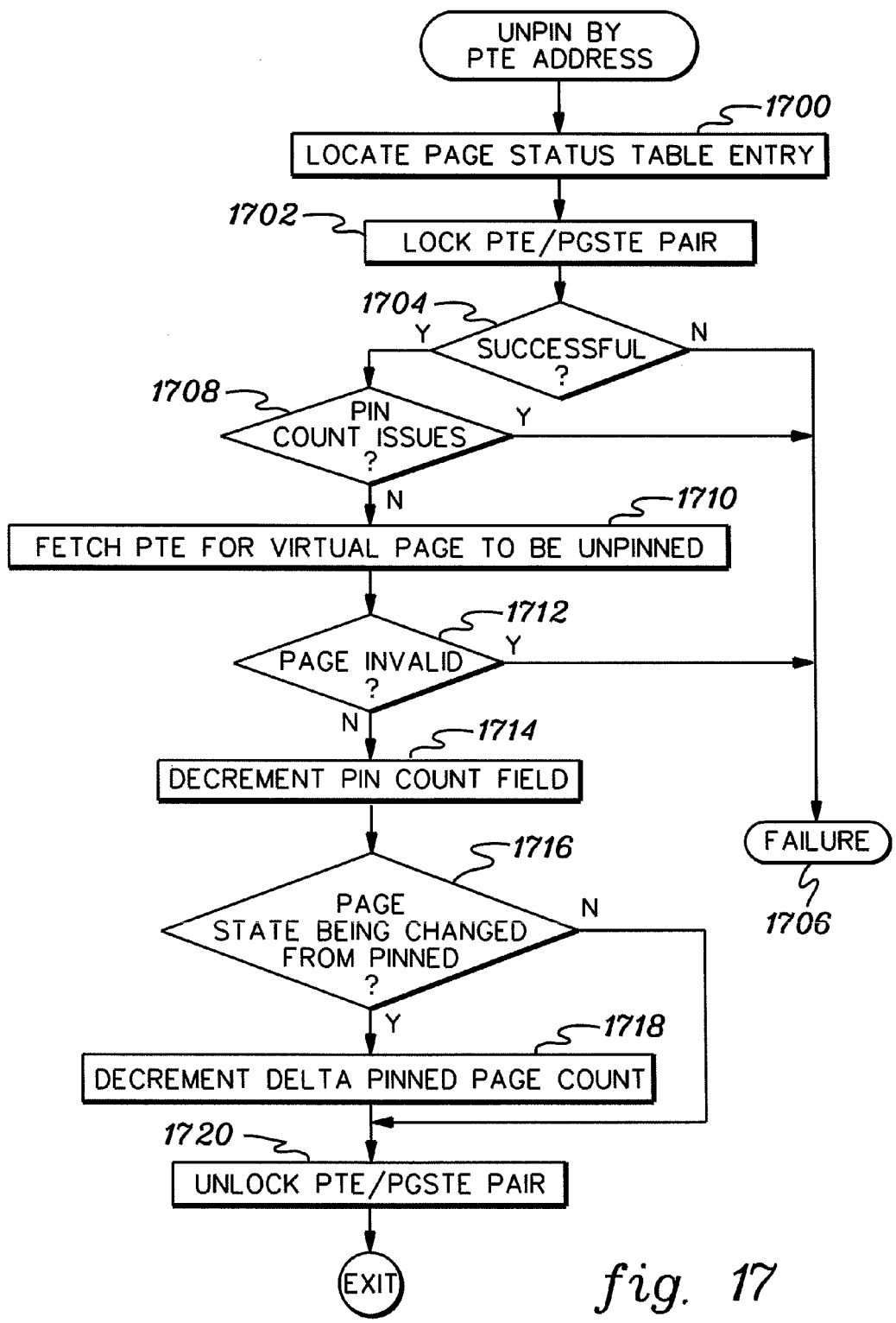
FIG. 17 depicts one embodiment of the logic associated with an unpin host page by PTE address function, in accordance with an aspect of the present invention.

One embodiment of the logic associated with the unpin host page by PTE address function is described with reference to FIG. 17. Initially, the page status table entry corresponding to the input page table entry is located, STEP 1700. The PTE/PGSTE pair is then locked, STEP 1702. In one example, an interlocked update operation is used in an attempt to change the page control interlock indicator in the PGSTE from zero to one. If the PTE/PGSTE pair could not be locked, or if the PGSTE.PCL was already one, INQUIRY 1704, then processing exits with a failure, STEP 1706.

On the other hand, if the lock was successful, then a further determination is made as to whether the pin counts of the page will underflow with the next unpin (i.e., if the value of the pin count field in the PGSTE is zero), INQUIRY 1708. If so, then processing once again exits in failure, STEP 1706. Otherwise, the PTE for the virtual page to be unpinned is fetched, STEP 1710. In one example, it is fetched block-concurrently from host storage.

Thereafter, a determination is made as to whether the page is invalid, INQUIRY 1712. In particular, the page invalid indicator is checked. If it is one, then the page is invalid and processing exits in failure, STEP 1706. If the page is valid, then the pin count field in the PGSTE is decremented by one, STEP 1714.

Next, a determination is made as to whether the page state is being changed from pinned to unpinned, INQUIRY 1716. If the pin count is now zero and the pin count is not in an overflow state, then the page state has transitioned from the pinned to the unpinned state. Thus, the delta pinned page count is decremented by one, STEP 1718. Thereafter, or if the page state is not being changed from pinned to unpinned, then the PTE/PGSTE pair is unlocked, STEP 1720. In one example, this includes setting the page control interlock indicator to zero. This concludes processing of the unpin page by PTE address function.

When the unpin function exits with an indication of failure, no changes to the status tables have been made. In this case, the machine behaves as if the function was not invoked and the host is given control to handle the failure. When this function exits with an indication of success, the designated page has been unpinned. In this case, the host status tables have been updated by the machine and the previous requirement to transfer control to the host for page pinning is alleviated.

Described in detail above is processing associated with interpretating I/O operation requests from pageable storage guests absent host intervention. The requests can be requests to network protocol (e.g., internet protocol) or network devices via QDIO adapters or similar adapters based on a network protocol. As a further example, the requests can be requests to fibre channel attached devices based on a fibre channel protocol (FCP).

An FCP adapter is connected to other elements in the CPC via a channel path between the adapter and main storage, similar to non-FCP adapters, such as QDIO adapters. However, processing associated with FCP adapters is different in some respects than processing associated with non-FCP adapters. For instance, data input and output is performed via a QDIO output queue and the QDIO input queue is used only for the adapter to signal completion of an I/O operation. Further, when the FCP adapter places an output queue buffer in the program owned state, the I/O operation, including the transfer of data, may not be totally complete. (This is contrary to the QDIO architecture for non-FCP adapters.) Even though the buffer is in the program owned state, the program is not to perform any action on the buffer pages until the adapter signals completion of the I/O operation through the input queue. However, the program may perform actions on the QDIO data structures associated with the buffers, as long as the buffer pages remain untouched.

When an FCP operation is initiated, a unique request id is passed from the program to the adapter. It is this request id that is returned in the input queue that signals that the operation is totally complete and that the program may interact with the buffer pages.

Thus, with FCP, there is the ability to disconnect the buffer pages from the QDIO data structures. In other words, copies of the addresses of the buffer pages in the QDIO data structures could be kept in another location and new buffer pages can be allocated, their addresses placed into the QDIO data structures, specifically into the desired SBALEs, and a new I/O operation initiated—all while waiting for the request id from the adapter that the operation has completed on the original set of buffer pages (whose addresses where copied).

To facilitate this retention of a description of the disconnected buffer pages, the FCP Operations Block (FOB) was designed. The FOB is a structure that is built when SQBS is issued by the guest specifying an FCP request, and as the machine resolves and pins pages, it records the host page table entry addresses of the buffer pages in the FOB. The machine also records the guest's request id in the FOB and replaces it with a request id that is equal to the address of the FOB. Then, later when the adapter returns that request id in the input queue and the guest issues EQBS to interrogate the state of the input queue, the machine can locate the FOB, unpin the pages, and replace the request id with the original guest value that was recorded earlier.

Further details regarding processing for FCP are described with reference to FIGS. 18*a*-18*d* and 19*a*-19*e*. In particular, one example of the processing associated with an SQBS instruction for the FCP protocol is described with reference to FIGS. 18*a*-18*d*, and one example of the processing associated with an EQBS instruction for the FCP protocol is described with reference to FIGS. 19*a*-19*e*.

Figure 18A:
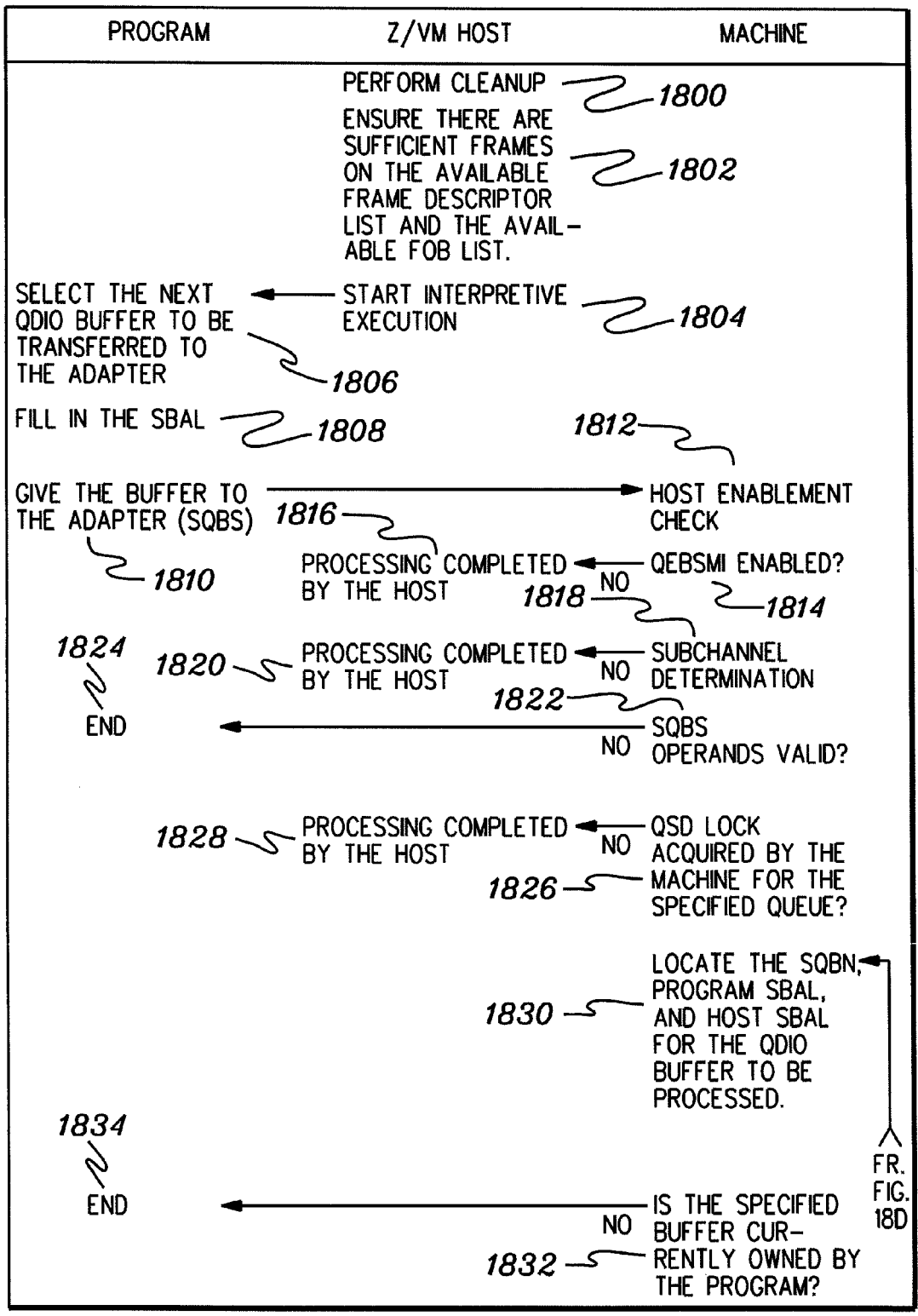

Referring initially to FIG. 18*a*, prior to invoking a Set QDIO Buffer State instruction for FCP, certain initialization takes place. For example, the host performs various cleanup tasks, STEP 1800 (FIG. 18*a*) including, for instance, removing and processing frames on the processed frame descriptor list. In addition to performing cleanup, the host ensures that there are sufficient frames on the available frame descriptor list and on the available FOB list, STEP 1802.

Subsequent to performing cleanup and/or ensuring there are sufficient frames on the relevant lists, a host can start interpretive execution of the program, STEP 1804. The program begins to execute and during execution, the program selects the next QDIO buffer to be transferred to the adapter, STEP 1806. The program fills in the SBAL with the program absolute addresses of the storage blocks to be used for the data transfer, STEP 1808. Further, the program transfers ownership of the buffer to the adapter by issuing a Set QDIO Buffer State instruction changing the state of the QDIO buffer from program owned to adapter owned, STEP 1810.

In response to the SQBS instruction being issued, the machine performs a host enablement check to determine whether the host enabled the guest for the QEBSM facility, STEP 1812. If a QEBSMI enablement control (e.g., in guest state) is set to zero indicating non-enablement, STEP 1814, then processing is to be completed by the host instead of the machine, STEP 1816. When a condition is encountered during Set QDIO Buffer State interpretation that requires some action or service from the host, either an instruction interception or a partial execution interception (PEI) is recognized, an interception parameter is set with the Set QDIO Buffer State instruction text, and for PEI, QEBSM-PEI parameters are set in guest state.

Next, the machine performs a subchannel determination, STEP 1818, in which a determination is made as to whether the subchannel token matches the token stored in the subchannel specified by the QBICB. If not, then processing is completed by the host, STEP 1820. Otherwise, processing continues with the machine.

Moreover, a determination is made by the machine as to whether the SQBS operands are valid, STEP 1822. If any of the operands are invalid, then processing ends, and a condition code and condition code qualifier are set, STEP 1824. Otherwise, processing continues.

Next, an attempt is made to acquire the queue storage descriptor lock for the specified queue, STEP 1826. If the QSD lock is not acquired, then processing is completed by the host, STEP 1828. Otherwise, processing continues by the machine.

The following logic is repeated for the number of QDIO buffers specified by the count field in the SQBS instruction. Initially, the SQBN, program SBAL and corresponding host SBAL for the QDIO buffer to be processed are located, STEP 1830. Thereafter, a determination is made as to whether the specified buffer is currently owned by the program, STEP 1832. If the buffer is not owned by the program, then processing completes with a condition code and condition code qualifier, STEP 1834. Otherwise, processing continues with a determination as to whether the state of the specified buffer is to be extracted with the EQBS instruction, STEP 1836 (FIG. 18*b*). If so, then again processing completes with a condition code and condition code qualifier, STEP 1838. Otherwise, processing continues with copying the contents of the guest SBAL to the host SBAL, STEP 1840. Moreover, the buffer synchronization and EQBS operation required bits in the host's SBAL are set, STEP 1842.

Further, if the SBAL buffer sequence bits indicate this is a new FCP request (as opposed to the continuation of a request spanning multiple SBALs), then the previous FCP request, if any, is marked as completed, STEP 1844. For instance, the host SBALE 0 entry is checked for an indication of a new request: If the buffer sequence type in the SBAL-Flags (SBALF) field of the guest SBALE 0 indicates that a command is specified, the pending request component FOB list completion bit in the queue flags field of the QSD address is one, and there are FOBs in the active request head FOB list, the construction complete bit in the flags field of the first head FOB in the list is set to 1, and the pending request component FOB list complete bit in the queue flags field of the QSD address is set to zero.

Next, a determination is made as to whether there is an FOB on the available FOB list, STEP 1846. If not, then processing is completed by the host, STEP 1848. Otherwise, processing continues by the machine. For example, the first available FOB from the available FOB list is removed from that list and the available FOB count is decremented by one, STEP 1850. Then, the new FOB is added to the appropriate list based on the buffer sequence bits in the SBAL, STEP 1852. For instance, if this is the first or only SBAL, then this is a new FCP request. In that case, the FOB is a head FOB and is inserted on the active request FOB list and the request is marked active in the FOB. However, if this is the middle or last SBAL, then this is a continuation or the last SBAL of a multiple SBAL FCP request. Thus, this FOB is a non-head component FOB and is added to the request component FOB list of the first head FOB on the active request FOB list anchored in the queue storage descriptor.

For a head FOB, the following processing occurs, STEP 1854:

1) The pending request component completion indicator in the QSD flags is set, STEP 1856;
2) The request identifier specified by the program in SBALE 0 is saved in the guest request id field, STEP 1858;
3) The address of the QSD is stored in the queue storage descriptor address field in the FOB to identify the specific queue associated with this request, STEP 1860 (FIG. 18*c*);
4) The address of the QBICB is stored in the QDIO buffer information control block address field to associate the subchannel to this request, STEP 1862;
5) The address of the head FOB is set as the request id field in SBALE 0 of the host SBAL, STEP 1864; and 6) The FCP storage block type from SBALF 0 is stored in the storage block type in the FOB to define the type of storage operation to be performed, STEP 1866.

Further, for each meaningful host SBALE that has a valid storage block address, the following functions are performed, STEP 1868:

1) The program absolute (host virtual) storage block address is fetched from the host SBALE, STEP 1870;

2) An HPMA pin function is invoked to translate and lock the page in storage, STEP 1872. In one example, the HPMA function is invoked and passed the following input data items:

The host virtual address to be pinned: The guest storage block data address from the host SBALE is the virtual address to be pinned.

The effective host address space control element (ASCE) of the address space in which the page is to be pinned: The primary address space control element (PASCE) is specified as the effective ASCE.

A fetch or store access indication: If the specified queue is an input queue, a store access operation is indicated. If the specified queue is an output queue and the QBICB queue-format (QFMT) field indicates that the queue is not a format-1 output queue, a fetch-access operation is indicated. If the specified queue is an output queue and the QBICB queue-format (QFMT) field indicates that the queue is a format-1 output queue, then a fetch access operation is indicated, if the host SBALE designates a write buffer storage block; otherwise, a store access operation is indicated.

An indication whether the content of the page may be replaced: If the specified queue is an input queue, page content replacement is indicated. If the specified queue is an output queue and the QBICB queue format (QFMT) field indicates that the queue is not a format-1 output queue, page content replacement is not indicated. If the specified queue is an output queue and the QBICB queue format (QFMT) field indicates that the queue is a format-1 output queue, then page replacement is indicated, if the host SBALE designates a status read buffer or a read buffer storage block and the data count in the SBALE is, for instance, 4K bytes.

3) If the HPMA pin function is unsuccessful, STEP 1874, then processing is completed by the host, STEP 1876. Otherwise, processing continues by the machine. For instance, if the HPMA pin host page function completes with an indication of success, the page frame real address returned by the pin host page function is copied into the data address field of the host SBALE and the pinned page indicator bit in the virtualization flags (VFlags) field of the current SBALE is set to 1. If the HPMA pin host page function completes with an indication that a validity interception should be recognized, the indicated validity interception is recognized If the HPMA pin host page function completes with an indication of failure, a partial execution interception is recognized and the partial execution interception reason code in the QEBSM-PEI parameters field in guest state is set according to the HPMA pin host page function failure reason; otherwise, processing continues.

4) The PTE address returned by HPMA is moved into the next available entry in the FOB PTE address array and the PTE count field is incremented by one, STEP 1878 (FIG. 18*d*); and 5) The data count field from the host SBALE is added to the byte transfer count in the QSD, STEP 1880.

If this is the last SBAL of a multiple SBAL or the only SBAL of an FCP request, then the request is marked as complete in the FOB and the pending request FOB list completion indicator is set to 0.

Thereafter, the buffer's SQBN is set to the adapter owned state specified by the SQBS instruction, STEP 1884. Additionally, the SQBS buffer number is incremented by one, STEP 1886, and the SQBS count field is decremented by one, STEP 1888.

A determination is made as to whether the SQBS count is equal to zero, STEP 1890. Should the SQBS count not be equal to zero, then processing continues with locate the SQBN, program SBAL and host SBAL for the QDIO buffer to be processed, STEP 1830 (FIG. 18*a*). However, if the SQBS count is equal to zero, then processing continues with unlocking the QSD lock, STEP 1892. If successful, an indication of success is forwarded to the program, STEP 1894. If this is the last QDIO buffer to be transferred at this time, then a SIGA-wt instruction is issued, STEP 1896.

In addition to the above changes associated with processing an SQBS instruction for the FCP protocol, there are changes associated with the EQBS instruction. One example of the logic associated with the EQBS instruction for FCP requests is described with reference to FIGS. 19*a*-19*e*.

Prior to running the program, certain initialization takes place. For example, the host performs various cleanup tasks, STEP 1900, including, for instance, removing and processing frames on a processed frame descriptor list. Further, the host ensures that there are sufficient frames on the available frame descriptor list and the available FOB list, STEP 1902. Thereafter, the host starts interpretive execution of the program, STEP 1904.

During execution, the program selects the next outstanding QDIO buffer or buffers the program is waiting for the adapter to finish processing, STEP 1906. The program then issues the EQBS instruction to retrieve the current state of the selected buffer(s), STEP 1908.

In response to the EQBS instruction being issued, the machine performs a host enablement check to determine whether the host enabled the guest for the QEBSM facility, STEP 1910. If the guest is not a pageable storage mode guest or the QEBSMI facility enablement control is zero, INQUIRY 1912, then processing is to be completed by the host, STEP 1914. Otherwise, processing continues with the machine.

Next, the machine performs a subchannel determination, STEP 1916. If the subchannel token does not match the token stored in the subchannel specified by the QBICB, then processing is completed by the host, STEP 1914; otherwise, processing continues with the machine.

Further, a determination is made as to whether the EQBS operands are valid, STEP 1918. If one or more of the operands are invalid, then processing ends, and a condition code and condition code qualifier are set, STEP 1920. Otherwise, processing continues.

An attempt is made by the machine to acquire a queue storage descriptor lock for the specified queue, STEP 1922. If the QSD lock is not acquired, a partial execution interception is recognized and processing continues with the host, STEP 1924. However, if the lock is acquired (e.g., the interlocked update operation succeeds), processing continues with the machine.

Next, the SQBN for the first QDIO buffer is located, STEP 1926. The state of this buffer is the state that will be returned upon instruction completion in STATE.

The following logic is repeated for the number of QDIO buffers specified by the count field on the EQBS instruction. Initially, the SQBN, program SBAL, and corresponding host SBAL for the QDIO buffer to be processed are located, STEP

Figure 19A:
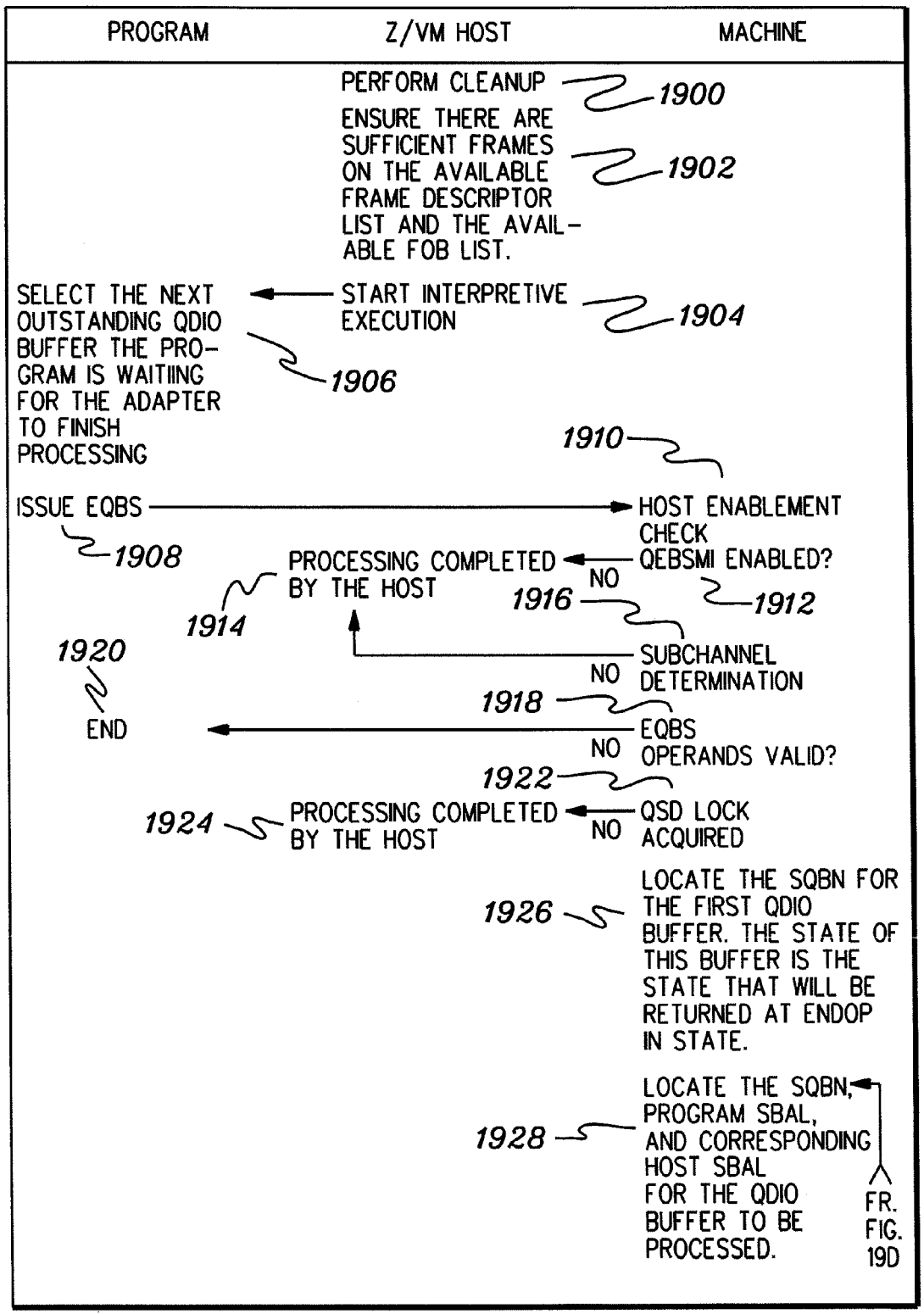
Figure 19B:
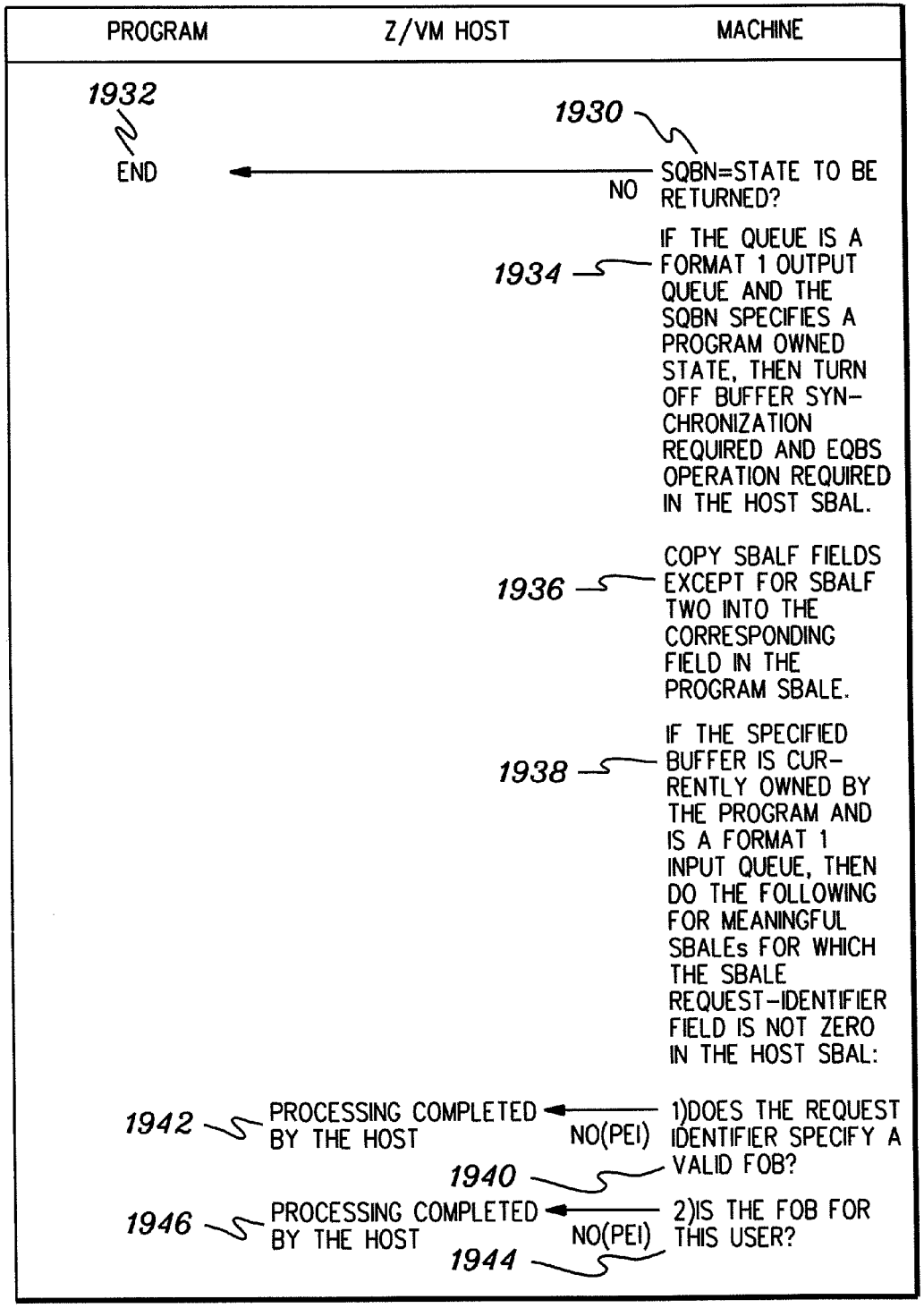
Figure 19E:
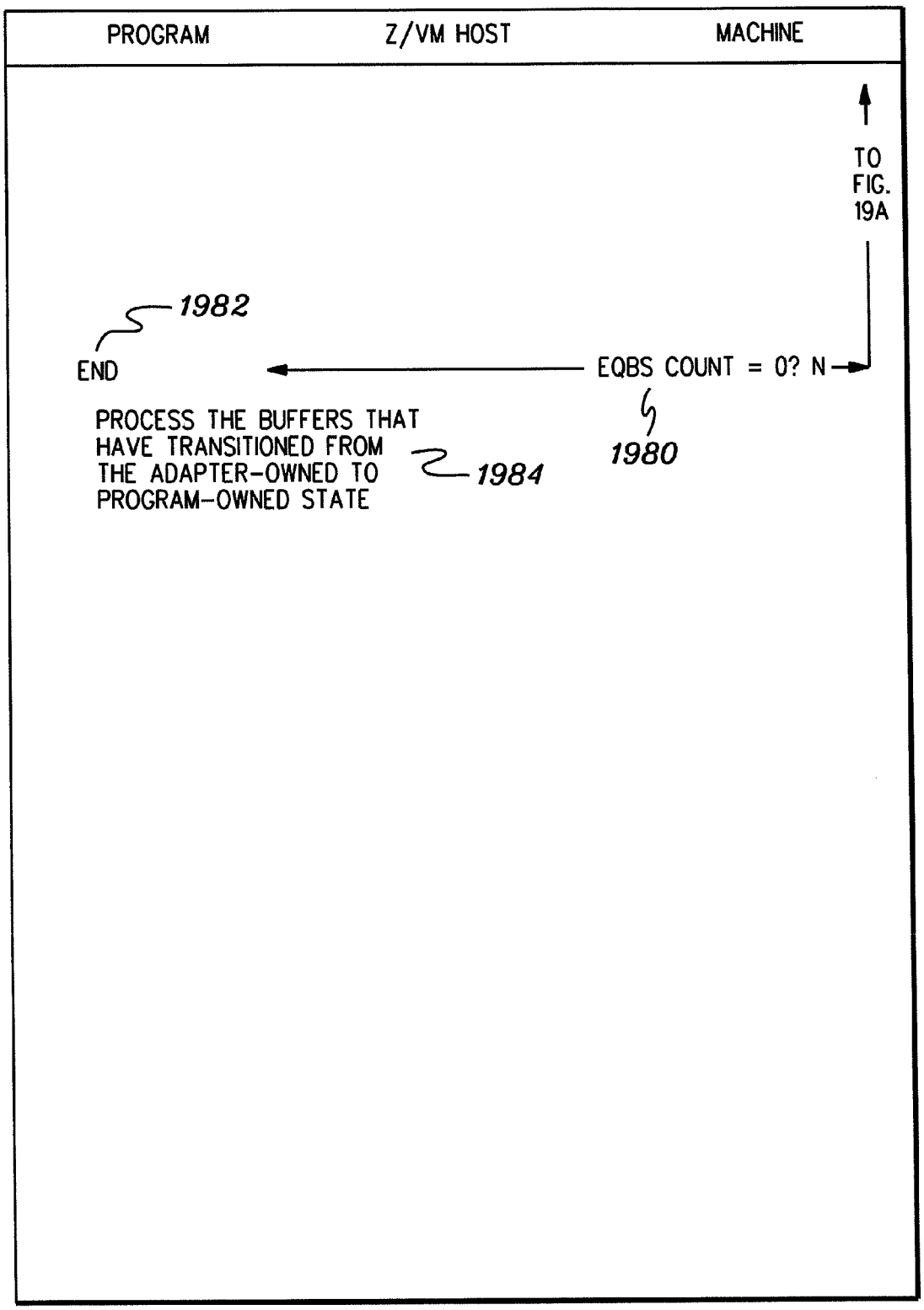

1928. Next, a determination is made as to whether the SQBN matches the STATE to be returned, STEP 1930 (FIG. 19*b*). If not, then processing ends, and a condition code and condition code qualifier are set, STEP 1932. Otherwise, processing continues.

If the queue is an FCP (e.g., format 1) output queue and the SQBN specifies a program owned state, then the buffer synchronization required and EQBS operation required indicators in the host SBAL are turned off, STEP 1934. Moreover, the SBALF fields, except for SBALF 2, are copied into the corresponding fields in the program SBALE, STEP 1936.

If the specified buffer is currently owned by the program and it is a format 1 input queue, then the following steps are performed for meaningful SBALEs for which the SBALE request identifier field is not zero in the host SBAL, STEP 1938:

1) The absolute address of the head FOB that represents the completed FCP request is the request identifier returned in the host SBALE. A determination is made as to whether this request identifier specifies a valid FOB, STEP 1940. For instance, a check is made as to whether the subchannel token in the QBICB specified in the FOB pointed to by the request id matches the token specified on the SQBS instruction. If not, then processing is completed by the host, STEP 1942; otherwise, processing continues with the machine.

2) The head FOB returned by the adapter is validated for this user by verifying that the subchannel token in the QBICB specified in the FOB matches the token specified on the SQBS instruction. If the FOB is not for this user, STEP 1944, then processing is completed by the host, STEP 1946; otherwise, processing continues with the machine.

3) An attempt is made to acquire the QSD lock for the output queue specified in the FOB that was built when the FCP request was initiated. If the lock cannot be acquired in a reasonable amount of time, STEP 1948 (FIG. 19*c*), then processing is completed by the host, STEP 1950; otherwise, processing continues with the machine. In this step and steps to follow in which processing is to be completed by the host after the machine has obtained one or more locks, the state of those locks is first changed to "locked for the host by the machine."

4) It is verified that the FOB is currently on the active request list and is complete. If the request active and construction complete indicators are on and the request id posted indicator is off in the FOB flag, STEP 1952, then processing is completed by the host, STEP 1954; otherwise, processing continues with the machine.

5) A request id posted indicator in the head FOB flag field is set on, STEP 1956.

6) The following logic occurs for the head FOB which represents the request and the component FOBs that may be associated and linked off the head FOB, the head FOB being processed last, STEP 1958:

a) For each nonzero PTE address array entry in the FOB that is within the range specified by the FOB PTE count, the HPMA unpin host by PTE address function is invoked, STEP 1960. If the unpin function is unsuccessful, then processing is completed by the host, STEP 1962; otherwise, processing continues with the machine.

b) If this is a component FOB, then it is removed from the request component FOB list anchored off the head FOB, STEP 1964 (FIG. 19*d*).

c) If this is a head FOB, then copy the guest request id from the head FOB into the request id field of the program SBALE, zero the request id in the host SBALE to indicate the request id was processed and remove the head FOB from the active request FOB list anchored off the output queue QSD, STEP 1966.

d) Clear prespecified words of the FOB, insert it at the beginning of the available FOB list, and increment the available FOB count by one, STEP 1968.

7) The output queue QSD lock is released, STEP 1970.

8) The buffer synchronization required and EQBS operation required indicators are turned off in the host SBAL, and the state transition count is incremented by one, STEP 1972.

If the acknowledged input buffer control is one and the value in the SQBN indicates the input buffer primed state, then the SQBN is set to the input buffer acknowledged state, STEP 1974.

Thereafter, the EQBS buffer number is incremented by one, STEP 1976, and the EQBS count field is decremented by one, STEP 1978. If the EQBS count field is not equal to zero, STEP 1980 (FIG. 19*e*), then processing continues with locate the SQBN, program SBAL, and corresponding host SBAL for the QDIO buffer to be processed, STEP 1928 (FIG. 19*a*). Otherwise, processing is complete, STEP 1982. The program may then process the buffers that have transitioned from the adapter owned state to the program owned state, STEP 1984.

As described above, the QDIO architecture is extended such that pageable storage mode guests may experience near native QDIO performance. This V=V QDIO passthrough capability can approach the same levels of processor efficiency as would be derived natively in the absence of the virtual machine operating environment. This is accomplished by relocating the QDIO buffer state information from the pageable storage mode guests execution address space into host (e.g., VM host) storage and implementing instructions to allow the guest to manipulate the buffer states and manage host translations and shadow structures accordingly. Two instructions are introduced that give the program the capability to manage QDIO buffer states by queue number/buffer number designation, instead of by directly addressing the buffer states in program storage. This abstracted form of buffer state designation allows the interpreted versions of these instructions to be implemented in a manner that improves the performance of pageable mode virtual machine QDIO operations. It also allows reduction in SIGA overhead (fewer SIGAs). Moreover, the subchannel token representation allows interpretation of SIGA for subchannels assigned in the program, thus eliminating host involvement in SIGA handling in most cases.

A QDIO subchannel is enabled for QDIO Enhanced Buffer State Management, when an Establish QDIO Queues CCW command that specifies a request for QDIO Enhanced Buffer State Management enablement successfully completes.

A QDIO subchannel is disabled for QDIO Enhanced Buffer State Management, when an Establish QDIO Queues CCW command that does not specify a request for QDIO Enhanced Buffer State Management enablement successfully executes or an action or event occurs which causes disestablishment of the queues from the subchannel.

Bit 7 of the QDIO adapter characteristics 1 (QDIOAC1) field in the subchannel QDIO data block that is part of the CHSC Store Subchannel QDIO Data command response block indicates whether QDIO Enhanced Buffer State Management is enabled for a specific subchannel.

When a QDIO subchannel is enabled for QDIO Enhanced Buffer State Management, the subchannel is designated by its subchannel token in general register 1 for the following instructions:

Signal Adapter (SIGA)—in particular, SIGA-rt (read by token) and SIGA-wt (write by token), which are alternatives to SIGA-r and SIGA-w. The SIGA-rt and SIGA-wt instructions perform the same functions as SIGA-r and SIGA-w, respectively; however, a token instead of a subsystem id is used to designate the subchannel. Examples of SIGA-r and SIGA-w are described in "Self-Contained Queues With Associated Control Information For Receipt And Transfer Of Incoming And Outgoing Data Using A Queued Direct Input-Output Device," Baskey et al., U.S. Pat. No. 6,332,171 B1, issued Dec. 18, 2001, which is hereby incorporated herein by reference in its entirety;

Set QDIO Buffer State (SQBS); and

Extract QDIO Buffer State (EQBS).

The subchannel token is obtained from the subchannel token field of the subchannel QDIO data block that is part of the response to a CHSC Store Subchannel QDIO data command that is executed after the subchannel has been enabled for QEBSM. Thus, to effect QEBSM enablement and to obtain a subchannel token for a specific subchannel, the program executes the following sequence:

1. Execute CHSC Store Subchannel QDIO Data to verify that QEBSM is available for the subchannel.

2. Execute Establish QDIO Queues CCW command to enable the subchannel for QEBSM.

3. Execute CHSC Store Subchannel QDIO Data in order to verify that QEBSM is enabled, to obtain the subchannel token, and to examine the adapter's characteristics, some of which may have changed as a result of successful execution of the Establish QDIO Queues CCW command.

After a QDIO subchannel has been enabled for QEBSM, the Set QDIO Buffer State (SQBS) instruction is used to change the states of the queue buffers active on the subchannel. Timely use of the Extract QDIO Buffer State (EQBS) instruction to interrogate the states of the queue buffers active on the subchannel allows host pages to be unpinned in a manner that does not unduly stress the storage over-commitment that is associated with the management of a high number of pageable storage mode guests. Alternatively, if a program is not well behaved or the demand for host storage is high, the host can unpin any pinned buffer page in the program owned state without waiting for a guest to issue EQBS.

Once the state of a buffer has been changed from a program owned state to an adapter owned state by Set QDIO Buffer State, the state is to be interrogated by Extract QDIO Buffer State and found to have reverted to a program owned state before another SET QDIO BUFFER STATE is used again for that buffer. In summary, the guest prepares the data buffers and executes the Set QDIO Buffer State (SQBS) instruction. The SQBS instruction attempts to ensure all specified buffer pages are resident. If a buffer page has not been referenced, host page management assist functions are used to dynamically assign a new frame in the page table, pin the page and update the host shadow QDIO SBAL entry. If, however, a buffer page exists, is currently paged out, and is an input queue buffer page, host page management assist functions are used to dynamically assign a new frame in the page table, pin the page, and update the host shadow QDIO SBAL entry.

Adapter initiated state changes from adapter owned to program owned state are directly observable by the guest via the Extract QDIO Buffer State (EQBS) instruction which specifies buffers that the program had earlier placed in an adapter owned state and returns the current buffer state.

In addition to the above, a host page management assist facility (HPMA) can be invoked by other CPU facilities during the interpretation of a pageable storage mode guest. One or more aspects of the HPMA facility may be used with or without the QDIO architecture. HPMA includes, for instance, four HPMA assist functions, such as a resolve host page function, a pin host page function, an unpin host page by virtual address function and an unpin host page by PTE address function.

If a host page invalid condition exists on an instruction fetch or instruction operand access and the host page management assist is enabled, the resolve host page function may be invoked. The resolve host page function may be used during the translation process to dynamically resolve a host page invalid condition and prevent a page translation exception from being recognized If the resolve host page function completes successfully, in one example, the unit of operation for which the host page invalid condition existed is nullified and retried. If the resolve host page function completes unsuccessfully, the original host page invalid condition is handled, as if the host page management assist is not enabled.

QEBSM in conjunction with HPMA provides the following advantages and performance improvement: Less SIE entry/exit overhead and less overhead for host context switching and routing (more cycles for productive work); eliminates host shadow copy of QDIO buffer states and associated synchronization overhead; dynamic updating of page status table and translation tables; dynamic prevention of host page faults; improved QDIO shadowing; and dynamic maintenance of host shadow structures by the CPU while in the interpretive execution mode without host intervention.

While various examples and embodiments are described herein, these are only examples, and many variations are included within the scope of the present invention. For example, the computing environment described herein is only one example. Many other environments, including other types of communications environments, may include one or more aspects of the present invention. For instance, different types of processors, guests and/or hosts may be employed. Moreover, other types of architectures can employ one or more aspects of the present invention.

Further, in the examples of the data structures and flows provided herein, the creation and/or use of different fields may include many variations, such as a different number of bits; bits in a different order; more, less or different bits than described herein; more, less or different fields; fields in a differing order; different sizes of fields; etc. Again, these fields were only provided as an example, and many variations may be included. Further, indicators and/or controls described herein may be of many different forms. For instance, they may be represented in a manner other than by bits. Additionally, although the term address is used herein, any designation may be used.

Moreover, although aspects of the invention are described with respect to an internet protocol and fibre channel protocol, again, these are only examples. Other protocols may benefit from one or more aspects of the present invention, including, but not limited to other network protocols.

Again, although HPMA is described with reference to QDIO and the examples described herein, one or more aspects of HPMA are usable by themselves. The use with QDIO is only one example.

As used herein, the term "page" is used to refer to a fixed-size or predefined-size area of storage. The size of the page can vary, although in the examples provided herein, a page is 4K. Similarly, a buffer is a structure to hold data and many types and sizes of structures are possible. Similarly, a storage block is a block of storage and as used herein, is equivalent to a page of storage. However, in other embodiments, there may be different sizes of blocks of storage and/or pages. Many other alternatives are possible. Further, although terms, such as queues, lists, tables, etc. are used herein, any types of data structures may be used. Again, those mentioned herein are just examples.

The present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The following patents are hereby incorporated herein by reference in their entirety:

"Self-Contained Queues With Associated Control Information For Receipt And Transfer Of Incoming And Outgoing Data Using A Queued Direct Input-Output Device," Baskey et al., U.S. Pat. No. 6,332,171 B1, issued Dec. 18, 2001;

"Method And Apparatus For Simulation Of Data In A Virtual Environment Using A Queued Direct Input-Output Device," Brice et al., U.S. Pat. No. 6,345,241 B1, issued Feb. 5, 2002; and "Method And Apparatus For Providing Configuration Information Using A Queued Direct Input-Output Device," Markos et al., U.S. Pat. No. 6,519,645 B2, issued Feb. 11, 2003; and "Interpreting I/O Operation Requests From Pageable Guests Without Host Intervention," Easton et al, U.S. Pat. No. 7,941,799 B2, issued May 10, 2011.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A system of facilitating management of storage of a pageable mode virtual environment, said system comprising:
   a CPU of the pageable mode virtual environment; and
   means for managing storage of the pageable mode virtual environment, the managing being performed by the CPU absent intervention of a host of the pageable mode virtual environment, wherein the means for managing comprises means for resolving by the CPU a storage fault absent intervention by the host and eliminating context switching overhead between the host and a guest of the pageable mode virtual environment.

2. The system of claim 1, wherein the means for resolving comprises means for using a descriptor of an available descriptor list to locate an available page frame to be used to resolve the storage fault, said page frame being a block of physical storage of a predefined size.

3. The system of claim 1, wherein the means for resolving comprises:
   means for updating the descriptor with a designation of at least one translation data structure entry; and
   means for adding the updated descriptor to a list of processed descriptors to provide a history of the resolution of storage faults.

4. The system of claim 1, wherein the means for resolving comprises means for making available to the host an indication that one or more page frames have been used to resolve one or more storage faults.

5. The system of claim 1, wherein the means for resolving comprises means for dynamically updating at least one translation data structure.

6. The system of claim 1, wherein the storage fault is a result of a guest of the pageable mode virtual environment referencing a page not backed by physical storage.

7. The system of claim 1, wherein the means for resolving comprises means for providing a page frame to resolve the storage fault, and wherein the system further comprises means for pinning a page backed by the page frame in physical storage.

8. The system of claim 7, further comprising means for unpinning the page.

9. The system of claim 8, further comprising means for tracking at least one of pinning and unpinning operations for one or more pages.

10. The system of claim 9, wherein the tracking is based on page class.

11. The system of claim 1, wherein the means for managing comprises means for pinning by the CPU a page in physical storage.

12. The system of claim 1, wherein a page is pinned in physical storage, and the means for managing comprises means for unpinning by the CPU the page.

13. A system of facilitating management of storage of a pageable mode virtual environment, said system comprising:
   a CPU of the pageable mode virtual environment to manage storage of the pageable mode virtual environment absent intervention of a host of the pageable mode virtual environment, wherein the managing comprises resolving by the CPU a storage fault absent intervention by the host and eliminating context switching overhead between the host and a guest of the pageable mode virtual environment.

14. An article of manufacture comprising:
   at least one computer usable non-transitory medium having computer readable program code logic to manage storage of a pageable mode virtual environment, the computer readable program code logic comprising:
   manage logic to manage storage of a pageable mode virtual environment, the managing being performed by a CPU of the pageable mode virtual environment absent intervention of a host of the pageable mode virtual environment, wherein the manage logic comprises resolve logic to resolve by the CPU a storage fault absent intervention by the host and eliminating context switching overhead between the host and a guest of the pageable mode virtual environment.

15. The article of manufacture of claim 14, wherein the resolve logic comprises use logic to use a descriptor of an available descriptor list to locate an available page frame to be used to resolve the storage fault, said page frame being a block of physical storage of a predefined size.

16. The article of manufacture of claim 15, wherein the resolve logic comprises:
   update logic to update the descriptor with a designation of at least one translation data structure entry; and add logic to add the updated descriptor to a list of processed descriptors to provide a history of the resolution of storage faults.

17. The article of manufacture of claim 14, wherein the resolve logic comprises logic to make available to the host an indication that one or more page frames have been used to resolve one or more storage faults.

18. The article of manufacture of claim 14, wherein the resolve logic comprises update logic to dynamically update at least one translation data structure.

19. The article of manufacture of claim 14, wherein the storage fault is a result of a guest of the pageable mode virtual environment referencing a page not backed by physical storage.

20. The article of manufacture of claim 14, wherein the resolve logic comprises provide logic to provide a page frame to resolve the storage fault, and wherein the resolve logic further comprises pin logic to pin a page backed by the page frame in physical storage.

21. The article of manufacture of claim 20, further comprising unpin logic to unpin the page.

22. The article of manufacture of claim 21, further comprising track logic to track at least one of pinning and unpinning operations for one or more pages.

23. The article of manufacture of claim 22, wherein the tracking is based on page class.

24. The article of manufacture of claim 14, wherein the manage logic comprises pin logic to pin by the CPU a page in physical storage.

25. The article of manufacture of claim 14, wherein a page is pinned in physical storage, and the manage logic comprises unpin logic to unpin by the CPU the page.

* * * * *